US007222096B2

(12) United States Patent
Anaya et al.

(10) Patent No.: US 7,222,096 B2
(45) Date of Patent: May 22, 2007

(54) LINE HANDLER

(75) Inventors: Ana Gabriela Anaya, Germantown, MD (US); Brenda L. Boulter, Poolesville, MD (US); Ann G. Neidenbach, Washington, DC (US)

(73) Assignee: The Nasdaq Stock Market, Inc., Washington, DC (US)

( * ) Notice: Subject to any disclaimer, the term of this patent is extended or adjusted under 35 U.S.C. 154(b) by 36 days.

(21) Appl. No.: 10/272,327

(22) Filed: Oct. 15, 2002

(65) Prior Publication Data
US 2003/0097327 A1 May 22, 2003

(51) Int. Cl.
*G06Q 40/00* (2006.01)
(52) U.S. Cl. ............... 705/37; 705/35; 705/36
(58) Field of Classification Search ........ 705/35, 705/36, 37
See application file for complete search history.

(56) References Cited

U.S. PATENT DOCUMENTS 5,864,827 A * 1/1999 Wilson .............. 705/35
5,987,432 A * 11/1999 Zusman et al. ........ 705/35
6,016,107 A * 1/2000 Kampe et al. ........ 340/7.46
6,321,212 B1 * 11/2001 Lange .................... 705/37

OTHER PUBLICATIONS

NASD Stockwatch, System Design Document, Feb. 8, 1989 (pp. 1-62).
Description of Programs Under StockWatch System (pp. 1-11).
Introduction to the Stockwatch Automated Tracking System ("SWAT"), Jun. 1992 (pp. 1-9).
On-Line Stockwatch, Jun. 1992 (pp. 15-28).
Off-Line Stockwatch Break Report, Jun. 1992, (pp. 36-54).

* cited by examiner

*Primary Examiner*—Alain L. Bashore
(74) *Attorney, Agent, or Firm*—Fish & Richardson P.C.

(57) ABSTRACT

A method receives incoming messages from data feed lines. The incoming messages have data on associated market events. The method includes receiving incoming messages from a feed line, translating the received incoming messages into market event messages having a common format, and publishing a portion of the translated messages on a network. Each market event message includes data on a market event and time data. The network has multiple devices capable of receiving the translated messages.

35 Claims, 54 Drawing Sheets

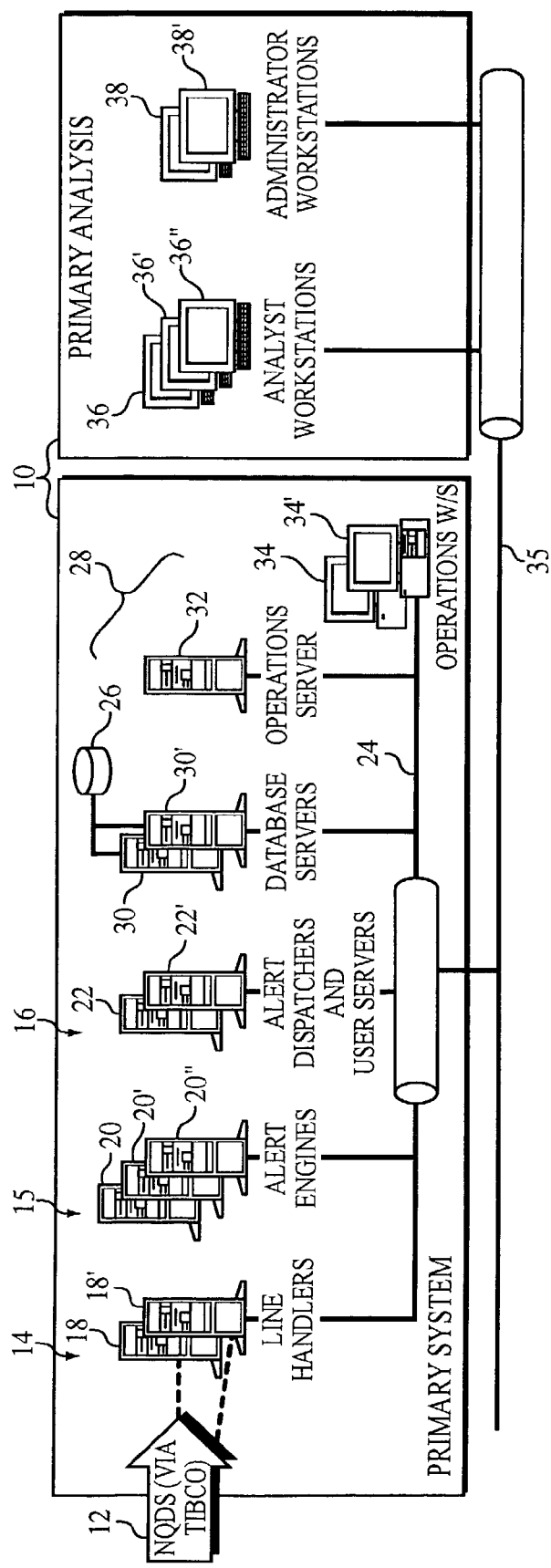
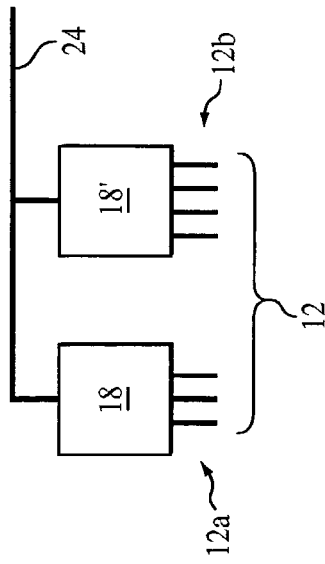
FIG. 1A
FIG. 2

☐ NASDAQ SDR WORKSTATION

QUERY   WORKSTATION SETTINGS

MAIN ALERT POOLS

| TIME | TYPE | SYMBOL | INSD BID | INSD ASK | PRIORITY |
|---|---|---|---|---|---|
| 15:31:07 | L | GOLF | 32 3/8 | 32 3/8 | H |
| 15:31:02 | C | SCCB | 27 3/8 | 27 1/8 | |
| 15:30:57 | L | KIDD | 56 3/8 | 56 3/8 | |
| 15:30:52 | C | FSFB | 66 3/8 | 66 1/8 | |
| 15:30:47 | C | FSFB | 66 3/8 | 66 1/8 | |

QT

| 5:31:03 | L-3W | SCCB | 87 3/16 | 87 5/16 | H |
|---|---|---|---|---|---|
| 15:30:56 | H-R | SRET | 32 1/8 | 32 3/8 | |
| 15:30:49 | H-W | INIA | 57 1/3 | 25 7/8 | |

UMA

| TIME | TYPE | SYMBOL | INSD BID | INSD ASK | PFD |
|---|---|---|---|---|---|
| 15:31:02 | VOL | YELL | 32 3/8 | 32 3/8 | LV |
| 15:30:52 | 52H | OATS | 20 2/3 | 25 7/8 | C |

HALTS

| TIME | TYPE | SYMBOL | MARKET | CONDIT |
|---|---|---|---|---|

HEADLINE NEWS

| TIME | SOURCE | SYMBOLS | HEADLINE |
|---|---|---|---|
| 15:31:08 | AP | | PRESIDENT CLINTON ARRIVES IN CHINA FOR 10 ... |
| 15:31:07 | REUTERS | | BLAIR SACKS THE EXCHEQUER |
| 15:31:06 | DJ | MSFT-INTC | ANALYST RAISE EARNINGS ESTIMATES |
| 15:31:05 | AP | | BILL GATES BUYS WASHINGTON STATE, DECI ... |

ANALYST ALERT POOL    ☑ DISPLAY RESOLVED ALERTS

| TIME | SOURCE | SYMBOLS | INSD BID | INSD ASK | RAI | RESOLUTION |
|---|---|---|---|---|---|---|
| 08:31:04 | C | MSFT | 103 5/8 | 103 1/2 | | |
| 08:37:33 | L | INTC | 98 1/16 | 98 1/16 | BILL | REFERRED TO ... |
| 08:31:04 | C | CIBN | 34 5/8 | 34 1/2 | | CONTACTED F ... |
| 08:37:33 | L | SBAS | 76 1/16 | 76 1/16 | | |

ANALYST CLUSTERS

○ MY CLUSTER  ○ BANKING SECTOR
 R FED FUNDS
 N 7/30/98 12:00:00 PM DJ: FED RAISES FED FUNDS RATE
     SPOKE WITH GREENSPAN
 A 7/30/98 12 01:10 PM LOCKED: CITI
     MONTHLY YIELD

NEWS QUERY RESULTS

| DATE | TIME | ID | HEADLINE |
|---|---|---|---|

ALERT QUERY RESULTS

| QUOTE DATE | SYMBOL | ITS | DJ | RT | BW | TEMP SYMB | MARKET | CONDIT | WATCHED | | |
|---|---|---|---|---|---|---|---|---|---|---|---|

NQDS  NTDS  CQSI  ITS  DJ  RT  BW  BB  PIR   EMERGENCY   SYML

FIG. 37

LINE HANDLER

BACKGROUND OF THE INVENTION

This invention relates generally to monitoring a trading market, and more particularly, to handling market data messages from data feed lines.

Traders and market regulators use market event data to detect market trends and unusual market conditions. The market event data may arrive from different sources and at high rates. Effective tracking of market conditions often requires that a monitoring system receive and analyze this data without loss or errors.

The detection of some unusual market conditions warrants predetermined responsive actions. Such market conditions are referred to as alert conditions. The predetermined responsive actions may include identifying parties causing the condition, obtaining additional information on the condition, tracking the condition, reporting on the condition, and/or correcting the condition. Performing the predetermined responsive actions and determining that the alert condition no longer exists are two different methods of resolving an alert condition.

A monitoring system may use human analysts to resolve alert conditions. The human analysts receive messages from the monitoring system that inform them that an alert condition has been detected. The messages for informing human analysts of alert conditions are generally referred to as alerts.

SUMMARY OF THE INVENTION

In one aspect, the invention provides a method of receiving and formatting incoming messages from one or more data feed lines. The method includes receiving a plurality of incoming messages having data on one or more market events from one of the data feed lines and translating a portion of the received incoming messages into market event messages having a common format. The market event messages include market activity data and time data. The method also includes publishing at least one of the translated messages on a network having a plurality of devices capable of processing the published message.

In another aspect, the invention provides a computer program product for receiving and formatting incoming messages for market events. The computer program product resides on a computer readable medium and includes executable instructions for performing the above-described method.

In another aspect, the invention provides a system to format incoming messages for market events, which are received from one or more of data feed lines. The system includes a network and a plurality of line handlers. Each line handler includes a server coupled to one or more of the data feed lines and to the network. Each server is configured to receive a plurality of the incoming messages for market events from the one or more data feed lines coupled thereto, translate the received messages into market event messages having a common format, and publish a portion of the translated messages on the network. The market event messages from each server have the same format.

Various embodiments of the market surveillance system provide for rapid analysis of new market events and rapid availability of the results of such analysis to users. Some embodiments route detected alerts to analysts within two seconds of receiving the data messages for the market events triggering the alerts.

Various embodiments of the market surveillance system receive information on market events in different formats and from several sources. These systems can process high volumes of data without errors, because independent parallel components redundancy provide for fault tolerance. The redundancy ensures that many component failures will not trigger breakdowns of the monitoring system.

Various embodiments coordinate analyses of different market events to detect some types of alert conditions.

Various embodiments self monitor the system and produce performance data. The performance data provides operators with information on error situations in different system components. The performance data can also include statistical information on data message throughputs at various stages of the system.

Various embodiments provide for detection and/or automated resolution of a variety of types of alert conditions. Alert conditions may involve locked or crossed quotes of market participants, unreasonable relations between quotes and trading prices, forbidden reporting and/or trading practices, and unusual market and/or trading conditions. The various embodiments also track alerts and modify thresholds for subsequent detection of alerts in response to detecting an alert condition.

BRIEF DESCRIPTION OF THE DRAWINGS

Other objects, features, and advantages of the invention will be apparent from the following description, taken together with the drawings in which:

FIG. 1A is a high-level block diagram of a system for monitoring market conditions;

FIG. 2 shows connections between the line handlers of FIG. 1A couple and market data feed lines;

FIG. 37 shows a graphical user interface for presenting alerts to analysts in one embodiment of the analyst workstations of FIG. 1A;

DESCRIPTION OF THE PREFERRED EMBODIMENTS

Market Monitoring System

Figure 1B:
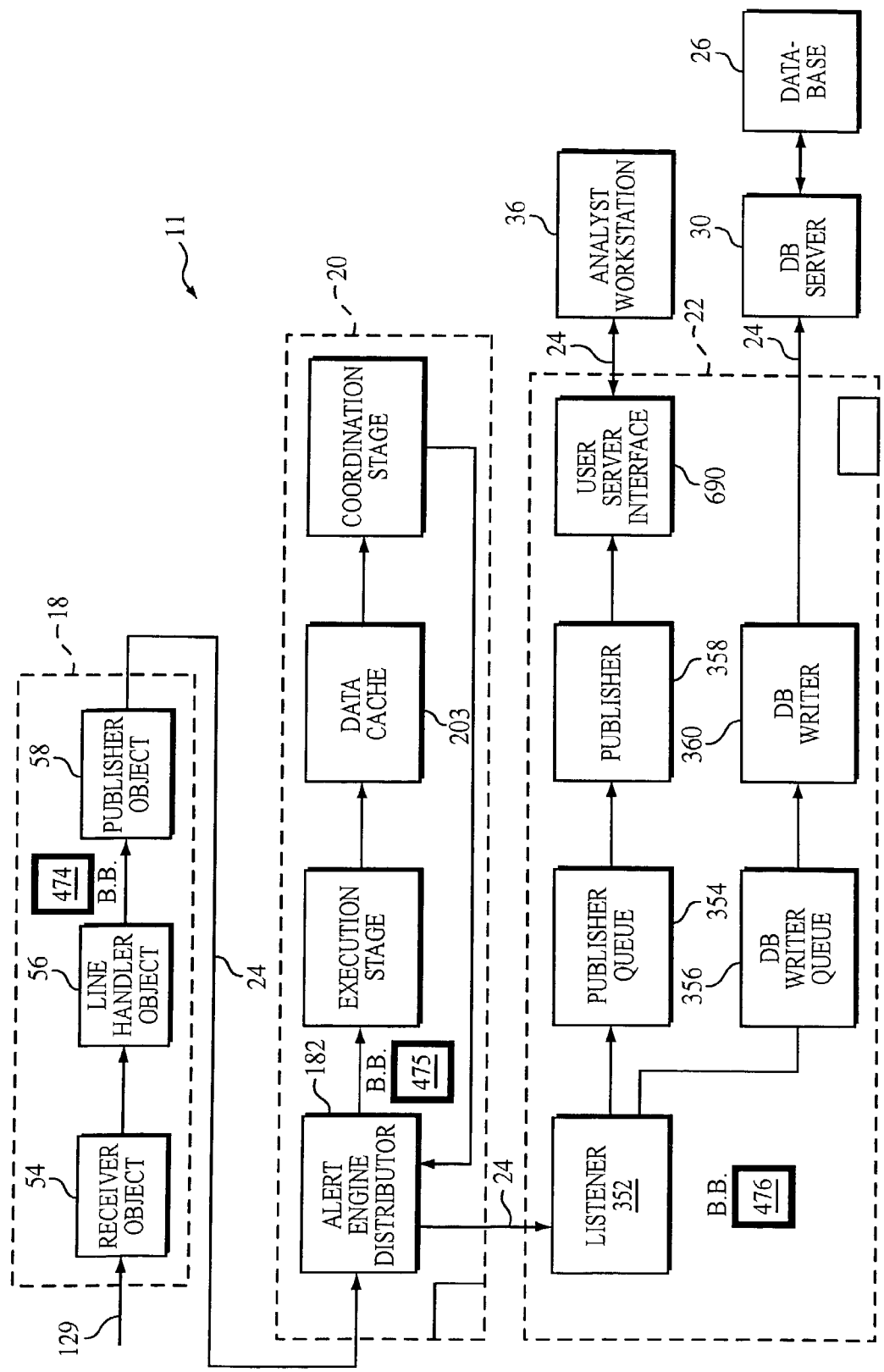
FIG. 1B is a block diagram illustrating the software components of the market monitoring system of FIG. 1A.

Referring to FIG. 1A, a high-level block diagram of a market monitoring system 10 for monitoring market conditions is shown. The market monitoring system 10 receives a flow of incoming messages from a plurality of sources through data feed lines 12. Each incoming message contains data on an associated market event.

The market monitoring system 10 includes a plurality of stages 14-16, which are asynchronous with respect to each other. Each stage 14-16 includes a parallel array of devices, which are also asynchronous with respect to each other. The devices of the stages 14-16 are referred to as line handlers 18, 18', alert engines 20, 20', 20'', and alert dispatchers 22, 22'. Each of these devices includes a server, e.g., one or more processors, running software programs that are Windows NT compatible. Other operating systems could alternatively be used. The devices 18, 18', 20, 20', 20'', 22, 22' of the different stages 14-16 communicate through a private network 24, which supports an Ethernet protocol. In some embodiments, the private network 24 is a local area network.

The private network 24 also couples the devices 18, 18' 20, 20', 20'', 22, 22' to database servers 30, 30' and an operations monitoring system 28. Each database server 30, 30' interfaces to a database 26. The database 26 stores market event and alert data, market event histories, analysts reports, data and applications for analyzing market events, and system operations data. The operations monitoring system 28 interfaces the private network 24 through a server 32 and is accessible to human operators through one or more operations workstations 34, 34'. The operations monitoring system 28 monitors the line handlers 18, 18', alert engines 20, 20', 20'', and alert dispatchers 22, 22' in real-time. The servers 30, 30', 32 and workstations 34, 34' are also Windows NT platforms running Windows NT compatible software programs.

The private network 24 also couples to a global network 35, i.e., a wide area network. The global network 35 connects analyst and administrator workstations 36, 36', 36", 38, 38' to the market monitoring system 10. The analysts workstations 36, 36', 36" obtain and analyze information on market events and/or alerts detected by the market monitoring system 10. The administrator workstations 38, 38' control the long term performance of the market monitoring system 10.

Referring to FIG. 1B, a flow 11 of a message for a market event through the market monitoring system 10 of FIG. 1A is shown. An incoming message for a market event is received from the set of feed lines 12a by the line handler 18. The line handler 18 processes the message with a receiver object 54, line handler object 56, and publisher object 58 to generate a formatted market event message. The publisher object 58 publishes the market event message on the private network 24 where the message is received by the alert engine 20. The alert engine 20 includes an alert engine distributor 182, which distributes the message to a path through an execution stage, a data cache, and a coordination stage. These stages of the alert engine 20 determine whether the market event messages correspond to alert conditions. If an alert condition is detected, the alert engine distributor 182 publishes an alert on the private network 24. The alert is received by the alert dispatcher 22, which sends the alert to publisher and DB writer queues 354, 356. A publisher object 358 sends alerts from the publisher queue 354 to a user server interface 690 that transmits the alert to one or more analyst workstations 36. A DB writer object 360 sends the alert from the DB writer queue 356 to a DB server via the private network 24. The DB writer object 360 writes the alert to the database 26.

Referring to FIG. 2, the connections of the line handlers 18, 18' to the feed lines 12 are shown. The feed lines 12 couple the market monitoring system 10 to external market information sources (not shown), e.g., via an external network (not shown). The feed lines 12 are grouped into several separate sets 12a, 12b, which are monitored by separate line handlers 18, 18'. Each line handler 18, 18' can receive the same incoming messages on market events from its set of feed lines 12a, 12b and transmits market event messages to the alert engines 20, 20', 20" via the private network 24. The market event messages transmitted by the line handlers 18, 18' have a common format, which is readable by any alert engine 20, 20', 20" irrespective of the format of the original incoming messages from the feed lines 12. The stages 14 and 15 operate asynchronously and the alert engines 20, 20', 20" in parallel and independently, process messages published on the private network 24 by the line handlers 18, 18'.

Referring again to FIG. 1A, the alert engines 20, 20', 20" analyze the market event messages, received from the line handlers 18, 18' to determine whether alert conditions exist. If one of the alert engines 20, 20', 20" detects an alert condition, it transmits an alert message to the alert dispatchers 22, 22'. Each alert dispatcher 22, 22' coordinates sending of received alert messages to the analyst stations 36, 36', 36" for processing by an external user (not shown). These transfers of alert messages proceed via the two networks 24, 35.

The market monitoring system 10 monitors incoming messages from the feed lines 12 for information indicating alert conditions. Alert conditions include unusual trading prices, ranges, and/or volumes; locked or crossed (L/C) market conditions; trading activity during regulatory halts; unusual market conditions; and market activities violating regulatory rules. To detect alert conditions, the market monitoring system 10 analyzes data such as quotations and indices, options/derivative prices, trade prices and quantities, trading halts, and price data on initial pubic offerings (IPO's). This data may arrive in messages from market and/or news sources. One market source is The Nasdaq Stock Market, Inc.® which publicizes quotes, trades, indexes and issues. News sources can include news wires, such as, Reuters, Dow Jones, Business Wire, PR Newswire, Professional Investors Report (PIR), Bloomberg/Knight Rider, API/UPI. These sources send messages to the data feed lines 12 in different formats, which are generally not adapted to analysis by the alert engines 20, 20', 20".

Line Handlers

The market event messages received by the line handlers 18, 18' are reformatted into a common format. The common format enables the alert engines 20, 20', 20" to process the market event messages from either line handler 18, 18'. The line handlers 18, 18' monitor the same incoming messages on the feed lines 12, and the alert engines 20, 20', 20" process the message that is first received from one of the line handlers 18, 18' for each market event. Thus, the line handlers 18, 18' of the market monitoring system 10 provide redundant components, which make the stage 14 more tolerant to hardware and software failures. Furthermore, the parallel structure of the stage 14 leads to more rapid processing of messages received from the feed lines 12, i.e., the alert engines process the earliest message generated for each market event. Since the received data message volume may be high, increased processing speed contributes to the ability of the system 10 to monitor market events and trends in real-time.

Figure 3A:
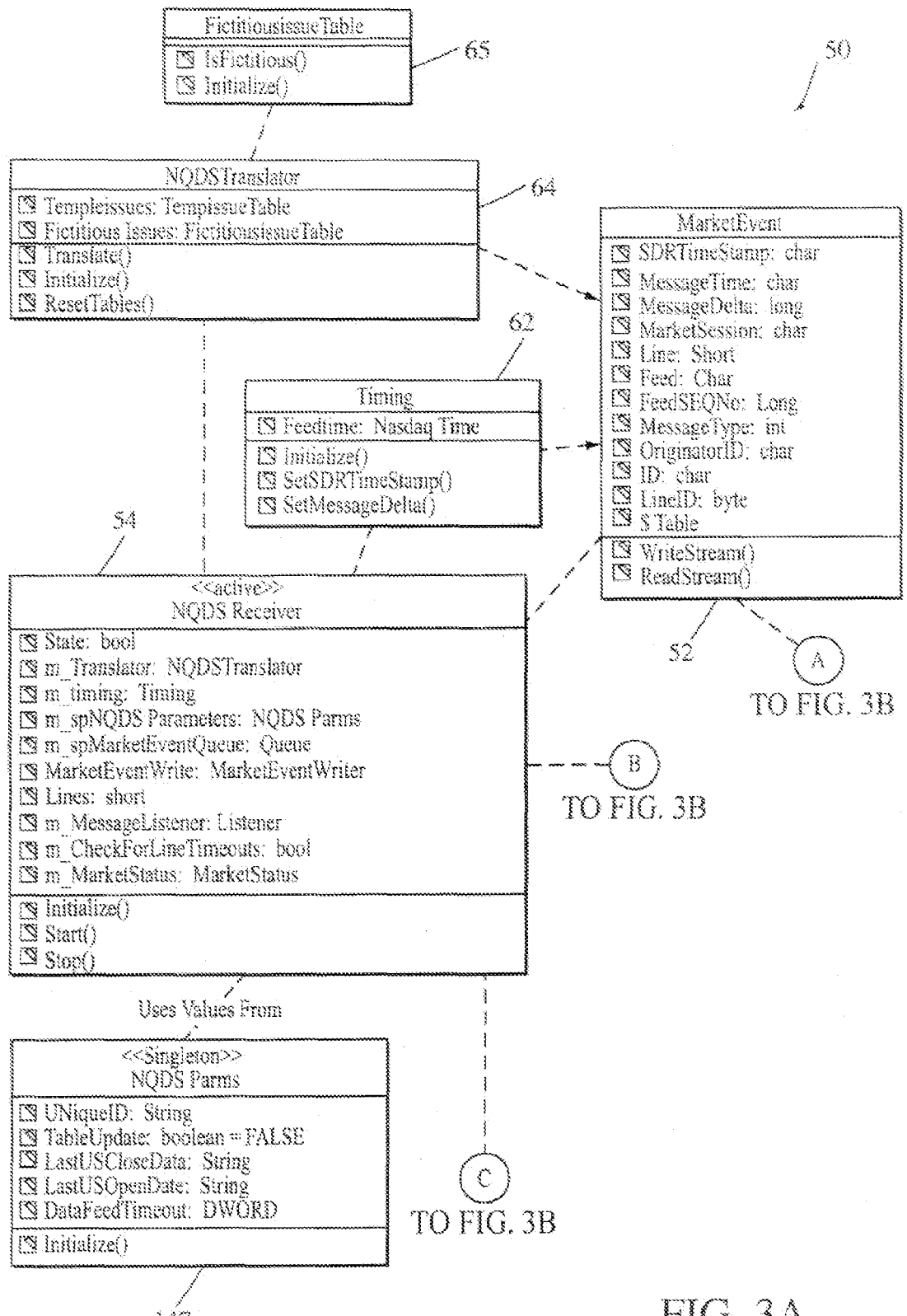
FIGS. 3A and 3B (hereinafter FIG. 3) are a class diagram illustrating software programming objects used by one embodiment of the line handlers of FIG. 1A.
Figure 3B:
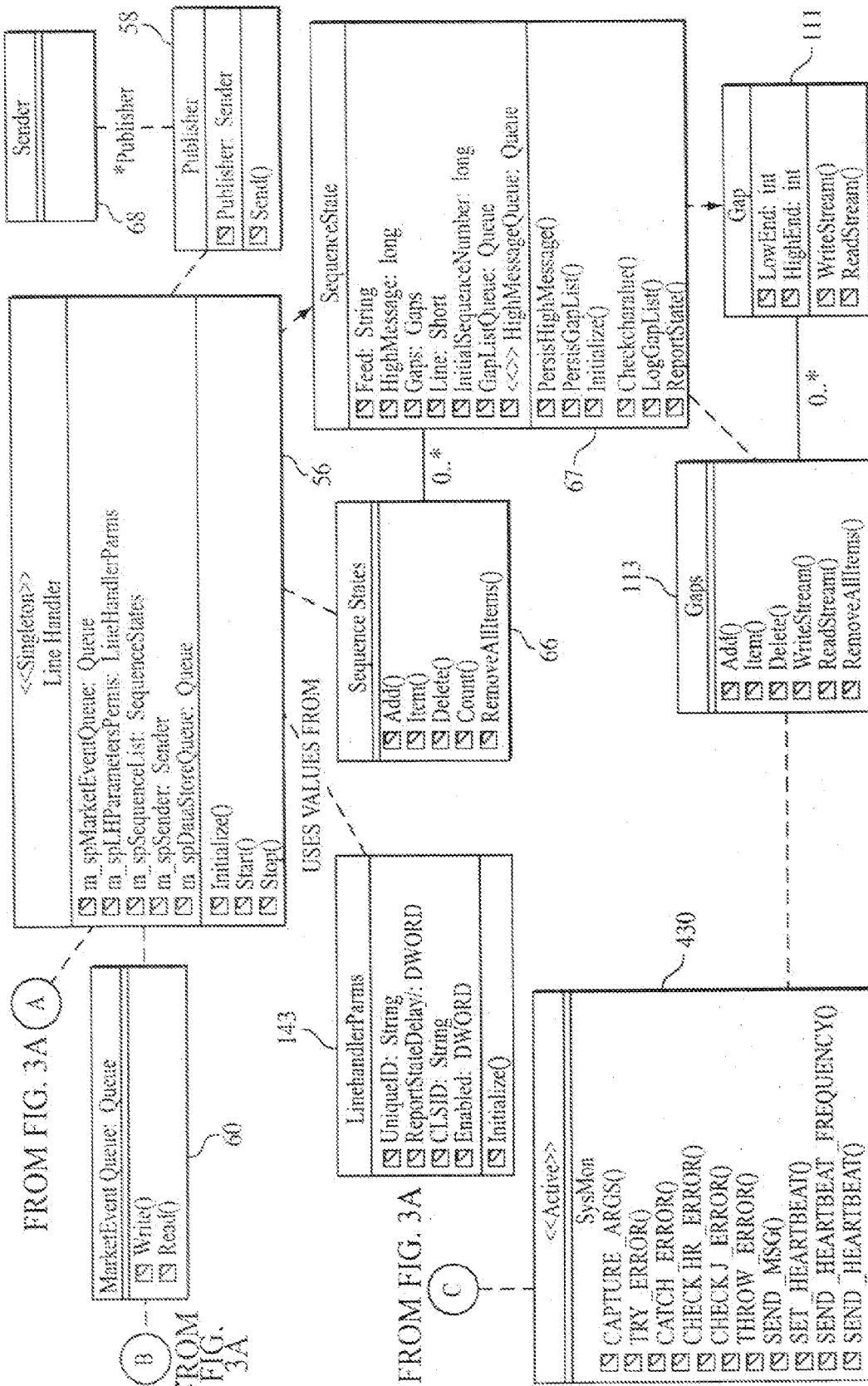

Referring to FIG. 3, a class diagram of object-oriented software 50 used by one embodiment of the line handlers 18, 18' is shown. The software 50 is adapted to translating incoming Nasdaq® (Nasdaq Stock Market, Inc.) Quote Data Service (NQDS) messages to a common format defined by a market event object 52. The market event object 52 holds quote information, market participant information, and timing information and is described in more detail in FIG. 4.

Though the illustrated software 50 is adapted to processing incoming NQDS messages, the line handlers 18, 18' may also receive other types of incoming messages for market events from some of the feed lines 12a, 12b. The software 50 may have additional software objects (not shown) for translating those other types of received incoming messages into the common format of the market event object 52.

Incoming messages from each feed line 12a, 12b are accommodated by a separate set of objects analogous to the NQDS receiver and translator objects shown in the software 50. Each separate set of objects loads into the servers of the line handlers 18, 18', which connect to the feed lines 12a, 12b being accommodated in a manner analogous to the above-described objects.

Figure 4:
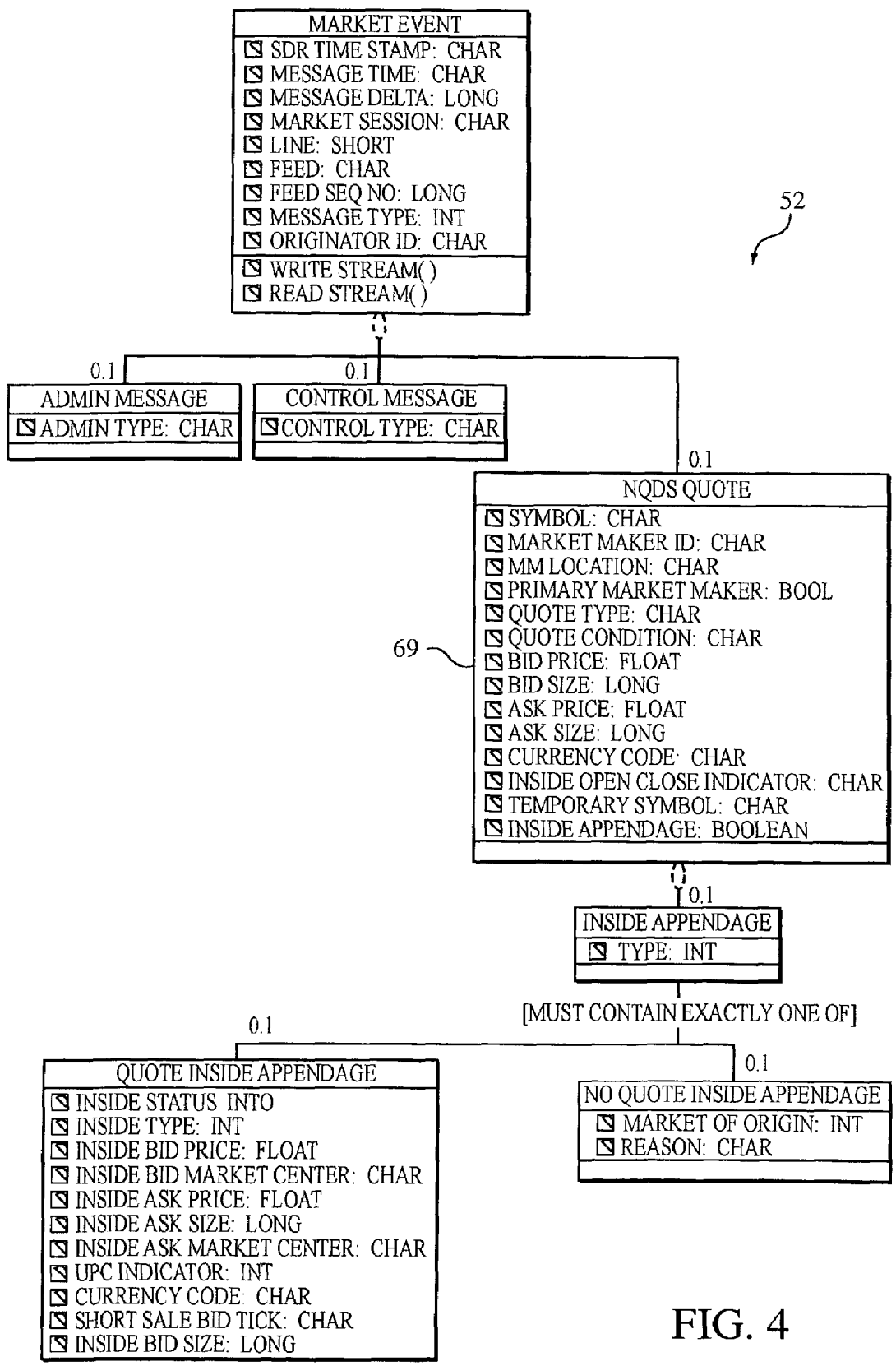
FIG. 4 is a class diagram illustrating a common format of the market event objects of FIG. 3.
Figure 5:
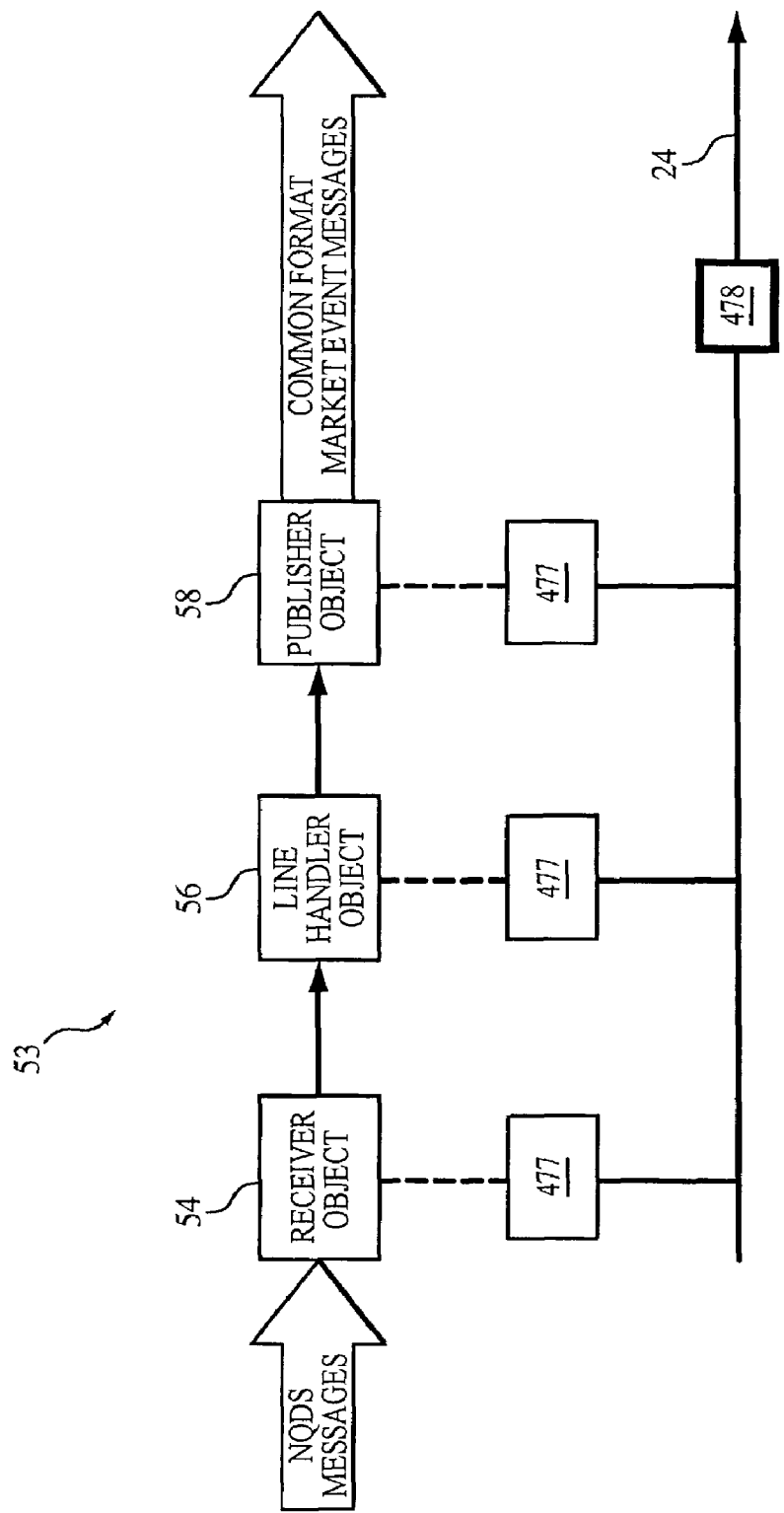
FIG. 5 is a high-level block diagram of software objects used by the line handlers to process messages.

Referring to FIG. 5, the flow 53 of NQDS messages through the software objects of FIG. 4 is shown. The flow 53 is controlled by a receiver object 54, a line handler object 56, and a publisher object 58. The receiver object 54 receives incoming NQDS messages, which are counted by a performance monitor object (not shown). The receiver object 54 translates NQDS messages from the associated set 12a, 12b of feed lines into the format of a market event object 52. The line handler object 56 validates or invalidates each translated message. The publisher object 58 publishes validated messages on the private network 24 as market event messages, which are received and processed by the alert engines 20, 20', 20".

Figure 6:
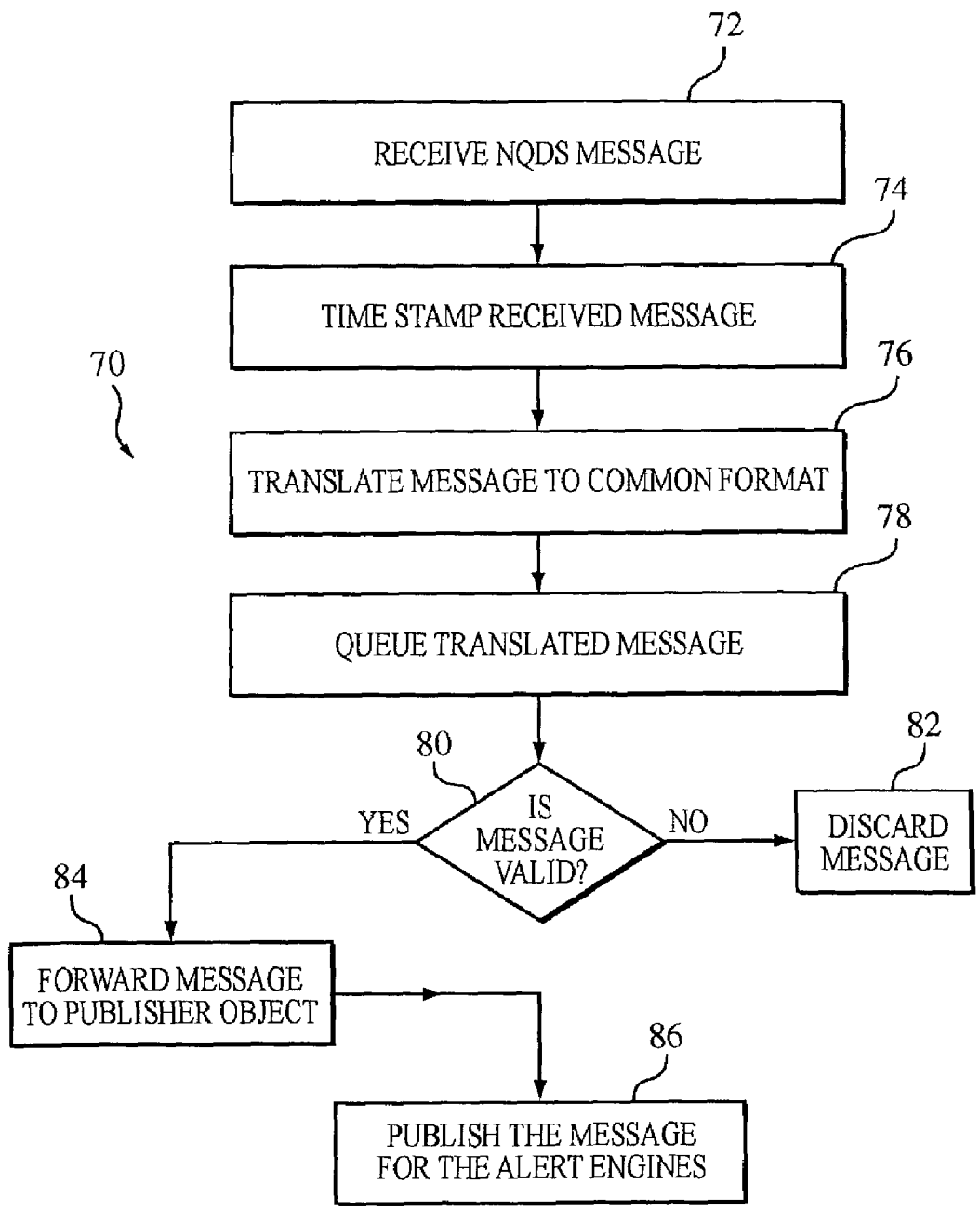
FIG. 6 shows a process of handling a received message with the line handlers and software programs of FIGS. 3-5.

Referring to FIG. 6, the line handler's processing 70 of NQDS messages is shown. Processing starts by the receiver object 54 receiving 72 a new incoming NQDS message from one of the feed lines 12 of the monitored set 12a, 12b.

The receiver object 54 activates 74 a timing object 62 to attach timing data to the newly received NQDS message. The timing data includes an NQDS time extracted from the message itself and a stamp for the receipt time at the receiver object 54. The timing data also includes additional data, i.e., a message Delta, obtained by comparing the NQDS times of the new and a previously received message from the same feed line. The comparison yields an estimate of an actual event time to associate with the market event underlying the received NQDS message. The timing data is written to the market event object 52 and provides a base line for tracking NQDS messages internally and externally to monitor the performance of the line handler 18.

The receiver object 54 activates a translator object 64 to translate 76 the message into the common format of the market event object 52. The translator object 64 translates 76 the NQDS message to the common format of the market event object 52 in a field-by-field manner. The translation produces and writes data to the fields of the NQDS quote object 69 shown in FIG. 4.

For testing, the translation could also includes looking up issue symbols of the NQDS message in a fictitious issue/security table object 65. Alternatively, this process could also occur during normal operation. Fictitious issue/security symbols are used for tests and demonstrations of the system and do not correspond to real issues/securities of a security market being monitored by the system 10. If a fictitious issue is found, the NQDS message is discarded, but an empty message is kept to avoid creating a gap in sequence numbers of NQDS or equivalent messages.

The line handler object 54 assigns 78 the translated message to an entry in the queue object 60. In response to the assignment, a sequence states object 66 registers a message sequence number in an associated sequence state object 67. One sequence state object 67 records message order and message gap data for each monitored feed line. Through message sequence and gap data, the line handler object 56 tracks messages so that duplicates are not published on the private network 24 and incoming sequential NQDS messages are not missed.

Entries of the queue object 60 are read serially by the line handler object 56 in a first-in-first-out (FIFO) manner. The line handler 56 determines 80 whether a read message is valid using the message's sequence number and gap data on previous sequence numbers from the associated sequence state object 67.

The validation process eliminates duplicate messages and reveals sequence number gaps between messages. Duplicates and gaps occur due to rebroadcasts and losses of NQDS messages, respectively. These problems can also produce out-of-order arrivals of the NQDS messages at the line handlers 18, 18'.

The line handler object 56 marks 82 the message for discard if the message is invalid or undesired, e.g., control and housekeeping messages such as start and end of day messages. Discarded messages also have a sequence number for tracking purposes, i.e., to avoid creating false gaps. If the message is valid, the line handler object 56 forwards 84 the message to the publisher object 58. The publisher object 58 activates a sender object 68 to publish the valid message for all of the alert engines 20, 20', 20" via the private network 24. The valid message is published 86 for the alert engines 20, 20', 20" regardless of their status or availability to process market event messages.

Prior to transmission, the line handler object 56 also updates the associated sequence state object 67 to indicate that the message was processed. Each line handler 18, 18' informs the operations server 32, if the message's sequence number indicates a gap in the sequence numbers or changes an existing gap. An operator is responsible for contacting the source of NQDS messages and requesting that messages falling in the gaps be retransmitted.

Figure 7:
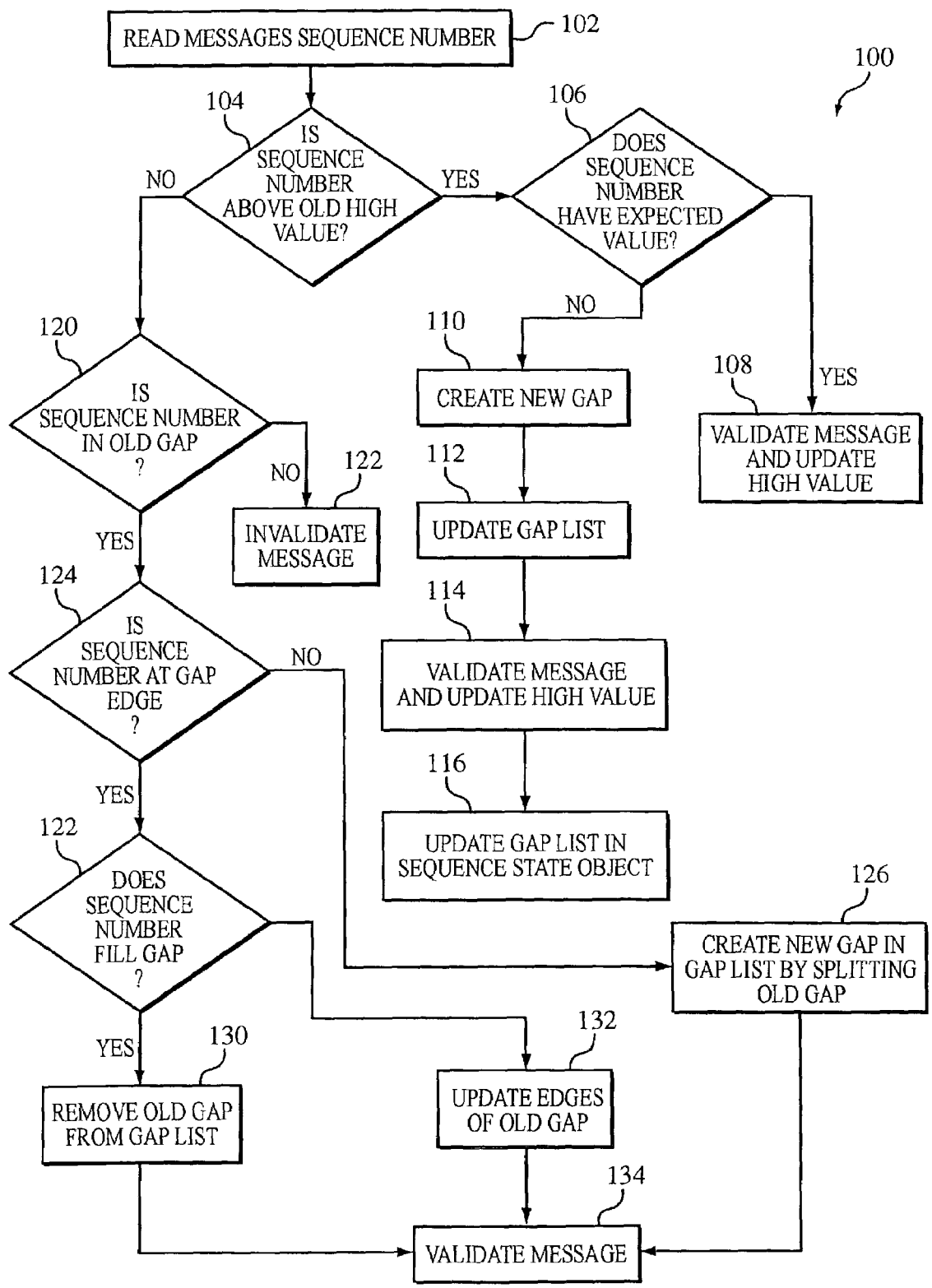
FIG. 7 shows a process for determining whether a message is valid within the process of FIG. 6.

Referring to FIG. 7, the process 100 used by the line handler object 56 to determine whether a message is valid is shown. The line handler object 56 starts the determination by reading 102 the sequence number of the message from the queue object 60. The sequence numbers sequentially and uniquely identifies the event to which the NQDS message corresponds. The line handler object 56 determines 104 whether the sequence number is higher than the previous high value. The previous high value is recorded in the sequence state object 67 associated with the feed line 12 that transmitted the message. If the number is above the old high value, the line handler object 56 determines 106 whether the sequence number has an expected value. The expected value is one more than the previous high value. If the sequence number has the expected value, the line handler object 56 validates the message and updates 108 the high value in the sequence state object 67 to be the present sequence number.

If the sequence number does not have the expected value, the line handler object 56 creates 110 a gap object 111, shown in FIG. 3. The gap object 11 corresponds to a new gap between the present sequence number and the previous high value. The line handler object 56 updates 112 a gap list in gaps object 113 of FIG. 3 to indicate the new gap. The line handler object 56 also validates 114 the message and updates the high value in the sequence state object 67 to be the present sequence number. The line handler object 56 also updates 116 a gap list in the sequence state object 67.

If the sequence number is less than the previous high value, the line handler 56 determines 120 whether the number lies inside an old gap. If the number is outside of all existing gaps, the line handler object 56 invalidates 122 the message, because the message is a duplicate of a previously processed message. If the number is in a gap, the line handler object 56 checks 124 whether the sequence number is at a gap edge. If the number is not at an edge, the line handler object 56 splits the gap in which the number falls to create 126 a new gap. The line handler object 56 makes the new gap by creating a new gap object having the form of the object 111 shown in FIG. 3. If the sequence number is at a gap edge, the line handler object 56 checks 128 whether the number fills the gap. If the gap is filled, the line handler object 56 removes 130 the gap from the list in the gaps object 113. If the sequence number does not fill the gap, the line handler object 56 updates 132 the edges of the gap in which the number falls. After each step 126, 130, and 132, the line handler object 56 validates 134 the message associated with the sequence number.

Figure 8:
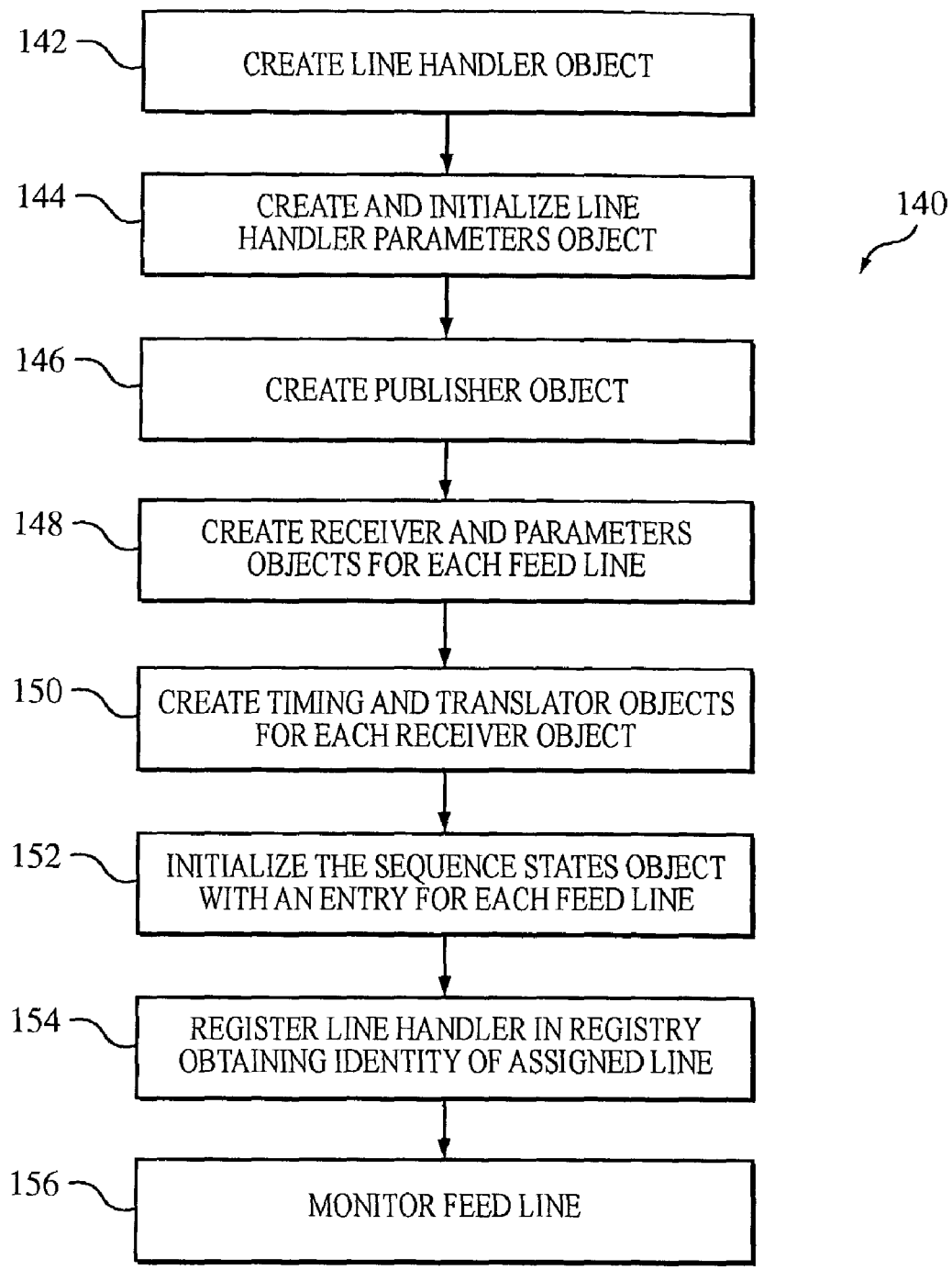
FIG. 8 shows one process for initializing the line handlers of FIGS. 3-5.

Referring to FIG. 8, an initialization process 140 for the line handlers 18, 18' is shown. The initialization process 140 creates 142 one line handler object 56 in the line handler 18, 18'. The line handler object 56 creates 144 a line handler parameters object 143, which initializes itself with information from an internal disk file (not shown) and default values for parameters not found in the file. The line handler object 56 creates and initializes 146 the publisher object 58. The line handler object 56 creates and initializes 148 a parameters object 147 and a receiver object 54 for each feed line to be monitored. Each receiver object 54 creates and initializes 152 a timing object 62 and a translator object 64. Each line handler object 56 registers 148 in the registry of the operating system thereby obtaining the identity of the feed line 12 to be monitored and a signature heartbeat message. The line handler object 56 initializes 154 the sequence states object 67 by writing an entry therein for each feed line to be monitored. After these steps, the receiver object 54 starts monitoring 156 its assigned feed line 12.

Figure 9:
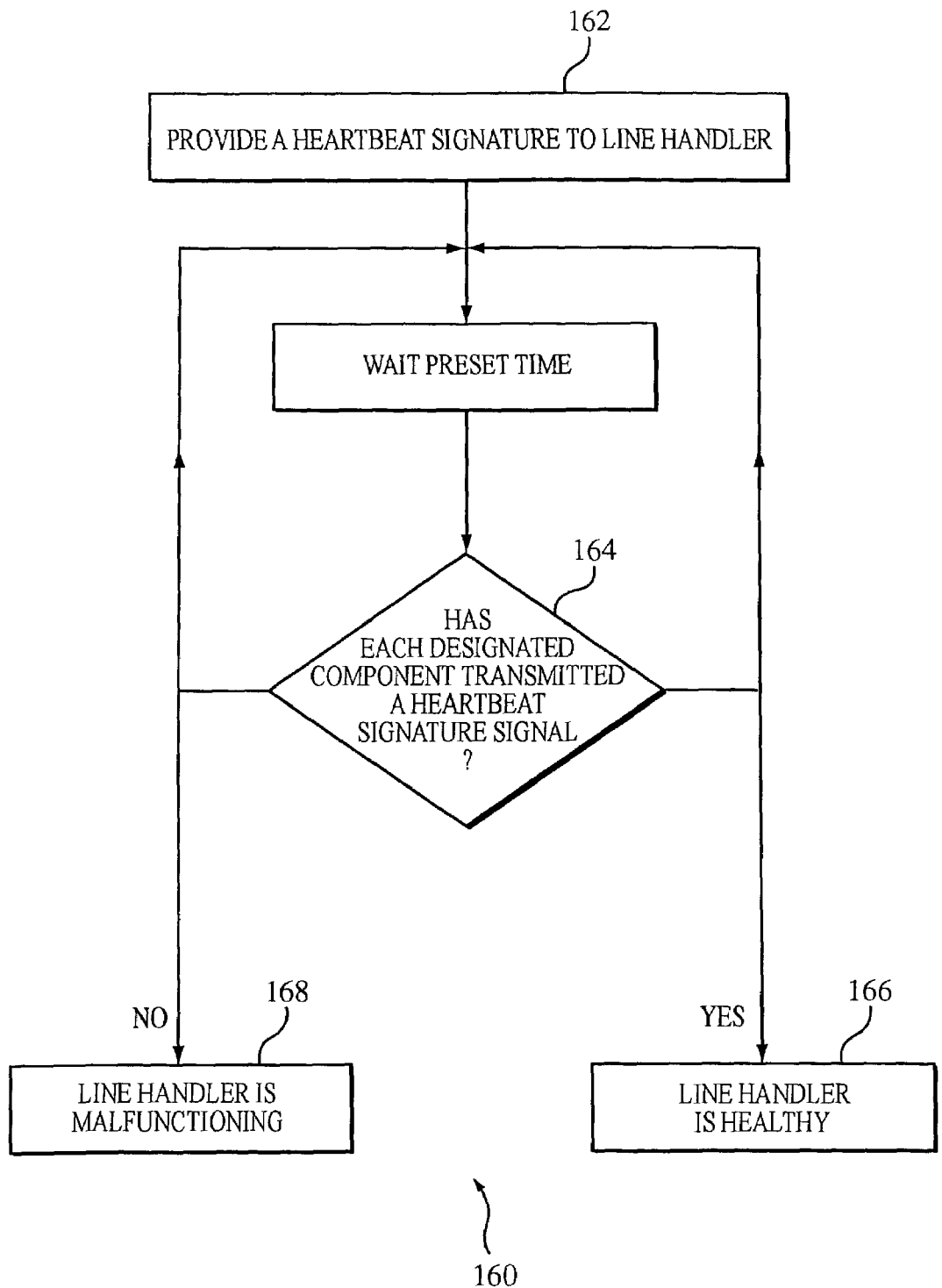
FIG. 9 shows a process by which a system monitoring object tracks the health of a line handler.

Referring to FIG. 9, a method 160 by which the operations server 32 tracks the health of the line handlers 18, 18' is shown. The operations server 32 provides 162 each line handler 18, 18' with a unique signature heartbeat message when the line handle 18, 18' starts up. While properly functioning, designated software objects of a line handler 18, 18' transmit signature signals to an internal system monitor object 430 (FIG. 3) at intervals having less than a preset length. The system monitor object checks 164 whether each designated software objects has transmitted a signature heartbeat message during each interval of the preset length. If one or more signature heartbeat messages have been received from each designated object in one of the intervals of preset length, the system monitor transmits a consolidate signature heartbeat message to the operations server 32 via the private network 24. The consolidate signature heartbeat message indicates 166 that the associated line handler 18, 18' is presently healthy. If one or more designated software objects does not transmit one or more signature heartbeat messages in one of the intervals of preset length, the internal system monitor does not send a signature heartbeat message to the operations server 32. The absence of a predetermined number of signature heartbeat message indicates 168 to the operations server 32 that the associated line handler 18, 18' is stopped or unhealthy and that a repairman is needed. Thus, an error or shut down of any designated software object, e.g., any active object, of a line handler 18, 18' can signal a malfunction of the corresponding line handler 18, 18' to the operations server 32.

The line handlers 18, 18' also transmit data on arrived and published messages to the operations server 32. The internal system monitor assigns "message received" and "message published" software counters (not shown) to the line handler 18, 18' during the registration 154 shown in FIG. 8. The software objects of each line handler 18, 18' send a message to the system monitor to update these counters each time a message is received or published. This data is periodically transmitted to the operations monitoring system 28 and/or administrator workstations 38, 38' to monitor the performance of each line handler 18, 18', e.g., through a running average message throughput. In some embodiments, separate counters track messages from individual feed lines.

Alert Engine

Figure 10:
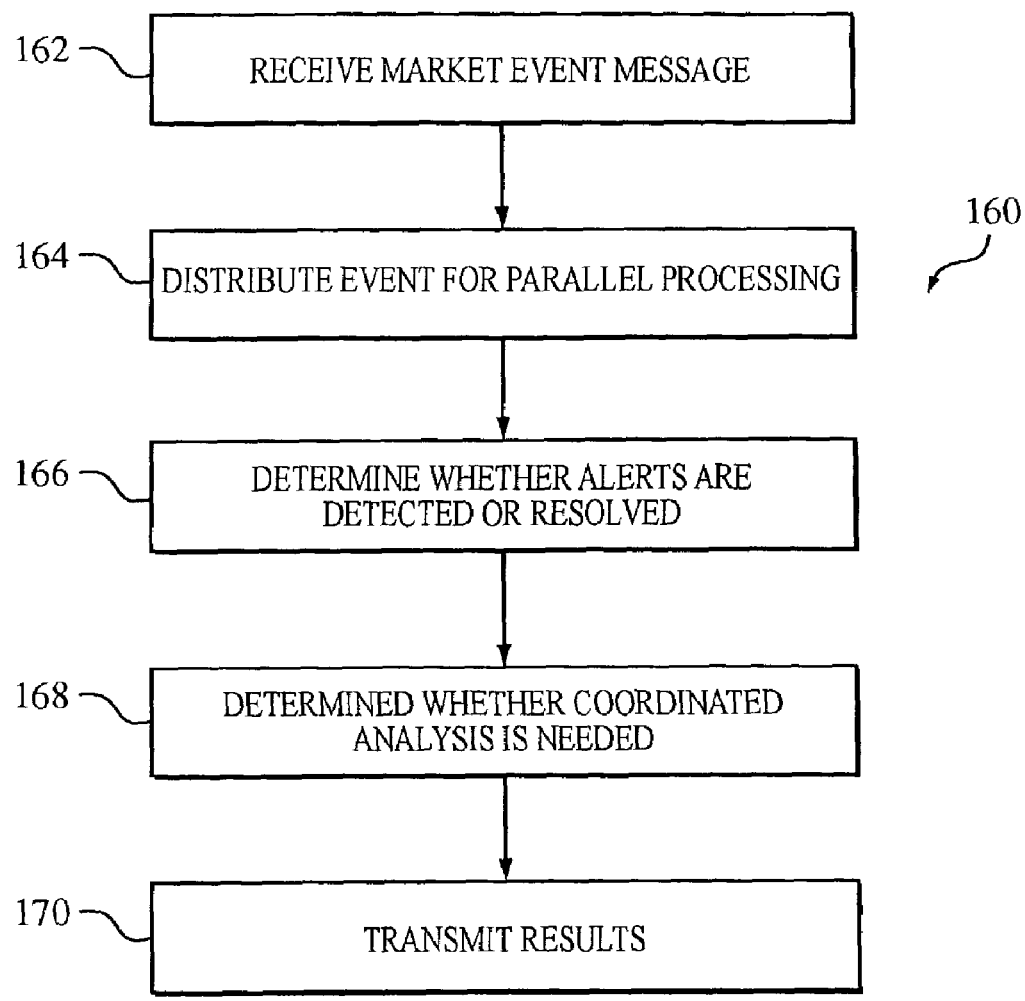
FIG. 10 shows a process for detecting alert conditions using alert engines shown in FIGS. 1A and 1B.

Referring to FIG. 10, a flow chart for a process 160 for detecting alert conditions and/or resolving previously detected conditions with the alert engines 20, 20', 20" of FIG. 1A is shown. The process 160 starts when one of alert engines 20, 20', 20" receives 162 a market event message from one of the line handlers 18, 18". The alert engine 20, 20', 20" distributes 164 the market event to a queue of an internal execution stage for parallel analysis. The choice of the queue depends on the issue symbol for the security affected by the market event. The execution stage determines 166 whether an alert condition is present and/or whether a previous alert has been "automatically" resolved by the analysis without the input of a human agent. If the analysis detects or automatically resolves any alerts, the market event is also analyzed to determine 168 whether coordinated analysis of this event with other events is needed to detect or resolve other alert conditions.

The alert engine 18, 18', 18" transmits 170 the results of analyzing the market event to the alert dispatchers 22, 22'. The results include alerts and alert resolutions, but the alert engines 18, 18', 18" may also report "events" and incidents to the alert dispatchers 22, 22'. The reported events are a selected set of market events having a potential to become alert conditions. For example, L/C market conditions that have not existed long enough to generate an alert are reported as events to the alert dispatchers 22, 22'. Incidents include new quotes of market participants which join an already formed L/C market condition. The alert dispatchers 22, 22' write such events and incidents to the database 26.

Figure 11:
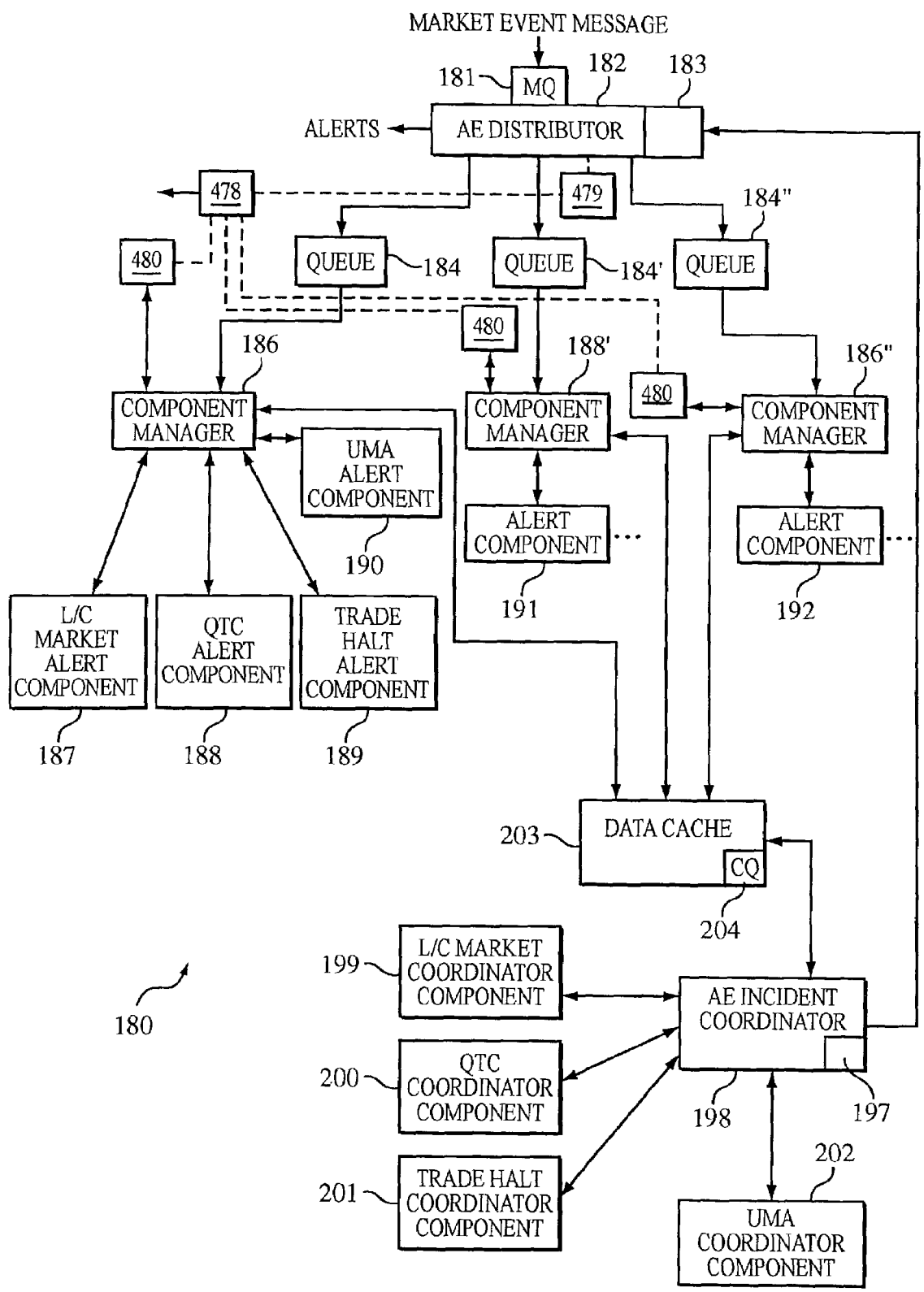
FIG. 11 is a high-level block diagram of a software program for implementing the process of FIG. 10.

Referring to FIG. 11, a process 180 for detecting and/or resolving alert conditions in the process 160 of FIG. 10 is shown. The process 180 runs one the individual servers of each alert engines 18, 18', 18" of FIG. 1A. Each server has an interface to the private network 24. The private network 24 interacts with the program 180 using a published subscriber technology.

The process 180 has separate stages that enable parallel analysis of market event messages. The analysis of market events complies with constraints. The constraints require that alert detection and resolution algorithms chronologically analyze market events associated with each security issue.

The process 180 has an external communication stage that includes a message queue 181 and an alert engine (AE) distributor 182. The alert engine distributor 192 asynchronously receives market event messages from the external line handlers 18, 18 via the private network 24 and temporarily stores the messages in the message queue 181. The alert engine distributor 182 and an alert queue 183 receive and transmit internally detected and/or resolved alerts to the external alert dispatchers 22, 22' via the private network 24.

The process 180 includes an execution stage having a parallel set of queues 184, 184', 184", component managers 186, 186', 186" and alert components 187-192. Each of the queues 184, 184', 184" chronologically schedules market events for a selected set of security issues. Each component manager 186, 186', 186" has several alert components, e.g., the alert components 187-192 for the component manager 186. Each alert components 187-190 of a component manager 186 supports an execution thread for analyzing a market event for one type of alert condition. The different alert components 187-190 for each component manager 186 provide for detection and/or automatic resolution of several types of alert conditions concurrently. The execution stage encapsulates logic for specific alert scenarios within the alert components 187-192. Thus, rules for detecting and/or resolving alert conditions may be changed to process new alert scenarios by adding or modifying the alert components 187-192.

The process 180 has a coordination stage including an alert engine incident coordinator 198 and a set of coordinator components 199-202. The alert engine incident coordinator 198 controls the coordinator components 199-202. Each coordinator component 199-202 analyzes alert conditions detected and/or automatically resolved by the execution stage according to a different alert scenario. The analysis determines whether the detected and/or automatically resolved condition should be analyzed together with other market events. The alert engine incident coordinator 198 can transmit, delay or discard a detected alert. The alert engine incident coordinator 198 can use detected alert data for changing algorithms for detecting and/or resolving other alerts. The coordinator components 199-202 encapsulate dependencies on business rules in algorithms for specific alert scenarios, i.e., changes in business rules can change the coordinator components 199-202. The coordination stage coordinates the detection and resolution of alerts based on temporally separated market events.

The coordination and execution stages interact indirectly through a data cache 203. The data cache 203 stores data on detected and automatically resolved alert conditions, coordination requests and instructions, and software component parameters. The software objects of the coordination and execution stages communicate by reading and writing to the data cache 203 rather than making direct cross calls between different parallel components or stages. Removing need for cross calls can increase overall processing speed. Furthermore, placing frequently used data in the data cache 203, i.e., a software object, means that the data is stored in memory rather than on disk. This memory mapped storage can increase the throughput of the alert engines 20, 20', 20'' by increasing the speed of data accesses.

Figure 12:
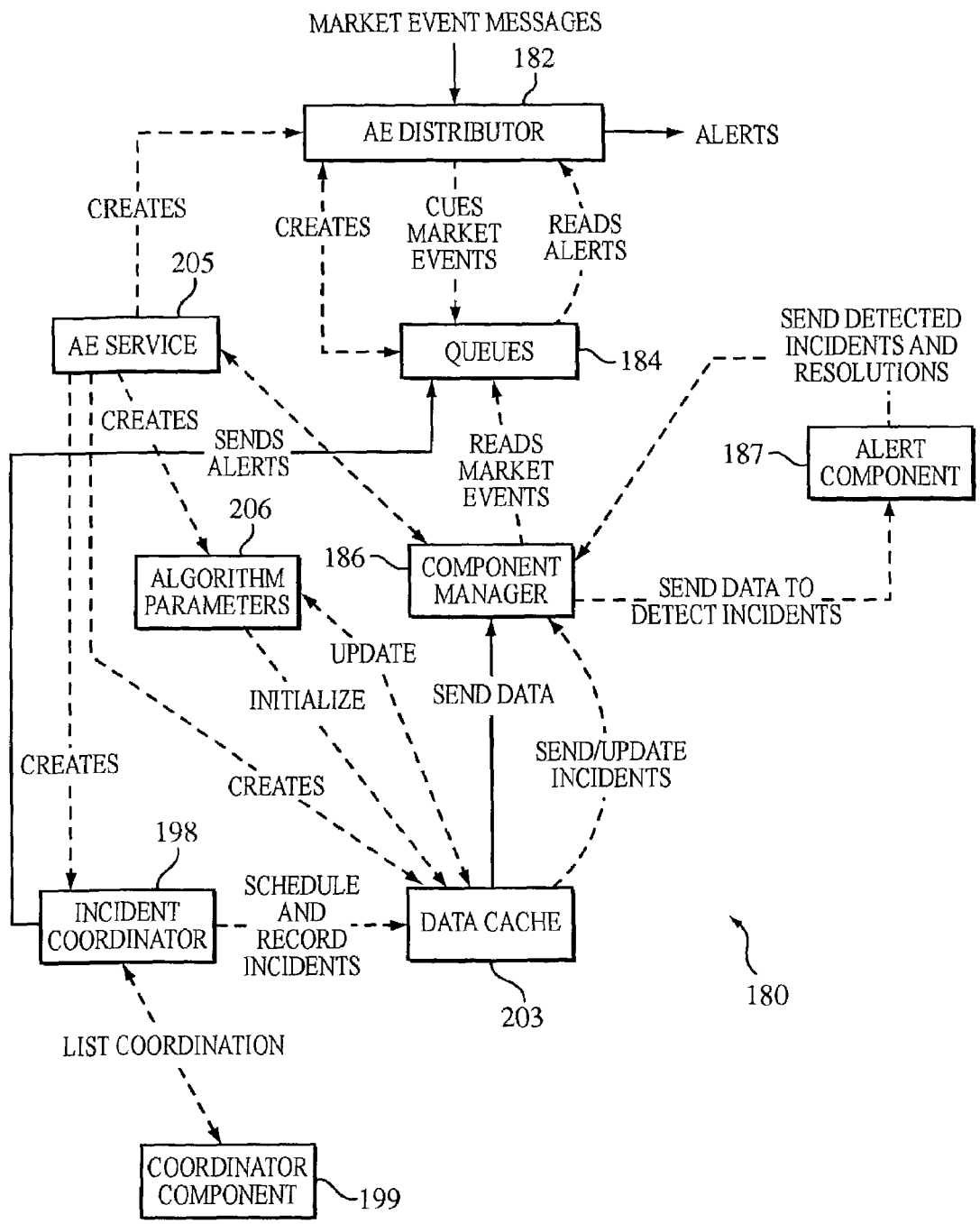
FIG. 12 is a block diagram showing control relations between software objects of the program of FIG. 11.

Referring to FIG. 12, control relationships between various components of the process 180 are shown. The process 180 can be implemented as an object oriented software program. Thus, each software component 182, 184, 184', 184'', 186, 186', 186'', 187-192, 197-204 is a separate object. A master object referred to as an alert engine service object 205 controls the program 180. The alert engine service object 205 starts up the program 180 by creating the alert engine distributor 182, the alert engine incident coordinator 198, an algorithm parameters object 206, and one or more component managers 156. The alert engine distributor 182 creates the queues 184, 184', 184''. The alert engine service object 205 can also stop the various other objects and plays a role in resynchronizing the various objects.

The algorithm parameters object 206 stores preference parameters for the alert components 187-192. The parameters object 206 initializes parameters in the data cache 203 which in turn initializes the alert components 187-192. These preference parameters may be modified through the administrator workstations 38, 38' of FIG. 1.

Figure 13A:
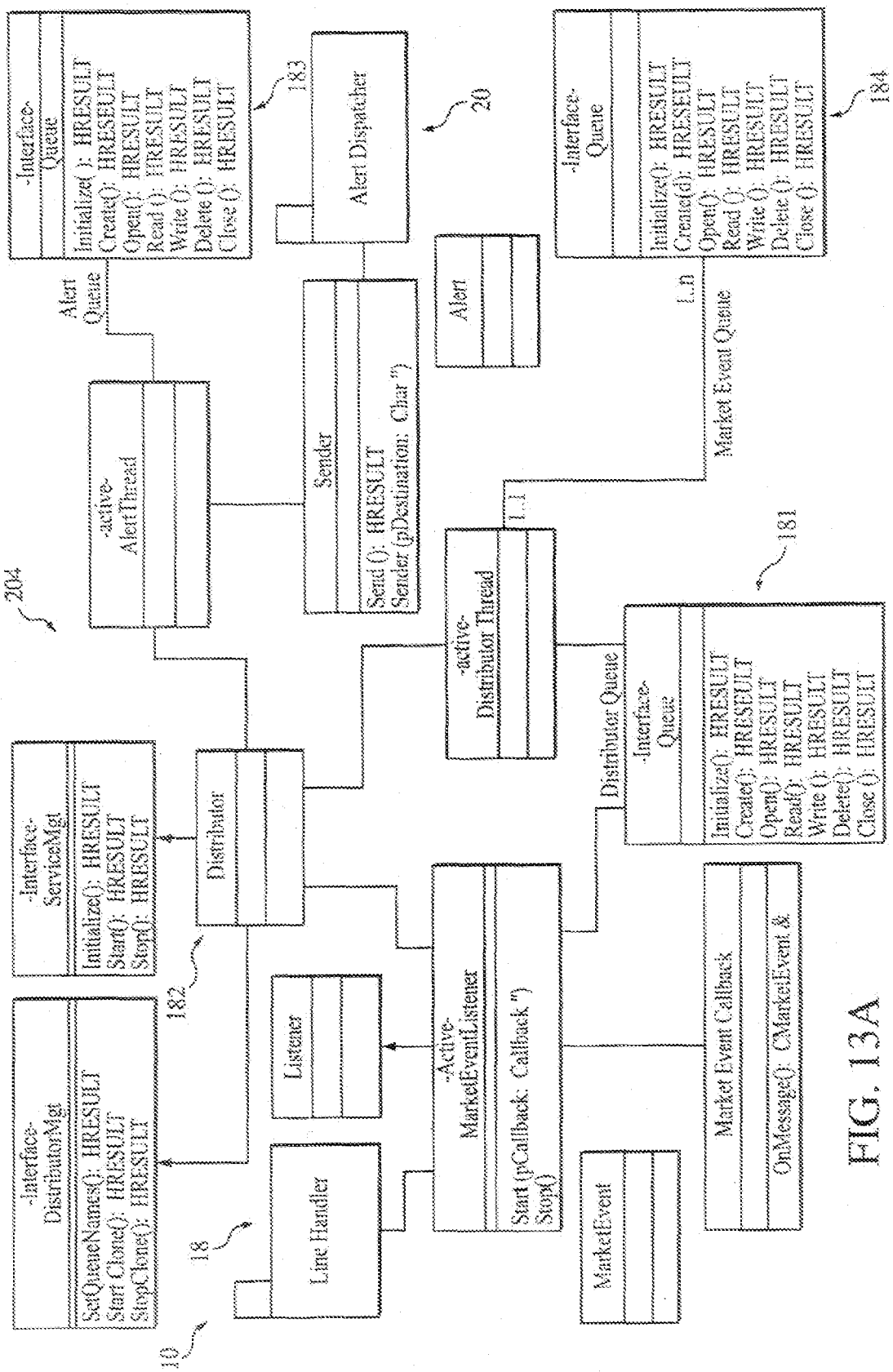
FIG. 13A is a class diagram for one embodiment of the communications stage of the program of FIGS. 11 and 12.

Referring to FIG. 13A, a class diagram 210 of objects of one embodiment of the communication stage of FIGS. 11-12 is shown. The objects indexed by <<interface>> are COM classes. The distributor queue, market event queue, and alert queue are COM objects supporting the queue interface. The distributor class is the container for ServiceMgt and DistributorMgt interfaces.

The initial execution threads are the listener, distributor, and alert thread classes. A market event listener object receives new market event messages from the line handlers 18, 18' and forwards the messages to the distributor queue object. The distributor thread object transfers market event messages from the distributor queue object to the market event queue object. The distributer thread object also monitors for alerts in the alert queue object and sends alerts to the alert dispatchers 20, 20' using sender objects. The sender class encapsulates transport for transmitting alerts. The alert queue object can store alert detection and/or resolution messages.

Figure 13B:
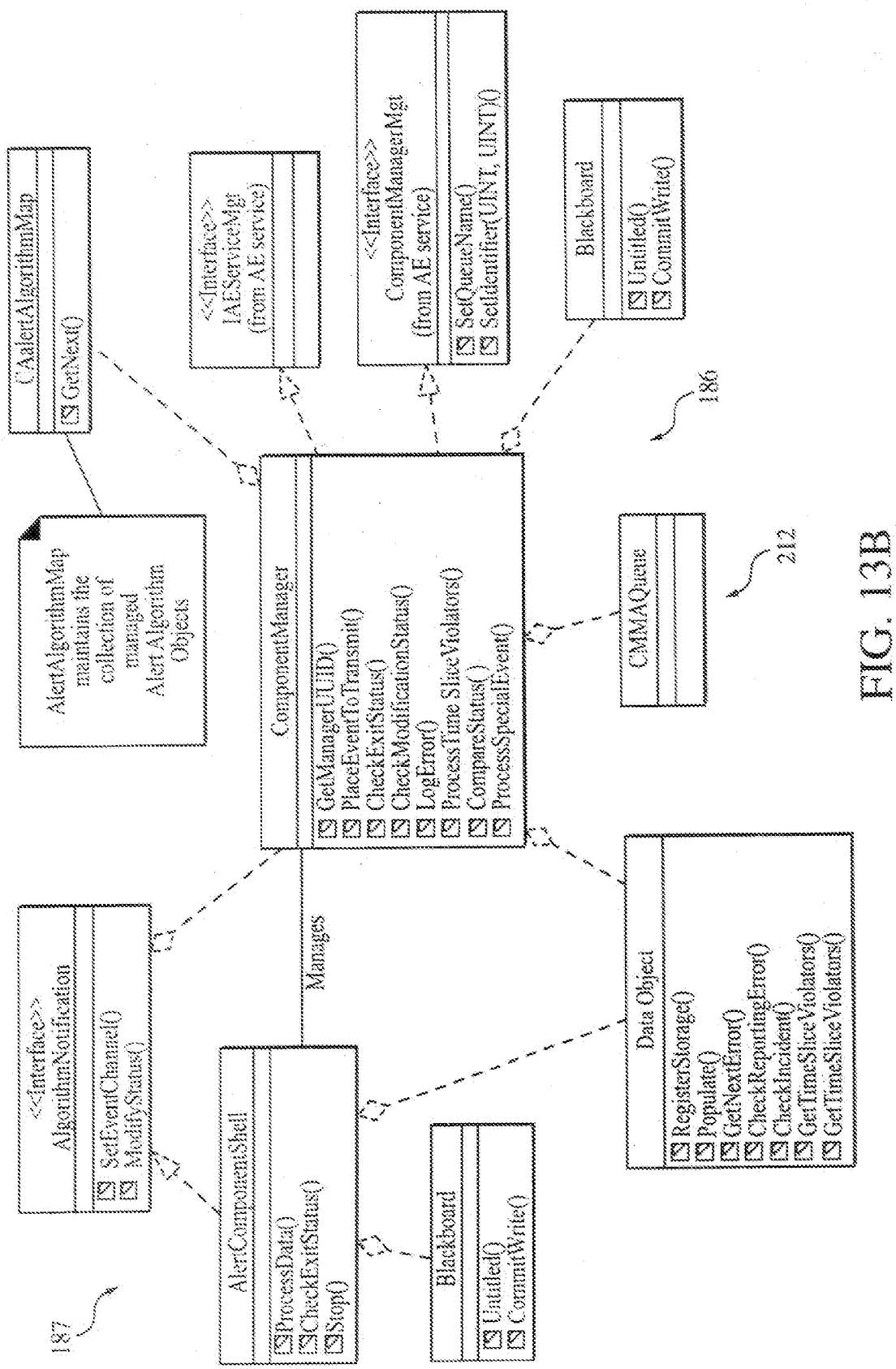
FIG. 13B is a class diagram for one embodiment of the execution stage of the program of FIGS. 11 and 12.
Figure 13C:
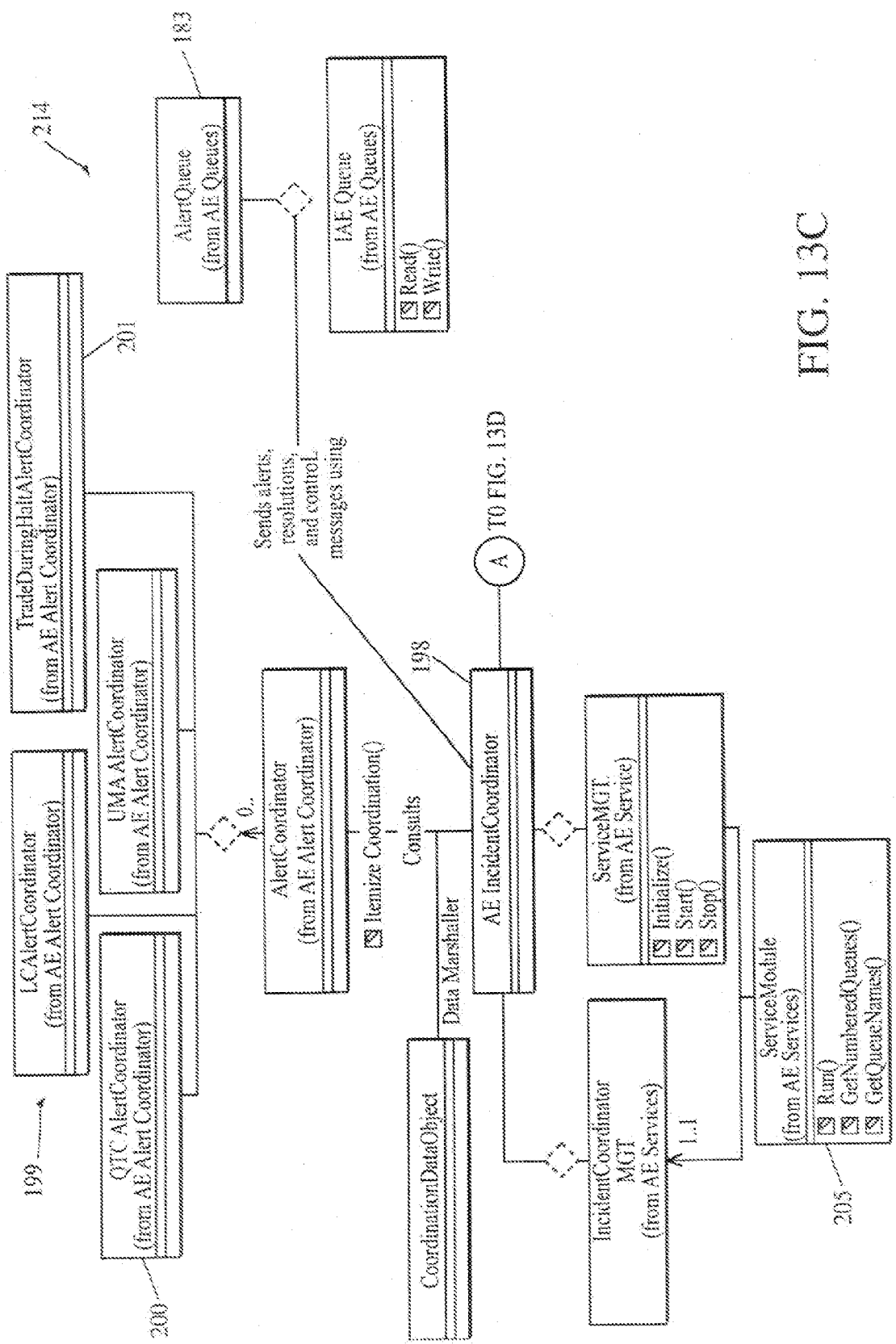
FIGS. 13C and 13D are a class diagram for one embodiment of the coordination stage of the program of FIGS. 11 and 12.
Figure 13D:
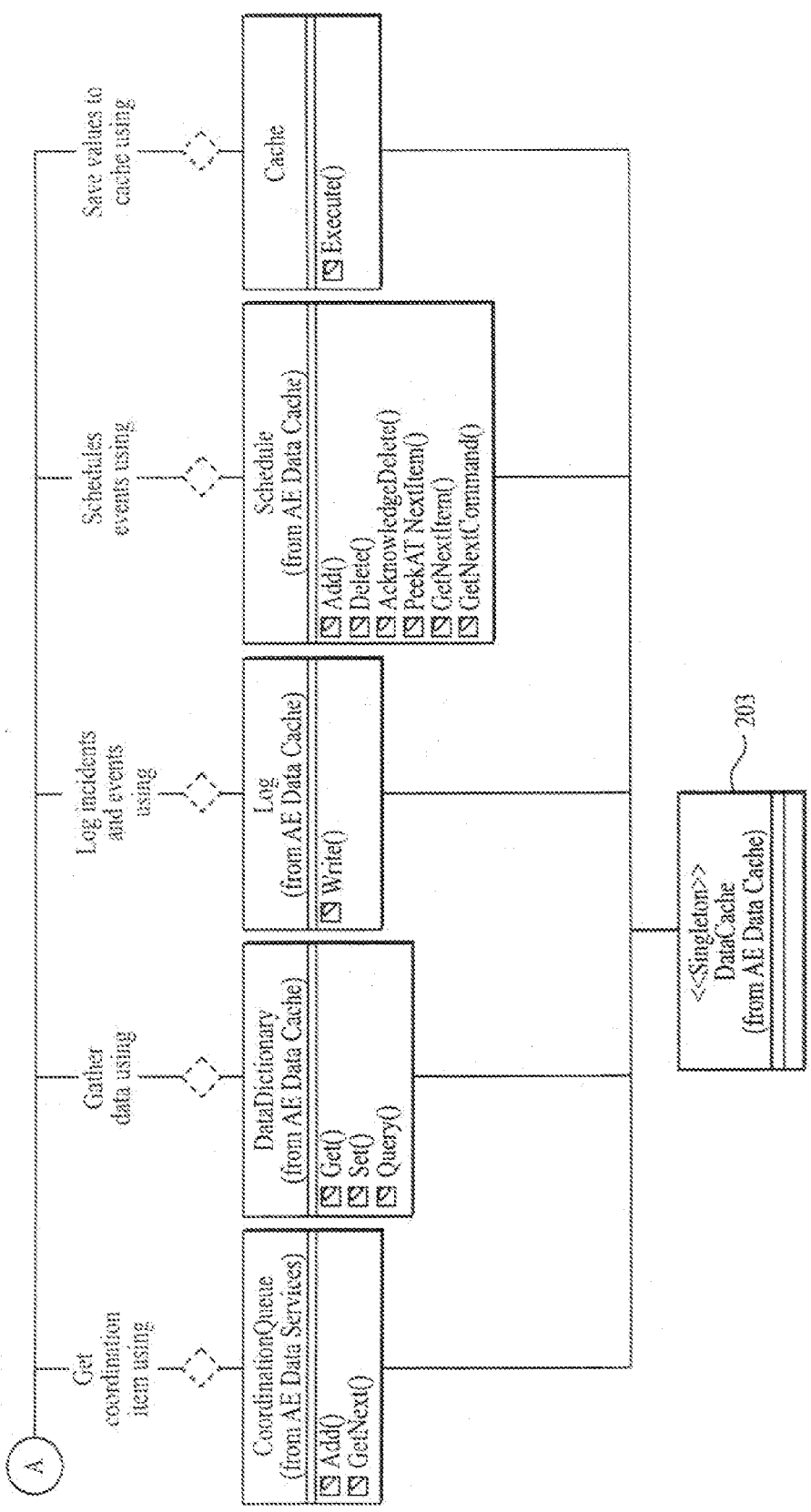

Referring to FIG. 13B and FIGS. 13C and 13D, class diagrams 212, 214 for one embodiment of the execution and coordination stages, respectively, are shown. The diagram 212 of the execution stage shows how a component manager object interacts with alert component objects. The diagram 214 of the coordination stage shows how an incident coordinator object interacts with coordinator component objects and a data cache object.

Figure 13E:
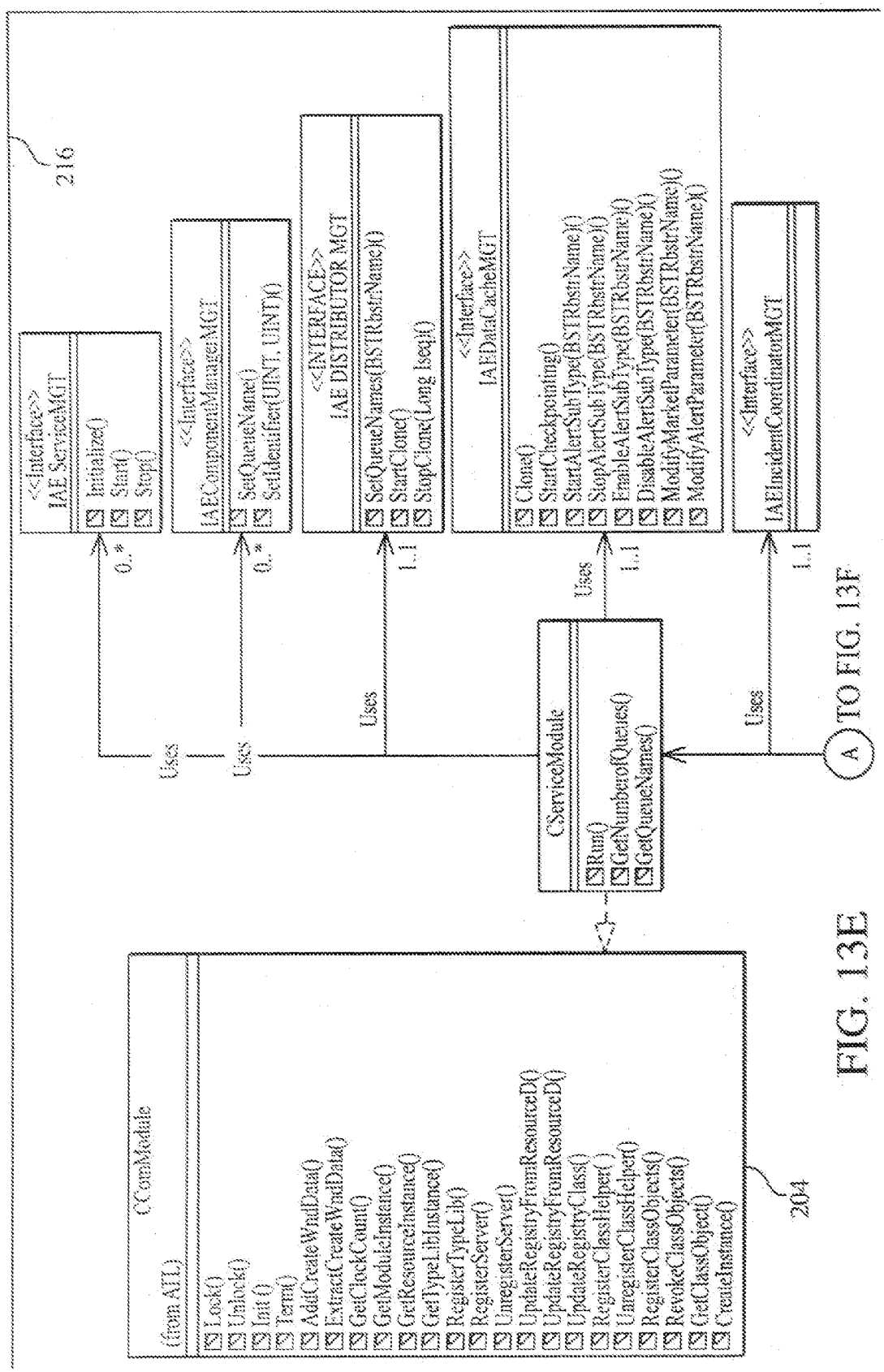
FIGS. 13E and 13F are a class diagram of one embodiment of the alert engine service object of the program of FIGS. 11 and 12.
Figure 13F:
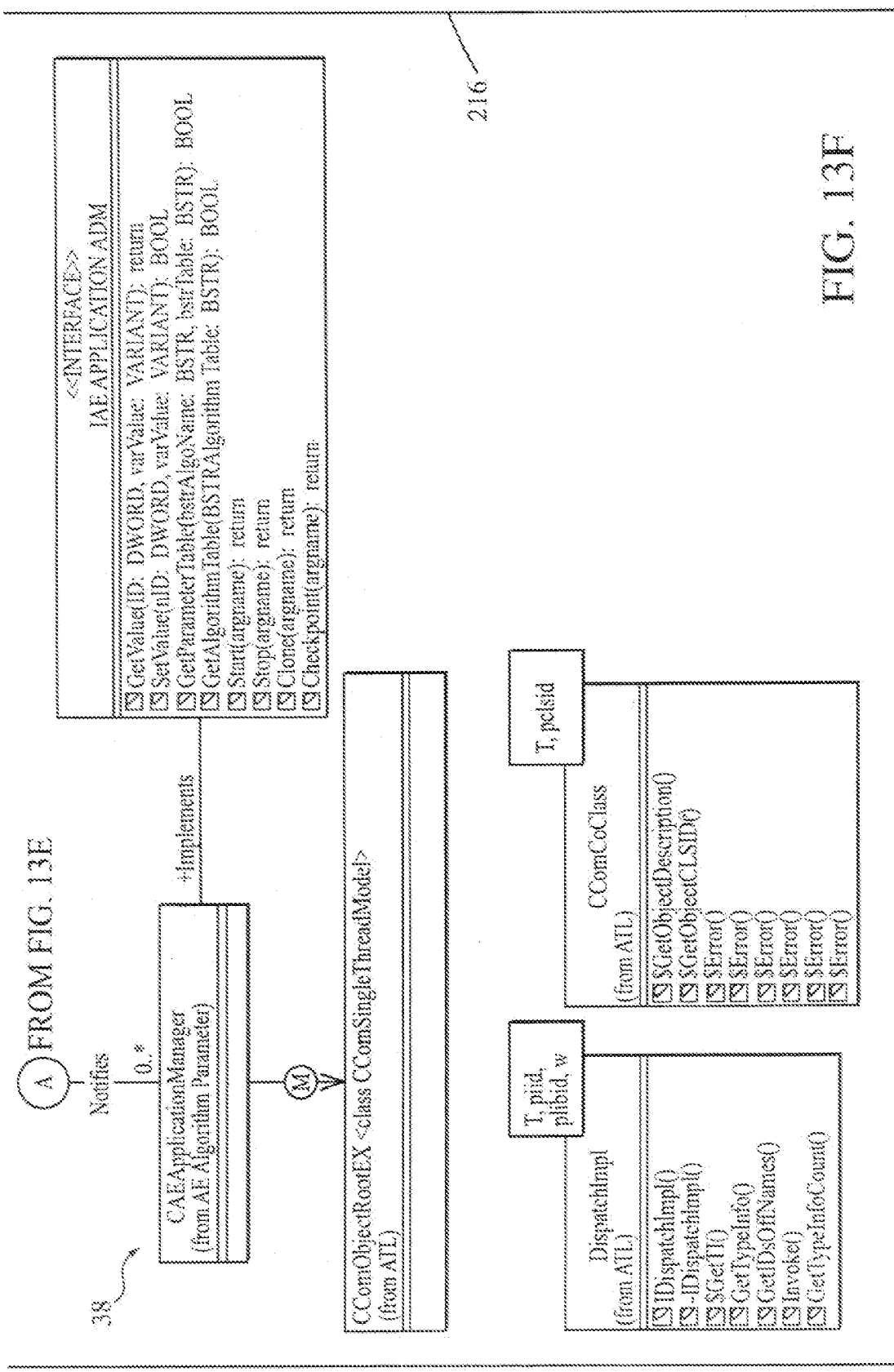

Referring to FIGS. 13E and 13F, a class diagram 216 for one embodiment of the alert engine service class is shown. The diagram 216 shows how the alert engine service object 205 interacts with management (Mgt) objects for the alert engine distributor 182, the component manager 186, the data cache 203, and the alert engine incident coordinator 198. The diagram also shows how the alert engine service object 205 interacts with the application manager object of the administrator workstation 38 shown in FIG. 1.

Figure 14:
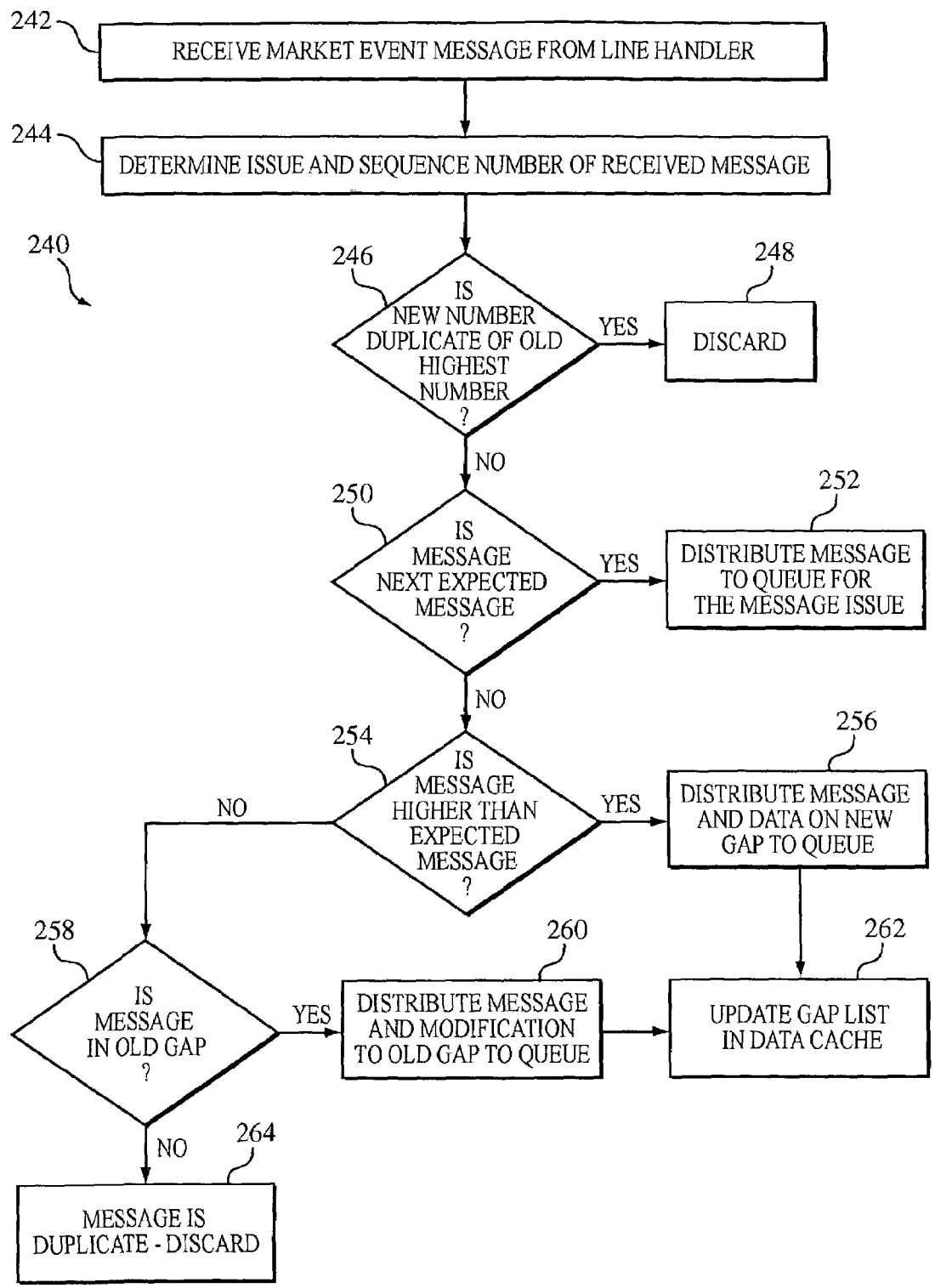
FIG. 14 shows a process by which the program of FIGS. 11-13D removes duplicate market event messages.

Referring to FIG. 14, a flow chart for a process 240, which the alert engine distributor 182 of FIGS. 11-13D uses to remove duplicate market event messages, is shown. New messages for market events are received 242 by the queue 181 from both line handlers 18, 18'. Since both line handlers 18, 18' send messages to each alert engine 20, 20', 20'', the alert engines 20, 20', 20'' can receive duplicate messages.

Referring again to FIG. 1A, duplicates messages can occur, because both line handlers 18, 18' monitor the feed lines 12 and generate market event messages independently. When both line handlers 18, 18' generate a market event message in response to the same incoming NQDS message a duplicate message is sent to the alert engines 20, 20', 20''. To avoid false alerts and inefficient use of analysts' time, the system 10 eliminates these duplicate market event messages internally in each alert engine 20, 20', 20'' as will be described below.

The system 10 generates duplicate messages for market events, because message duplication offers several benefits. One benefit of generating duplicate messages is that the line handlers 18, 18' are independent. This independence provides protection against breakdowns of either of the line handlers 18, 18'.

Another benefit is that generating duplicate messages can increase the throughput of messages for market events in the market monitoring system 10. The throughput depends on the timing of the publication of market event messages by the different line handlers 18, 18'. The publication timing depends on the arrival times of incoming messages at each line handler 18, 18' and on the efficiency of each line handler 18, 18'. The alert engines 20, 20', 20'' process the earlier or first received market event message and discard later received duplicates, thus increasing the overall throughput of market event messages.

The alert engine distributor 182 uses sequence numbers associated with each message to remove duplicates. The sequence number and issue identifier provide a unique identifier of the market event underlying the corresponding NQDS messages received by the line handlers 18, 18'. Thus, the alert engine distributor 182 starts duplicate removal by finding 244 the sequence number and issue identifier of each new message received from the line handlers 18, 18'.

Next, the alert engine distributor 182 checks 246 whether the new message has the same sequence number as the highest sequence number processed for the same issue. If these two numbers are the same, the new message is a duplicate, and the alert engine distributor 182 discards 248 the new message. Otherwise, the alert engine distributor 182 checks 250 whether the new message is the expected next message, that is whether the new message has the next highest sequence number for the issue. If the new message is the expected next message, the alert engine distributor 182 sends 252 the new message to the queue 184, 184', 184'' assigned to the message's issue. Each issue is assigned to one of the queues 184, 184', 184" so that the events for that issue are analyzed chronologically for alert detection and alert resolution.

If the new sequence number is not the number of the next expected message, the alert engine distributor 182 determines 254 whether the number is higher than the previous highest sequence number for the same issue. A new highest sequence number implies that the new message creates a new gap in message sequence numbers. In such a case, the alert engine distributor 182 writes 256 the new message and the identity of the new gap to the queue 184, 184', 184" for the message's issue. Otherwise, the alert engine distributor 182 determines 258 whether the new number is located in an old gap between sequence numbers of previously received messages. If the new number is in an old gap, the new message modifies one or more old gaps. The alert engine distributor 182 distributes 260 both the message and data on gap changes to the queue 184, 184', 184" for the message's issue. The gap data is subsequently written 262 to the data cache 203 by one of the component managers 186, 186', 186". This gap data provides reference points synchronizing the data cache 203 to the alert engine distributor 182. The alert engine distributor discards 264 any remaining messages, because they are duplicates of previously processed messages for the same market event.

Figure 15:
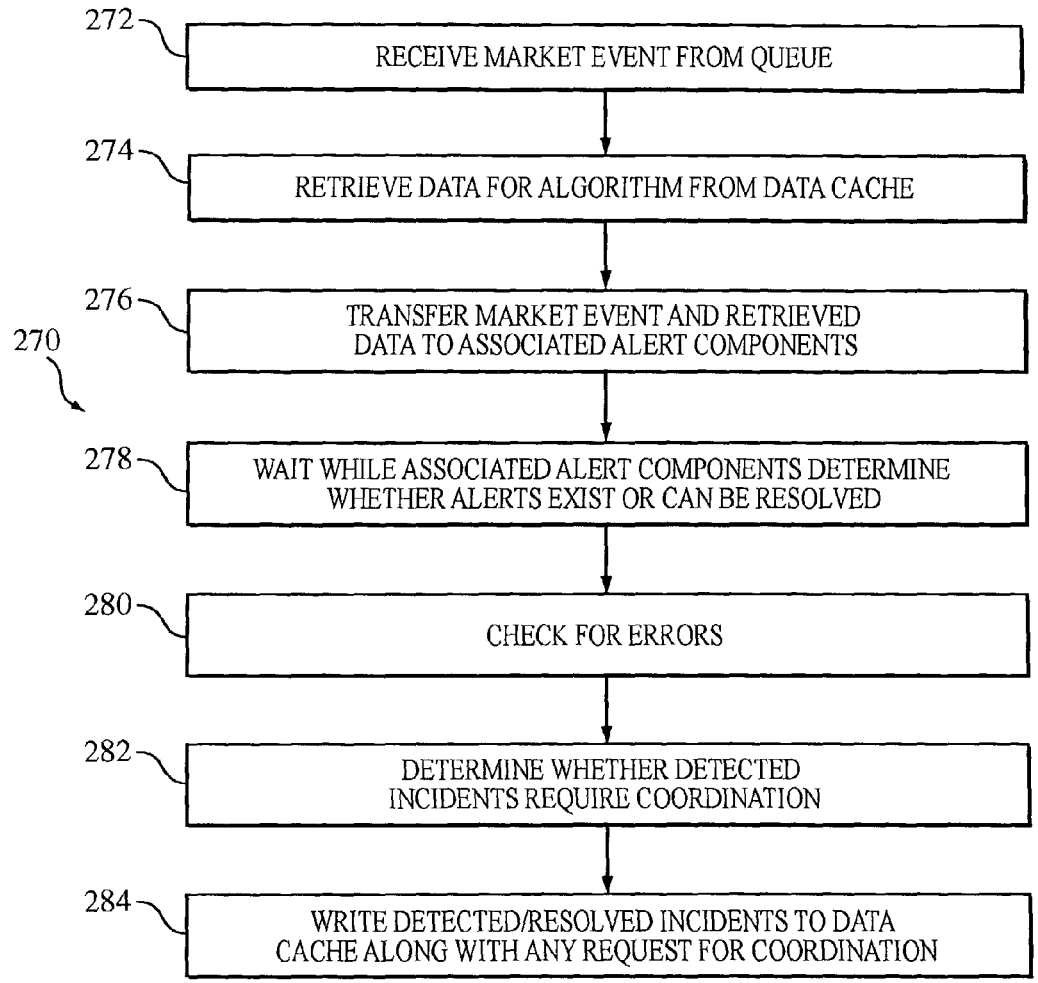
FIG. 15 shows a process by which the program of FIGS. 11-13D detects and/or automatically resolves alert conditions.

Referring to FIG. 15, a process 270 to detect and/or automatically resolve alert conditions is shown. Each component manager 186, 186', 186" receives 272 messages for new market event from the associated queue 184, 184', 184" in a first-in-first-out manner. After receiving a new market event, each component manager 186, 186', 186" retrieves 274 data from the data cache 203 for each active alert component 187-192 managed by the component manager 186, 186', 186". The retrieved data may depend on the algorithm employed by the monitored alert components 187-192, and/or individual parameter preferences for the algorithms.

The retrieved data may also depend on earlier market events processed by the program 180. This dependence on earlier events can provide coordination of alert detection and/or resolution between temporally separated market events. For example, the retrieved data may coordinate the earlier detection of a locked or crossed (L/C) market alert condition with subsequent alert detection suppressing new alerts generation for the same L/C market condition. The retrieved coordination data was written to the data cache 203 by the alert engine incident coordinator 198 prior to being retrieved therefrom by the component mangers 186, 186', 186".

The component managers 186, 186', 186" transfer 276 the market event and retrieved data to the alert components 187-192, as data objects. Each alert component 187-192 analyzes the market event to detect and/or resolve alert conditions according to a particular algorithm. The different alert components 187-192 for the same component manager 186, 186', 186" concurrently analyze the market event according to different algorithms, i.e., different alert scenarios.

The component managers 186, 186', 186" wait 278 until each associated alert component 187-192 analyzes the market event and returns a results object. The results objects indicate whether the market event corresponds to an alert condition or resolves a previously existing alert condition. The component managers 186, 186', 186" check 280 the results for time slice errors and then, decide 282 whether detected and/or resolved alert conditions require coordination with the analysis of later market events. If coordination is needed, the component managers 186, 186', 186" append requests for coordination to the results object. The component managers 186, 186', 186" write the results object 284 to the data cache 203. Any requests for coordination are written to a coordination queue 204, which is monitored by the alert engine incident coordinator 198.

The alert components 187-192 analyze the data according to algorithms for detecting different alert types. The alert types include L/C market conditions, quote trade comparison (QTC) conditions, trading halt conditions, and unusual market activity conditions and are discussed below. The definition of an alert type may depend on business and/or regulatory rules. Detection of an alert may trigger on values of quotes of market participants, trading prices and volumes, and other market related data, e.g., halt and trading hours. Dividends and splits, mergers, fast market conditions, emergency market conditions, thinly traded issues, and initial public offerings (IOP's) may also affect whether an alert condition is recognized. The alert components 187-192 generate alerts when properties exceed selected threshold values.

Figure 16:
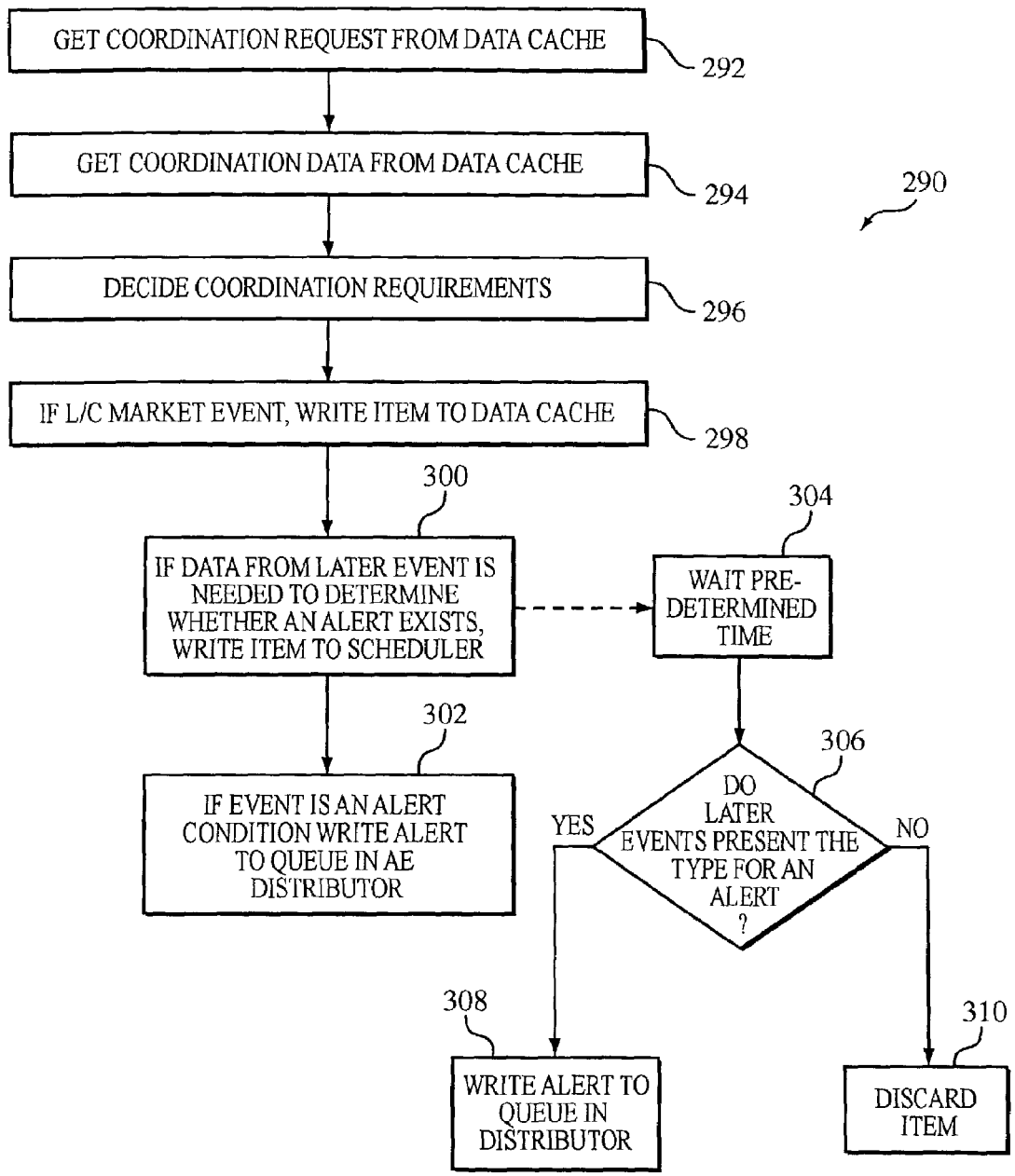
FIG. 16 shows a process by which the program of FIGS. 11-13D coordinates detections and/or automatic resolutions of alert conditions.

Referring to FIG. 16, a process 290 to coordinate alert detection and/or automatic resolution between different market events is shown. The process 290 to coordinate alert detection and/or automatic resolution starts when the alert engine incident coordinator 198 reads 292 a new coordination request from the coordination queue 204 in the data cache 203. Next, the alert engine incident coordinator retrieves 294 data from the data cache 203 so that the active coordinator components 199-202 can analyze the request. The alert engine incident coordinator 198 transmits both the coordination request and the retrieved data to the coordinator components 199-202.

The coordinator components 199-202 concurrently analyze the coordination request based on different alert scenarios. The different scenarios depend on business rules defining alert conditions and are described below. From the different alert scenarios, the coordinator components 199-202 determine 296 what coordination is required and transmit their determinations back to the alert engine incident coordinator 198. From the decisions of the coordinator components 199-202, the alert engine incident coordinator 198 determines 296 the form of the coordination.

In response to a L/C market alert condition, the alert engine incident coordinator 198 writes 298 an item to the data cache 203. The item written to the data cache 203 implements business rules requiring that later received market event messages not generate additional alerts for the same L/C market condition. When a later market event message is received, the component managers 186 retrieves data for the associated alert components 186-190 from the data cache 203. For the L/C market alert component 187, the retrieved data includes the item for the L/C market condition, which was written to the data cache 203 by the alert engine incident coordinator 198. The detection of subsequent the L/C market alert conditions by the L/C market alert component 187, then depends on the item retrieved from the data cache 203. In particular, the item impedes the L/C market alert component 187 from report the previously detected L/C market condition a second time.

If one of the coordinator components 199-202 determines that later market events must be analyzed to decide whether an alert condition exists, the alert engine incident coordinator 198 writes an item to a scheduler 197. The scheduler 197 executes an independent thread, which monitors the data cache 203 for an event type selected by the alert engine incident coordinator 198 through the item written in the scheduler 197. An occurrence of the selected event type in light of the original market event indicates an alert condition. For example, the original event may be a L/C market condition, and the selected event type may be a detection of the same L/C market condition at a time later than a threshold value after the original detection of the L/C market condition. Such a coordination requirement ensures that L/C market conditions generate alerts only if the conditions persist longer than the threshold value.

The scheduler 197 waits 304 a time equal to the threshold value and determines 306 whether the fixed event type has occurred by reading data in the data cache 203. If an event of the fixed type has occurred, the scheduler 197 writes 308 an alert to the alert queue 183 in the alert engine distributor 182. If no events of the fixed type have occurred, the scheduler 197 discards 310 the item.

Finally, if the coordinator components 199-202 indicate that an alert condition exists, the alert engine incident coordinator writes 302 an alert directly to the alert queue 183. The distributor 182 subsequently sends the alert to the alert dispatchers 22, 22' for transmission to the analysts workstations 36, 36', 36".

If the coordinator components 199-202 decide that an alert has been resolved, the alert engine incident coordinator 198 sends resolution data to a tracking storage device, e.g., the database 26 of FIG. 1A and to the data cache 203. If the coordinator components 199-202 decide that no alert, alert resolution, or potential future alert is present, the alert engine incident coordinator 198 discards the coordination request.

Figure 17A:
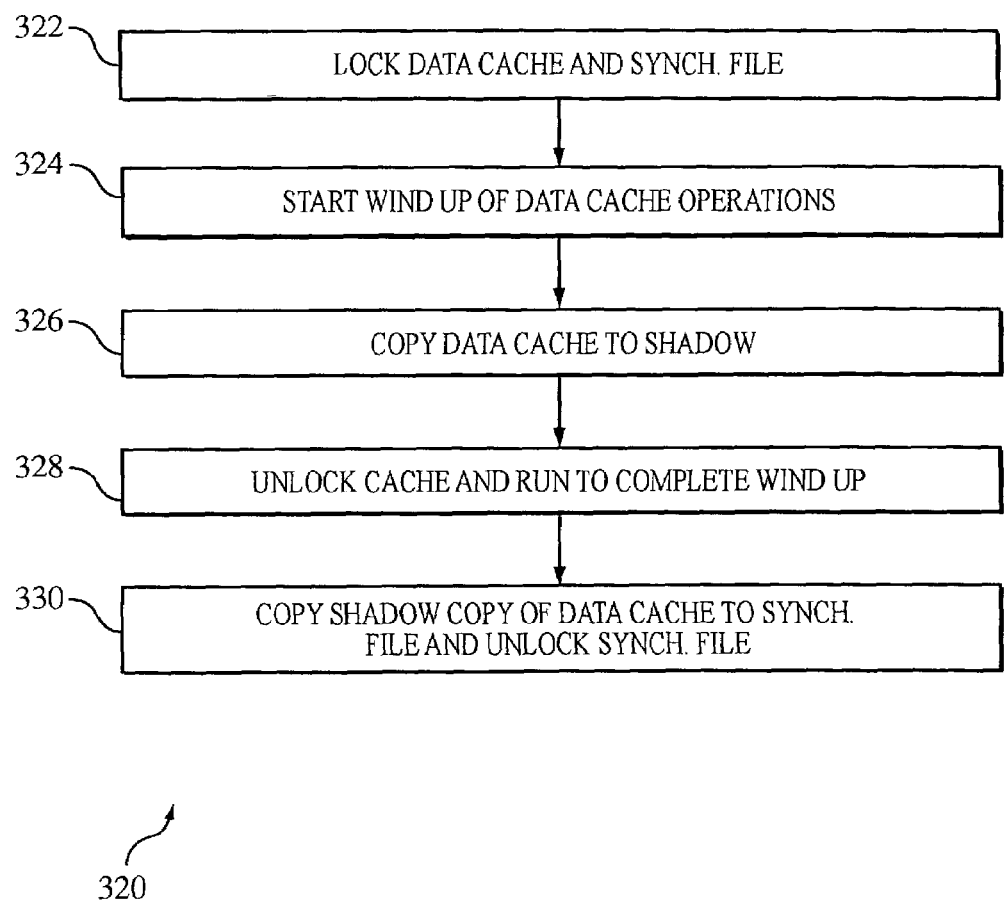
FIG. 17A shows a process for synchronizing the data cache with other program objects shown in FIGS. 11-13D.

Referring to FIG. 17A, a process 320 for synchronizing the data cache 203 with other objects of the process 180 of FIGS. 11-13D is shown. The alert engine service object 205 locks 322 both the data cache 203 and a synchronization file (not shown) to accesses by other program objects. The process 180 winds up 324 overdue operations in the data cache 203 and copies 326 the state of the data cache 203 to a shadow file. The processor 180 unlocks 326 the data cache 203 and runs 328 normally for a time period of predetermined length to complete wind up. At the end of the time period, the program copies 330 the shadow of the data cache 203 to the synchronization file and unlocks 332 the synchronization file and the data cache 203.

Figure 17B:
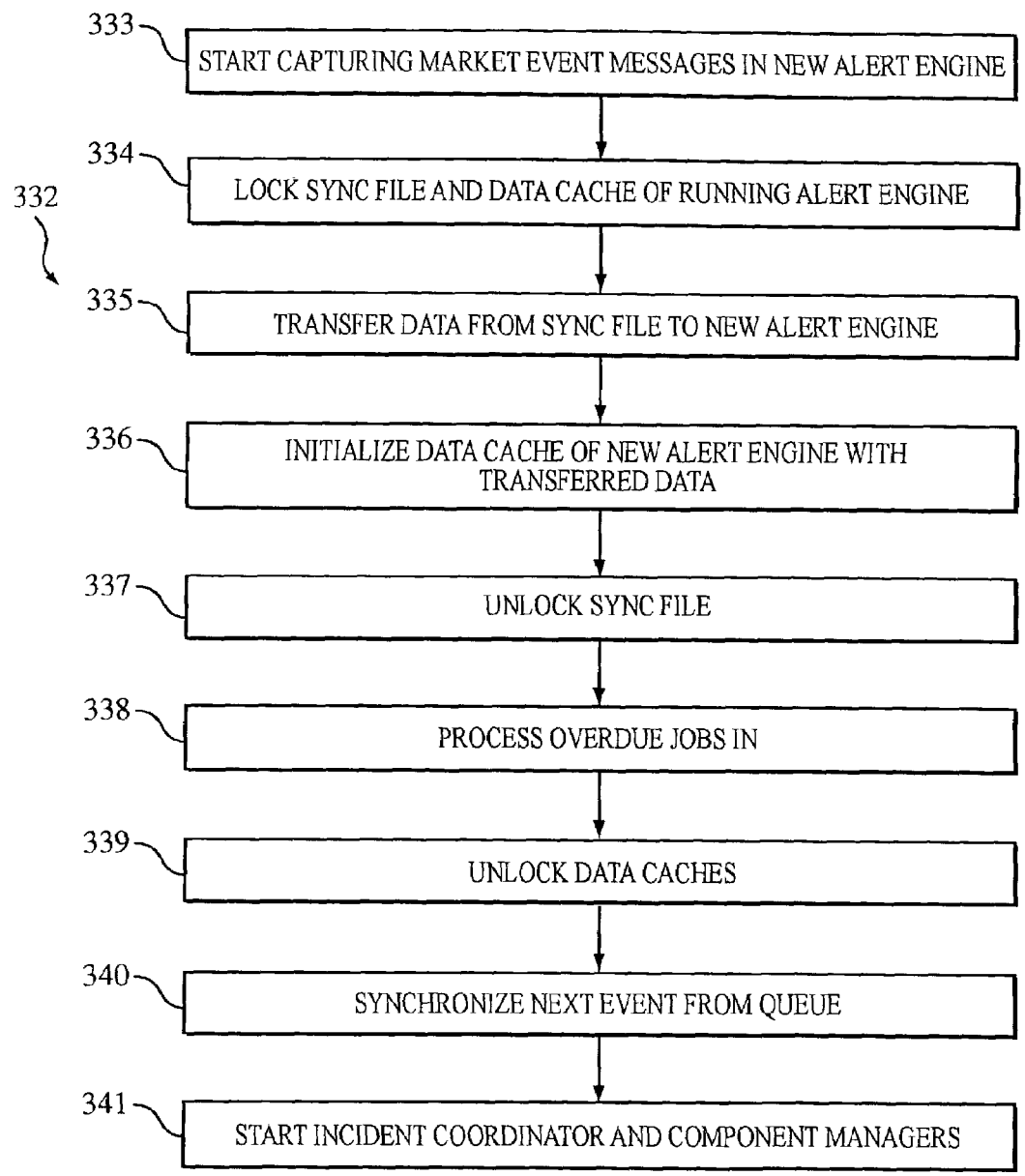
FIG. 17B shows a process for producing a new alert engine from a running alert engine of FIG. 1A.

Referring to FIG. 17B, a process 332 for starting a new alert engine, i.e., the alert engine 20 of FIG. 1A, is shown. The process 332 clones the state of the new alert engine 20 from the state of a running alert engine, i.e., the alert engine 20' using the private network 24. Cloning loosely synchronizes the state of the new alert engine 20, at start up, to the state of the running alert engine 20'.

The new alert engine 20 starts capturing 333 market event messages from the private network 24. When a checkpoint arrives, the running alert engine 21 locks 334 its sync file and data cache 203. The running alert engine 20' transfers 335 data from an internal sync file (not shown) to the new alert engine 20 via the private network 24. The sync file contains a copy of the data cache 203' of the running alert engine 20'. The transferred data initializes 336 the data cache 203 of the new alert engine 20'. Thus, the transferred data loosely synchronizes the data caches 203 of both alert engines 20, 20'. After the transfer, the sync file of the running alert engine 20' is unlocked 337. The running alert engine 20 processes 338 any overdue jobs. The data caches of both alert engines 20, 20' are unlocked 339. The component managers 186, 186', 186" can process market events when the data cache 203 is unlocked. The new alert engine 20 synchronizes 340 the next market event message in the queue 181 to be the next market event message for running alert engine 20'. Finally, the incident coordinator 198 and component mangers 186, 186', 186" of the new alert engine start up 341.

Alert Dispatcher

Referring again to FIG. 1A, the delivery stage 16 uses redundancy to provide fault tolerance. Redundancy is implemented by two identical copies of alert dispatchers 22, 22'. The two alert dispatcher 22, 22' independently process messages received from each alert engine 20, 20', 20" delivering alerts and alert resolutions to the analyst workstations 36, 36', 36" and writing alerts, alert resolutions, events, and incidents to the database 26. If one alert dispatcher 22, 22' fails, the remaining alert dispatcher 22, 22' continues to process message from all of the alert engines 20, 20', 20".

Figure 18:
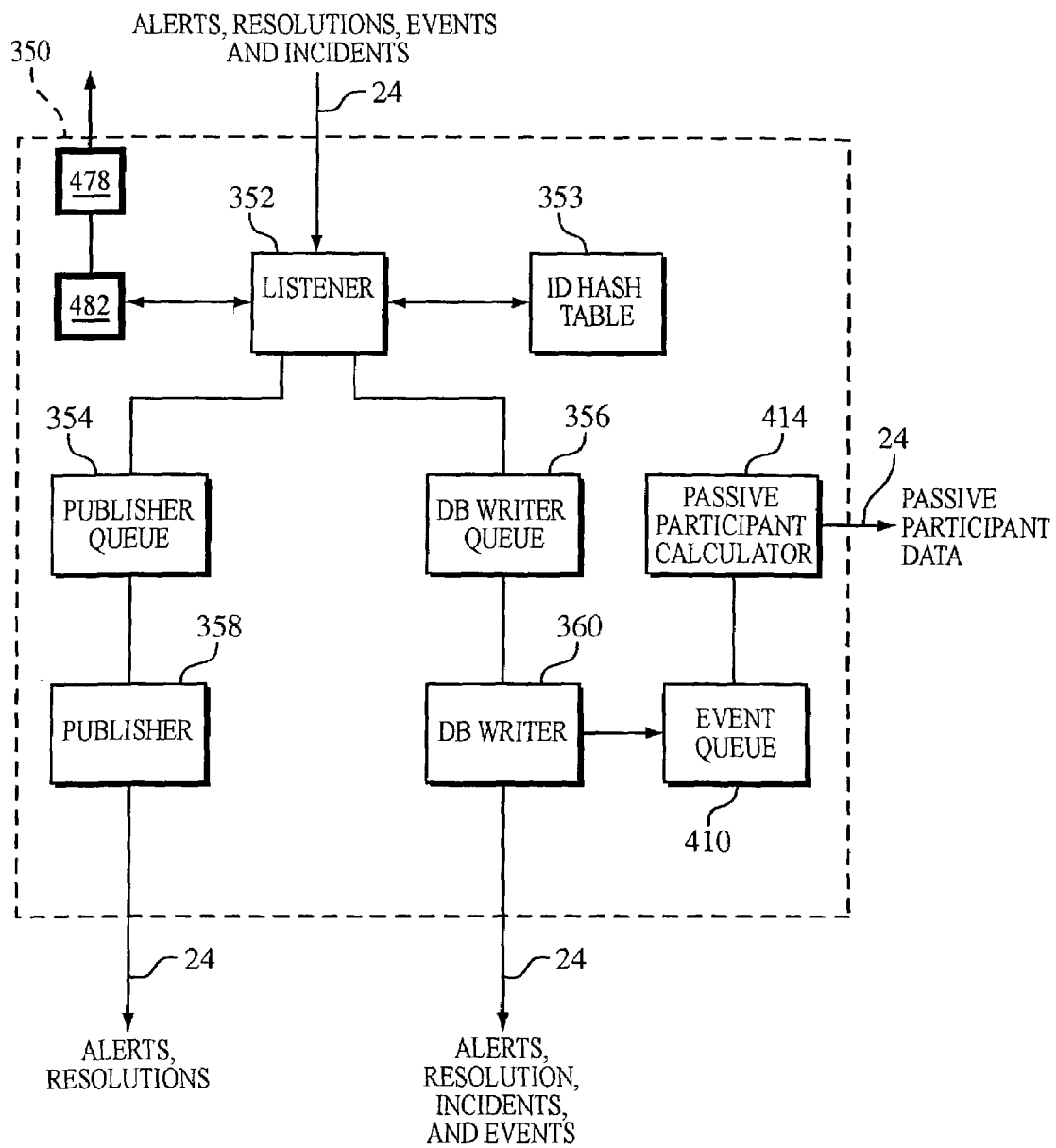
FIG. 18 is a high-level block diagram of a software program for alert dispatchers of FIG. 1A.

Referring to FIG. 18, the flow of messages for alerts, alert resolutions, events, and incidents through each alert dispatcher 22, 22' is shown. A program 350 processes each received message. The program 350 includes a listener object 352 for receiving messages for alerts, alert resolutions, events, and incidents from the alert engines 20, 20,' 20". The listener object 352 writes the received messages for alerts and alert resolutions to a publisher queue 354 and messages for alerts, alert resolutions, events, and incidents to a database (DB) writer queue 356. The publisher queue 354 stores a message until a publisher object 358 publishes the message for the analyst workstations 36, 36', 36". The DB writer queue 356 stores a message until a DB writer object 360 writes the message to the database 26.

Figure 19:
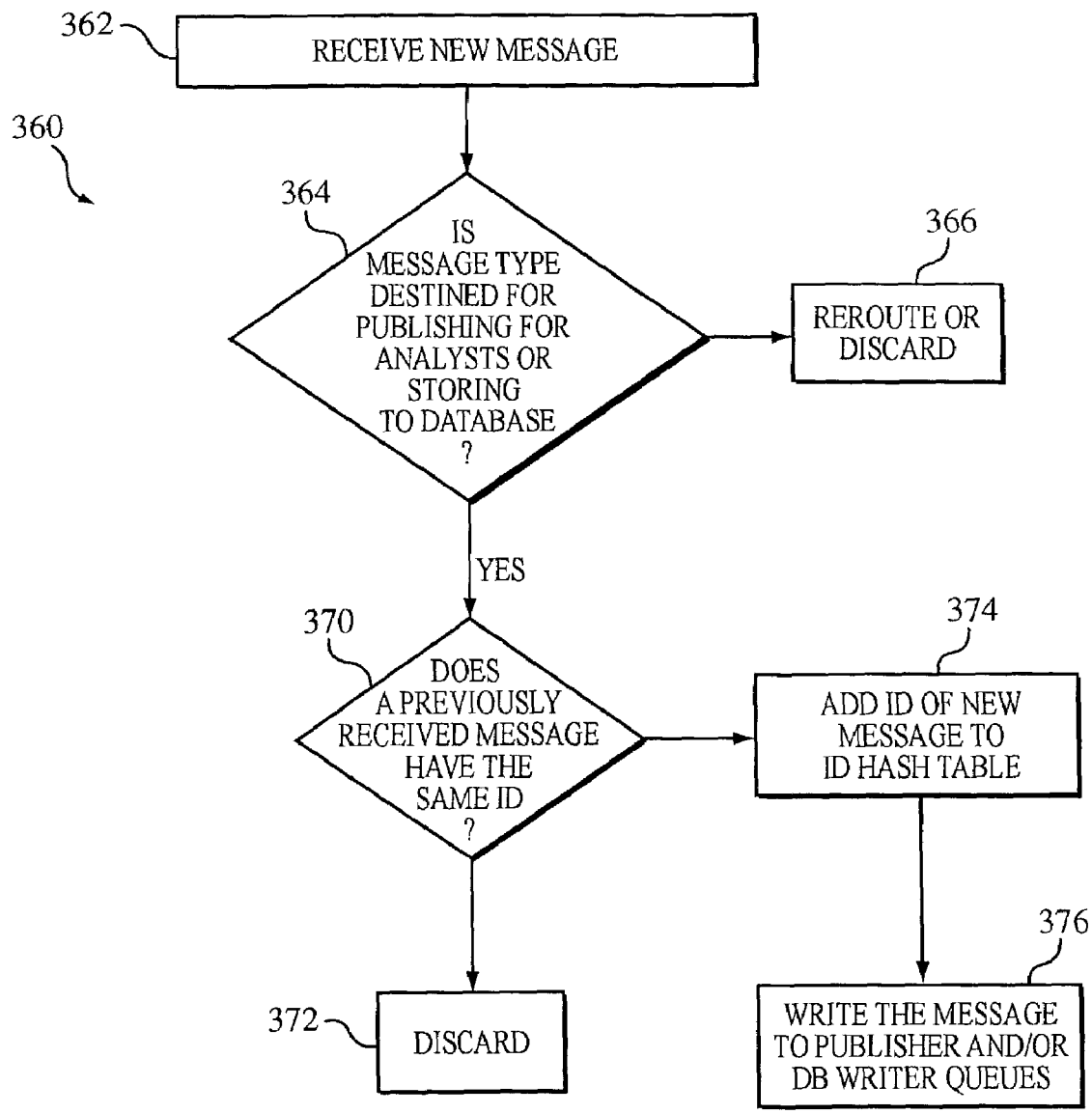
FIG. 19 shows a process by which the alert dispatchers of FIGS. 1A and 18 receive alerts and automatic alert resolutions.

Referring to FIG. 19, a process 360 by which the listener object 352 receives messages from the alert engines 20, 20', 20" is shown. The listener object 352 receives 362 each new message via an interface of the alert dispatcher 22, 22' connecting to the private network 24. Each received message may belong a variety of message types sent to the alert dispatcher 22, 22'. These message types include alerts, alert resolutions, incidents, events, and closures of events requests. The listen object 352 determines 364 whether the received message is a type destined for publication to analyst workstations 36, 36', 36" and/or for storage to the database 26. Alerts and alert resolutions are destined for publication to analysts and other external users, and alerts, alert resolutions, events, closures of events, and incidents are destined for storage in the database 26. Other types of messages are discarded 366.

Each message destined for publication or storage carries an identifier (ID) uniquely identifying the market event to which the message corresponds. The ID comes from the original incoming message's sequence number. Thus, the ID is assigned by an external source and is independent of the line handler 18, 18' that received the original incoming message.

The listener object 352 determines 370 whether a previously received message has the same unique ID as a newly received message. The determination includes comparing the ID of the newly received message to a list of ID's stored in an ID hash table 353 (FIG. 18). The ID hash table 353 is a first-in-first-out software buffer that lists the ID's of recently received messages. The ID of the newly received message may duplicate the ID of a previously received message if the two messages were generated by different alert engines 20, 20', 20" in response to the same market event message. If a previously received message has the same ID, the listener object 352 discards 372 the newly received message. If the newly received message has a new ID, the listener object 352 appends 374 the new ID to the list of ID's in the ID hash table 353. The listener object 352 writes 376 a non-duplicate newly received message to the publisher and/or DB writer queues 354, 356 depending on the message type as has been described above.

Figure 20:
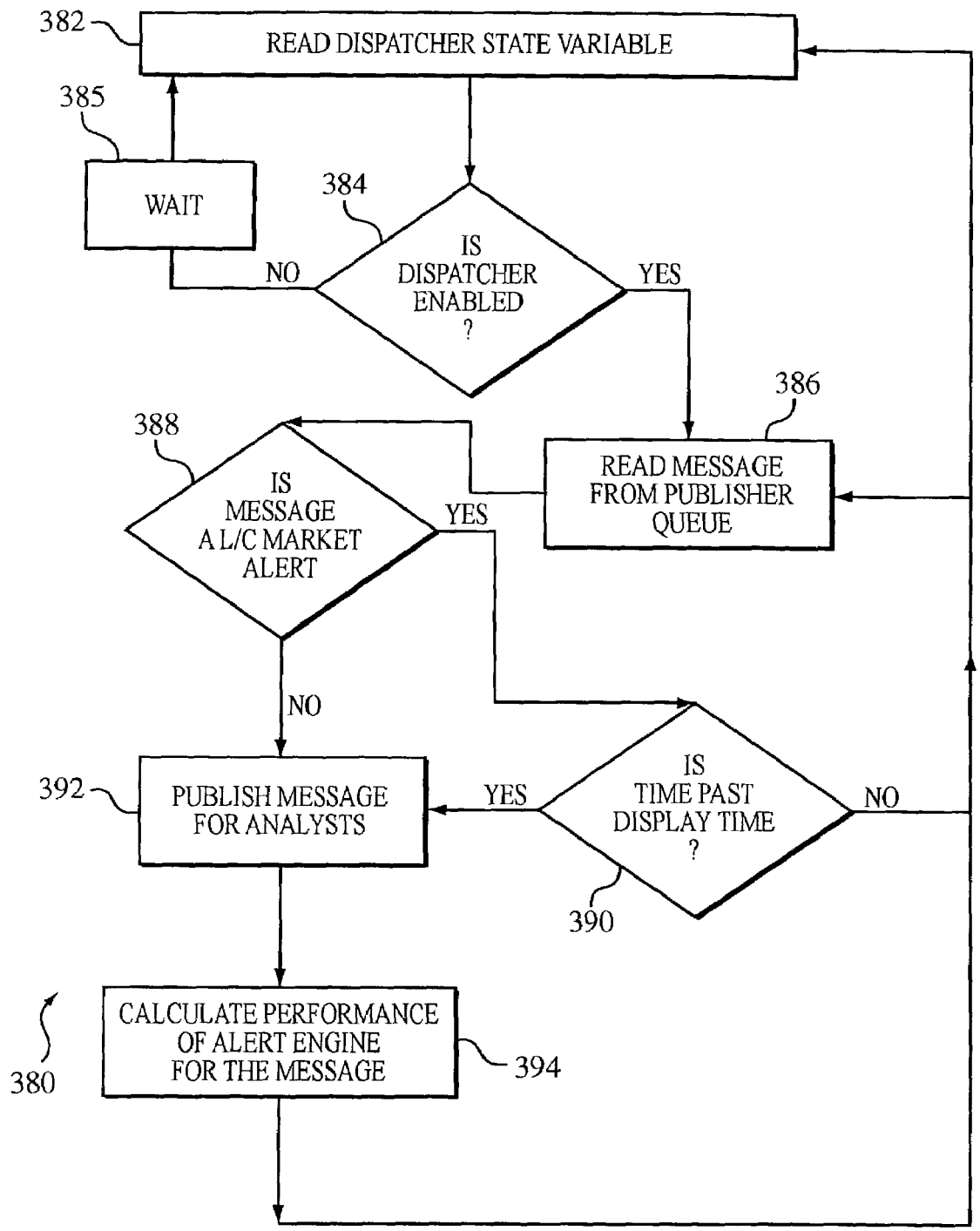
FIG. 20 shows a process by which the alert dispatchers of FIGS. 1A, 18-19 publish received alerts and alert resolutions for analysts.

Referring to FIG. 20, a process 380 by which the alert dispatchers 22, 22' publish alert and alert resolution messages for analyst workstations 36, 36', 36" is shown. The process 380 starts when the publisher object 358 reads a registry location 386 for the value of a dispatcher state variable.

The value of the dispatcher state variable is the same for both alert dispatchers 22, 22' and determines whether the market monitoring system 10 is enabled. If the dispatcher state variable has the value "enabled", the alert dispatcher 22, 22' can both publish and store messages. If the dispatcher state variable has the value "disabled", the alert dispatcher 22, 22' can neither publish nor store messages. In the disabled state, neither analysts nor the database 26 receive new data from either of the alert dispatchers 22. 22' of the market monitoring system 10.

The market monitoring system 10 may be disabled during a breakdown or a maintenance procedure. To disable the market monitoring system 10, an administrator uses one of the workstation 38, 38' and global network 35 to store the value "disabled" to the dispatcher state variables of both alert dispatchers 22, 22'. The market monitoring system 10 remains disabled until the administrator subsequently writes the value "enabled" to the dispatcher state variable of at least one of the alert dispatchers 22, 22'.

If the dispatcher state variable has the value disabled, the publisher object 358 waits 385 a time period of preselected length and reads 382 the dispatcher state variable again.

If the dispatcher state variable has the value "enabled", the publisher object 358 reads 386 the next message from the publisher queue 354. The publisher object 358 determines 388 whether the read message is an alert for a L/C market condition. L/C market alerts are published after a preselected display time. If the alert is a L/C condition, the publisher object 358 reads the associated display time and determines 390 whether the actual time is later. If the actual time is earlier, the publisher object 358 stores the message and reads 386 the next message in the publisher queue 354.

If the actual time is later than the display time or the message does not correspond to an L/C alert, the publisher object 358 publishes 392 the open L/C alerts that were previously stored and the message on the private network 24 for the analyst workstations 36, 36', 36". The publisher object 358 also calculates 394 performance data on the time required to deliver the message to the analyst workstations 36, 36', 36". The publisher object 358 returns to read the next message from the publisher queue 354.

Periodically, the publisher object 358 returns to reread the dispatcher state variable to determine whether the market monitoring system 10 is still enabled. These rereads occur at predetermined time intervals.

Figure 21:
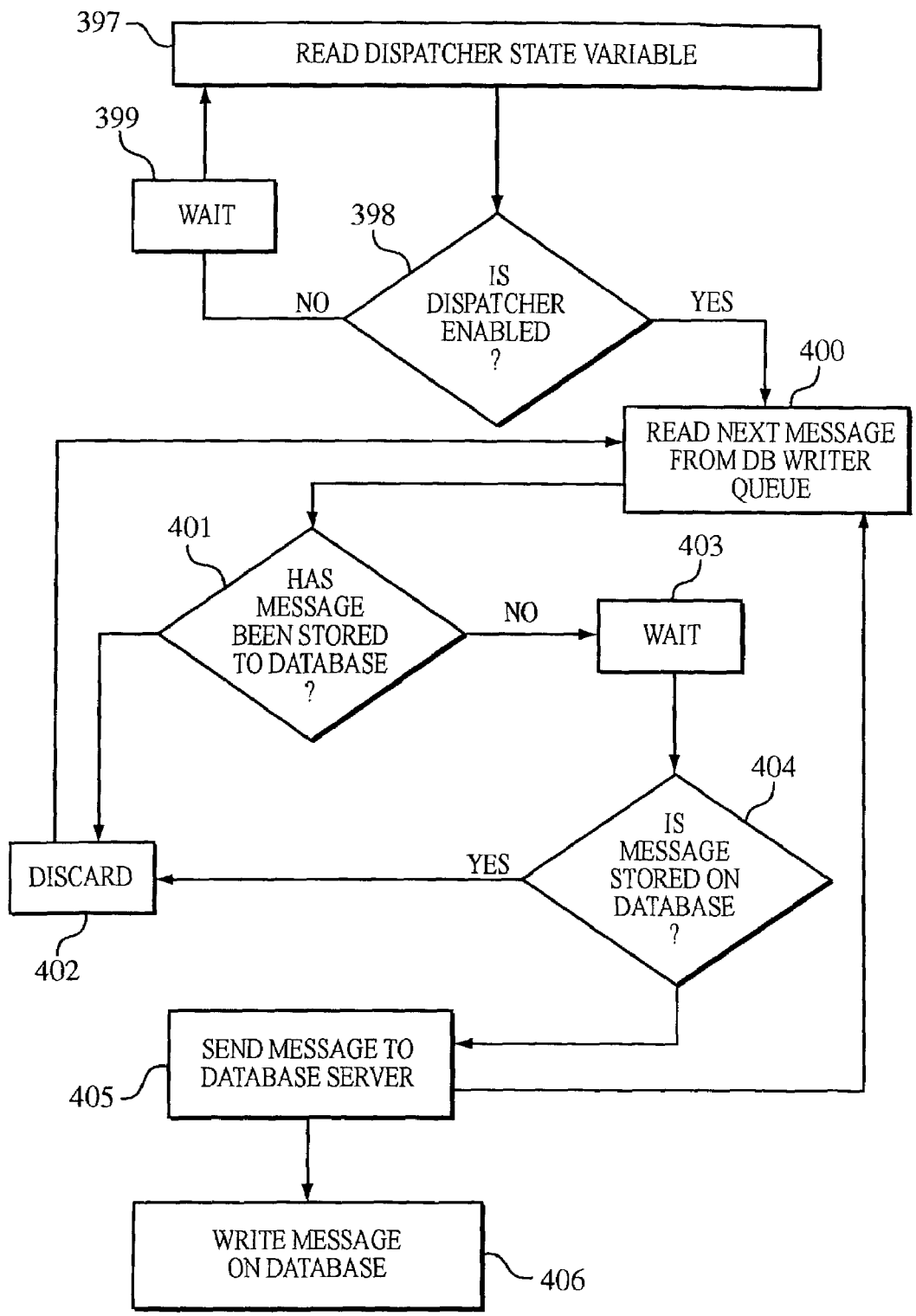
FIG. 21 shows a process by which the alert dispatchers of FIGS. 1A, 18-20 write received alerts and alert resolutions to a database.

Referring to FIG. 21, a process 396 by which the alert dispatchers 22, 22' write messages to the database 26 is shown. The write process 360 also starts by an object, i.e., the DB writer object 360, reading 397 the dispatcher state variable. The DB writer object 360 determines 398 whether the dispatcher state variable has the value "enabled" or the value "disabled". If the value is disabled, the DB writer object 360 waits 399 a time period of preselected length and reads 394 the dispatcher state variable again.

If the dispatcher state variable has the value "enabled", the DB writer object 360 reads 400 the next message from the DB writer queue 356. The DB writer object 360 checks 401 whether the message has already been stored to the database 26 by reading of the database 26 for duplicates. Duplicates can occur due to the redundancy of the alert dispatchers 22, 22'. Both alert dispatchers 22, 22' receive the same messages from the alert engines 20, 20', 20" and can attempt to store duplicate alerts, alert resolutions, events, and/or incidents corresponding to the same market event.

If the read finds a duplicate on the database 26, the DB writer object 360 discards 402 the message. The DB writer 360 returns to read 400 of the next message from the DB writer queue 356.

If the read does not find a duplicate stored on the database 26, the DB writer object 360 waits 403 a preselected time, to allow messages in destined for the database to be stored. These messages can include writes to the database 26 by the other alert dispatcher 22, 22'. The DB writer object 360 rechecks whether the message is now stored on the database 26, i.e., duplicated. If the message is duplicated on the database 26, the DB writer object 360 discards 402 the message and returns to read 400 the next message from the DB writer queue 356. Otherwise, the DB writer object 360 sends 405 the message to the data base 26 via the private network 24. The database server 30, 30' writes 406 the message in the database 26 and returns 406 a signal to the alert dispatcher 22, 22' indicating a successful store. The DB writer 360 also writes the message to an event queue 410 (FIG. 18). After a preselected time interval, the DB write object returns to reread 397 the dispatch variable.

Figure 22:
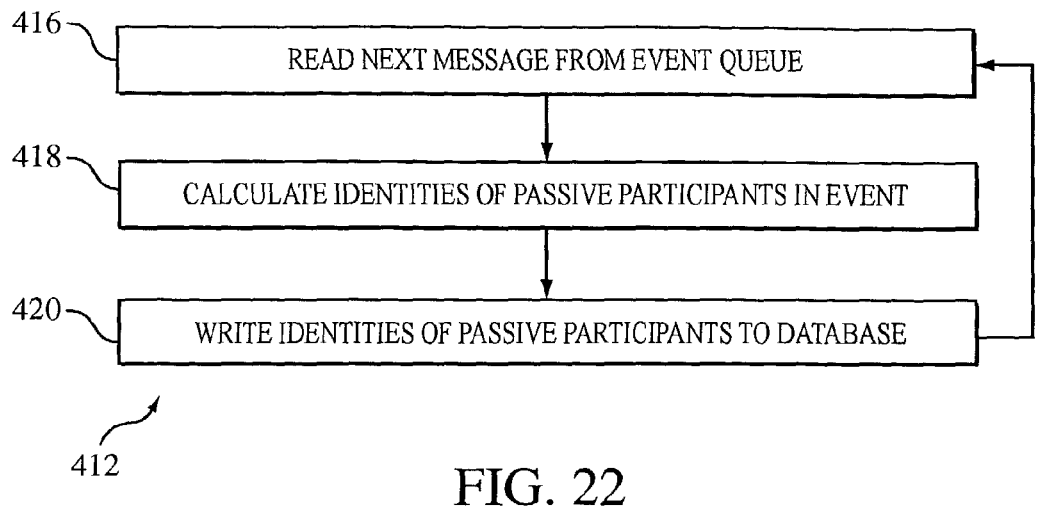
FIG. 22 shows a process by which the alert dispatchers of FIGS. 1A, 18-21 determine the identities of passive participants in an alert.

Referring to FIG. 22, a process 412 by which the alert dispatchers 22, 22' identify passive participants in alert conditions is shown. A market participant is a passive participant if his or her acts can trigger an alert, but did not trigger an alert. For example, a passive participant in a L/C condition has posted a quote price that locks or crosses the market. But, the locked or crossed condition happened due to an act of another market participant, i.e., the other market participant caused the alert by changing his or her quote. The market participant who triggered the alert is an active participant.

To detect passive participants, a passive participant calculator object 414 reads 416 a message from the event queue 410. The passive participant calculator object 414 uses one or more algorithms for calculating 418 which market participants are passive participants. The algorithms depend on the type of alert condition. For a L/C market condition, the algorithm determines whether any market participants have posted quotes that lock or cross an inside quote for the security provoking the alert condition. The passive participant calculator object 414 writes 420 the identities of passive participants to the data base 26 so that analysts accessing the alert can view the identities of passive participants. After writing the identities to the database 26, the passive participant calculator object 414 loops back to get 416 the next message from the event queue 410.

Performance Monitoring

Referring to FIG. 1A, the market monitoring system 10 produces health data and message flow data on the individual servers of the stages 14-16. The health data provides indicates process failures. The message flow data includes statistical data on message throughputs.

In stages 14-16, each physical server executes a system monitor object, e.g., the object 430 of FIG. 3, that tracks selected software components therein. Each selected component regroups processes and has been chosen for failure monitoring. The regrouped processes perform, at least, one special cyclic execution thread that writes a heartbeat message to the system monitor. Cyclic writes of the heartbeat message indicate that the component is functioning. The system monitor consolidates heartbeat messages for transmission to the operations server 32 via the private network 24.

Figure 23:
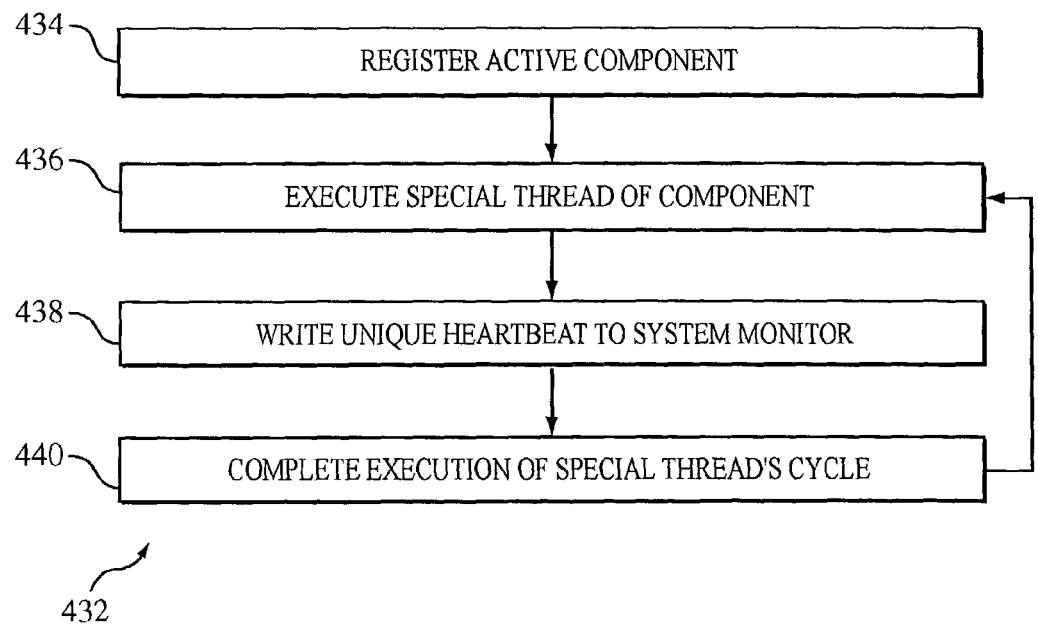
FIG. 23 shows a process for tracking the health of a selected software component running on one of the servers shown FIG. 1A.

Referring to FIG. 23, a process 432 for tracking the health of a selected component is shown. At activation, the selected component is registered 434 in a registry location of the line handler 18, 18', alert engine 20, 20', 20", or alert dispatcher 22, 22'. The registry location records a unique heartbeat message assigned to the selected component. As the selected component runs, the special cyclic thread of the selected component executes 436. While executing the special cyclic thread, the execution thread writes 438 the assigned heartbeat message to the system monitor. The special thread completes 440 its cycle and starts to execute the next cycle.

As long as a component is active, the component's special thread regularly writes a heartbeat message to the system monitor. If the system monitor stops receiving heartbeat messages, the component has stopped running. When the selected software component is deactivated, its heartbeat message is unassigned so that the monitoring system does not mistakenly believe that the component has malfunctioned.

Figure 24:
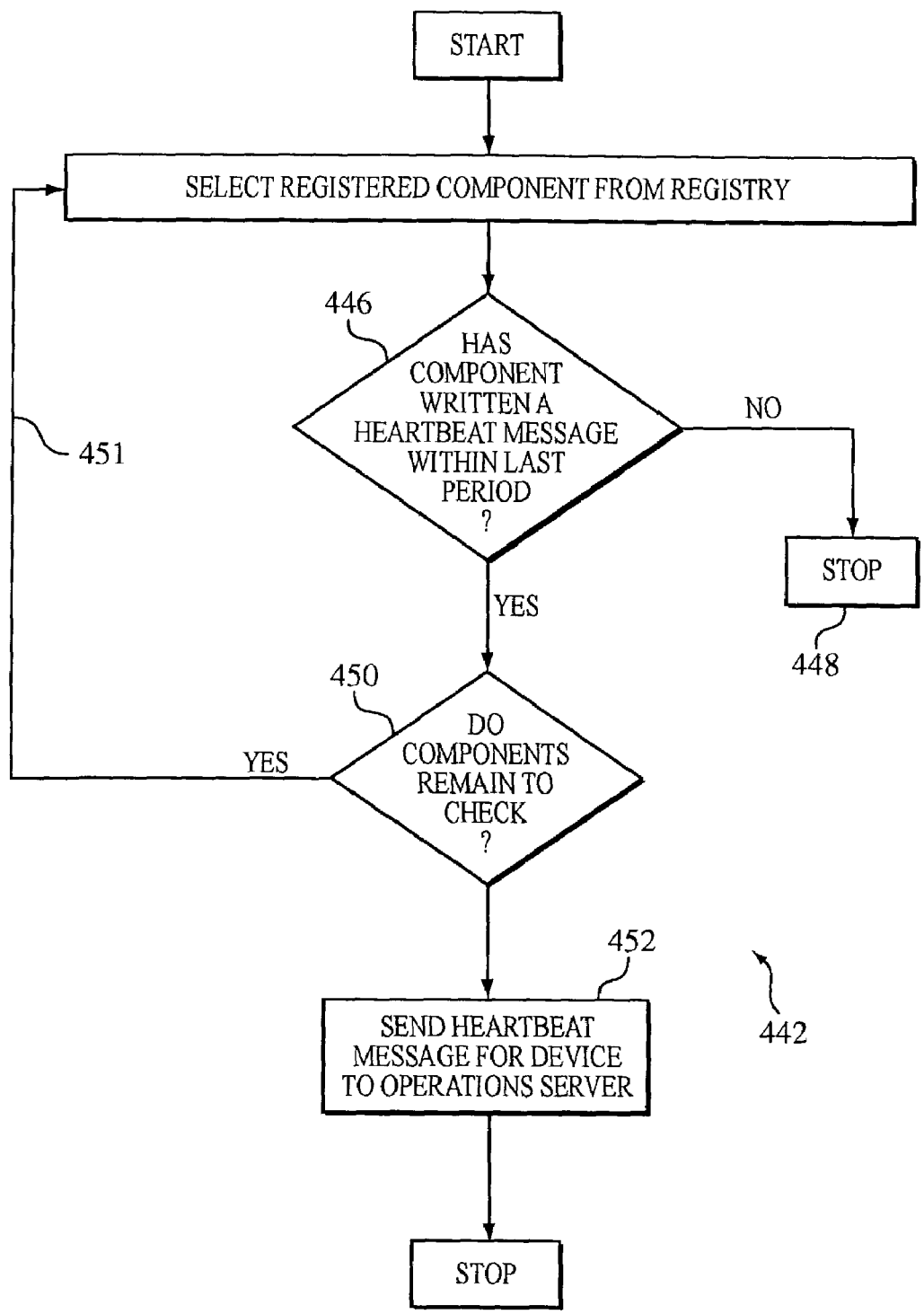
FIG. 24 shows a process by which a monitoring system tracks the health of software components of an associated server.

Referring to FIG. 24, a process 442 by which a monitoring system tracks the health of software components of the associated server is shown. The monitoring system selects 444 a registered software component from the registry location. The monitoring component determines 446 whether the selected component has sent the heartbeat, which is assigned to the component, during the last interval of predetermined length. If the assigned heartbeat was not written, the monitoring system terminates 448 tracking for this period, because the component has failed. If the assigned heartbeat was written, the system monitor checks 450 whether other components remain to be checked for heartbeats. If other components remain, the system monitor returns 451 to select the another registered and unchecked component. If the last component has been checked, each registered component has sent its assigned heartbeat during the last period. Thus, the system monitor sends 452 a consolidated heartbeat pulse, which is assigned to the entire server, to the operations server 32. The consolidated heartbeat pulse indicates that the software of the sending server is running properly during the reporting period for the consolidated pulse.

Figure 25:
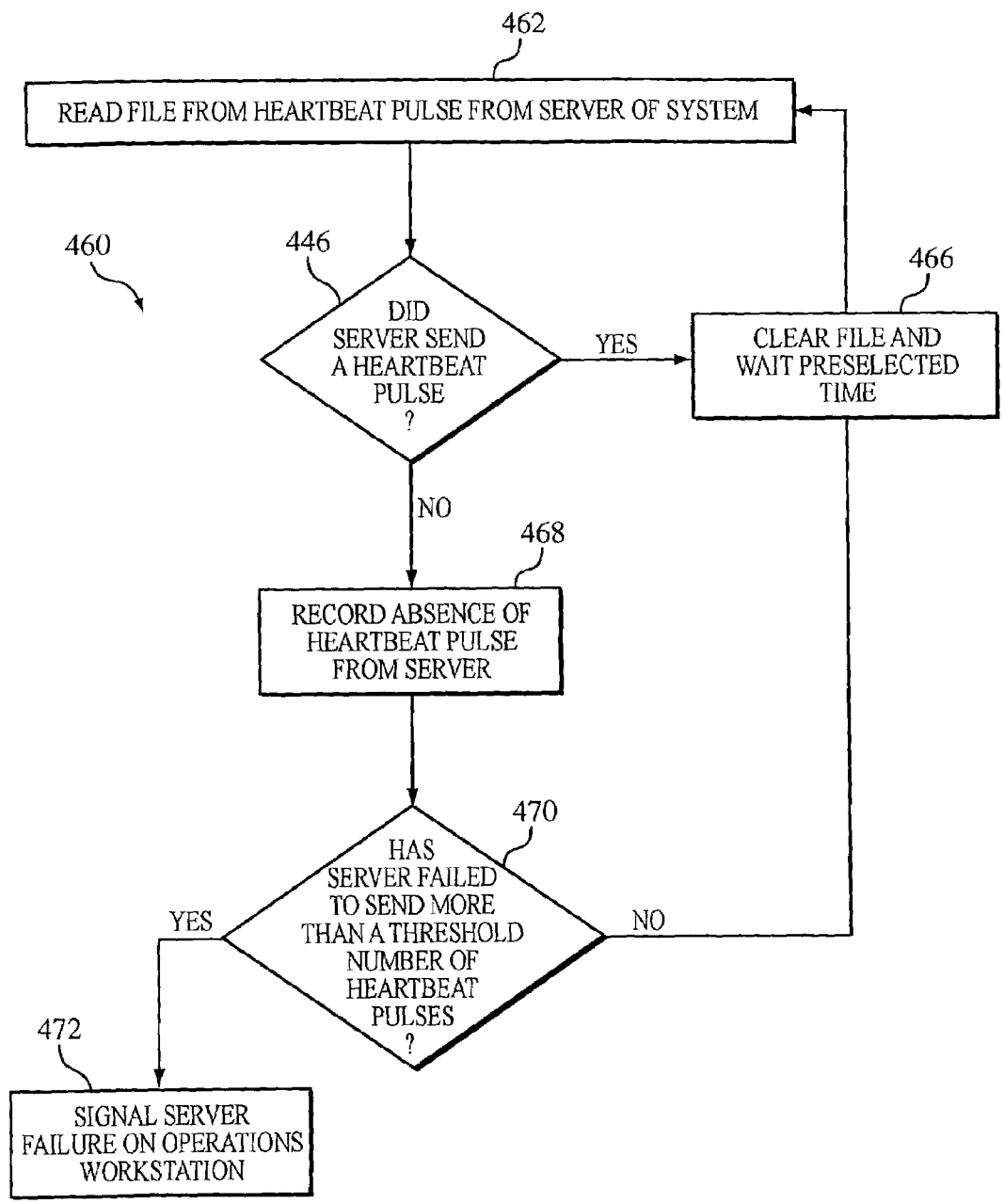
FIG. 25 shows a process for determining whether a selected server has failed.

Referring to FIG. 25, a process 460 for determining whether a selected server of the stages 14-16 has failed is shown. The operations server 32 reads 462 a file that records whether a consolidated heartbeat pulse was received from the selected server. From the value stored in the file, the operations server 32 determines 464 whether the selected device sent a heartbeat pulse. If the value indicates that a heartbeat pulse was received, the operations server clears 466 the file and waits 466 a preselected time before reading the file again.

If the value indicates that no heartbeat pulse, the operations server 32 records 468 a missed heartbeat pulse in a counter that accumulates a count for the number of missed heartbeats from the selected device. The operations server 32 also determines 470 whether the selected server has failed to send more than a threshold number of heartbeat pulses. If the number exceeded the threshold, the operations server 32 signals 472 a failure of the server to the operations workstations 34, 34'. An operator can order maintenance for the selected server in response to the failure signal. If the threshold number has not been exceeded, the operations server 32 waits 466 the preselected time before rereading the file assigned to the selected device.

Each line handler 18, 18', alert engine 20, 20', 20", and alert dispatcher 22, 22' also has a black box recorder 474-476 (FIG. 1B). The black box recorders 474-476 passively accumulate information for use in analyzing failures. Each black block recorder 474-476 uses a separate file for storing data on each software active execution thread being monitored. The black box recorders 474-476 receive regular data dumps from the active threads of the associated server. The black box recorders 474-476 also receive emergency data dumps in response to detection of an error or failure, e.g., by the system monitor. After a failure, an operator can download the data dumped to the black box recorder 474-476 of the failed server. The stored data provides information on the origin of the failure.

The black box recorder may contain a variety of types of information on the monitored threads. The information may include a date, time, server, a process, thread, and a selected variety of error and/or interrupt messages.

Referring again to FIG. 1A, the market monitoring system 10 also generates performance data on message flows at various points in the market monitoring system 10. The monitored message flows include flows of NQDS messages in the line handlers 18, 18', the flows of market event messages in the alert engines 20, 20', 20", and the flow of alerts into the alert dispatchers 22, 22'.

Message flow data includes total message counts and statistical data, e.g., message flow rates. In each server of the stages 14-16, an internal process 478 periodically sends the new message flow data to the operations server 32 via the private network 24. The message flow data stored on the server 32 can be accessed through the operations workstations 34, 34'.

Each line handler 18, 18' has a set of software counters 477, 477', 477" (FIG. 5) for monitoring NQDS messages flows. One of the counters 477 records the total number of NQDS messages received and the rate of incoming NQDS messages as a function of time. Another of the counters 477' detects missing NQDS messages, i.e., missing sequence numbers and records the missed numbers to a local file (not shown). Yet another of the counters 477" monitors total numbers of published market event messages and a publication rate as a function of time. The data accumulated by the set of counters 477, 477', 477" is periodically written from the individual line handlers 18, 18' to the operations server 32.

Another set of counters 479 accumulates data on market event message flows into the alert engine 20, 20', 20". The accumulated message flow data includes total numbers of received market event messages and receipt rates of market event messages as a function of time. The counters 479 also determine and store maximum and minimum receipt rates of market event messages as a function of time.

Another set of counters 480 accumulate message flow data for the separate queues 184, 184', 184" of each alert engine 20, 20', 20". The flow data includes total numbers of market event messages processed, average message processing rates, and minimum and maximum message processing rates. The accumulated data provides statistical information as a function of time.

The process 478 resident on each alert engine 20, 20', 20" accumulates data from the counters 479, 480, 480', 480"

monitoring flows of market event messages. The process 478 periodically writes the flow data to the operations server 32 via the private network 24.

Figure 26:
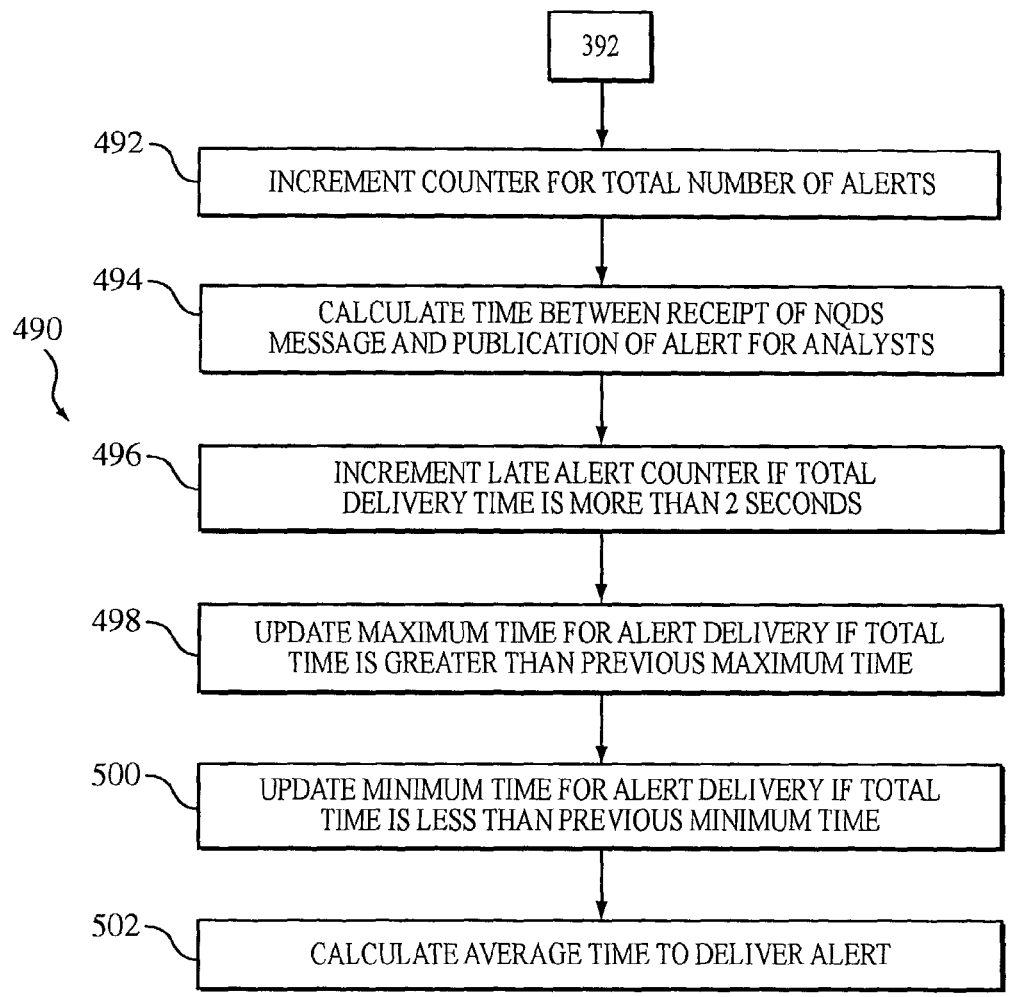
FIG. 26 shows a process for monitoring the delivery of alerts to analysts workstations by the market monitoring system of FIGS. 1A-22.

Referring to FIG. 26, a process 490 for monitoring alert delivery performance is shown. In response to publishing 392 an alert for the analyst workstations 36, 36', 36", as shown in FIG. 20, a performance object increments 492 an internal counter 482, which stores the total number of alerts published. The performance object also calculates 494 the elapsed time between receipt of the associated incoming NQDS message by the line handler 18, 18' and publication of the alert by the alert dispatcher 22, 22'. The calculation uses the time stamp produced by the timing object 62 of FIG. 3 and the publication time. If the elapsed time is greater than two seconds, the process 476 reports a late delivered alert.

The process 490 also determines maximum, minimum, and average times to deliver an alert from the original incoming NQDS message. The alert dispatcher 22, 22' recalculates 498 the maximum, minimum, and average alert delivery times in response to each publication of an alert.

The process 478 located in each alert dispatcher 22, 22' regularly writes the counts for the number of late alerts and calculated values for the maximum, minimum, and average alert delivery times to the operations server 32. The operations server 32 makes the data available to the operator workstations 34, 34'.

Alert Types

Referring again to FIG. 1, each alert engine 20, 20', 20" can detect and/or resolve several types of alert conditions. In the various embodiments, the alert engines detect and/or resolve the same types of alerts.

Processes for detecting and/or resolving the various types of alert conditions are found in the individual alert components 187-192 and coordinator components 199-201, shown in FIG. 11. These processes use data such as quotes, trading prices, trading volumes, and/or the existence of special market conditions to detect and resolve alert conditions. The data for detecting and/or resolving alerts enters the market monitoring system 10 in the incoming NQDS messages received by the line handlers 18, 18'.

To detect some types of alerts, the alert components 187-201 use published offers of market participants. The published offer prices at which the market participants will buy and/or sell specified securities are referred to as bid and ask quotes, respectively. The most aggressive quotes define the inside quotes. The inside ask quote is the lowest ask quote. The inside bid quote is the highest bid quote. Separate inside quotes are defined for each type of trading security. New quotes are received in incoming NQDS messages from the feed lines 12.

In a quotation market such as the Nasdaq stock market, the market participants are referred to as market makers. The market makers keep inventories of selected securities for buying and selling and publish the respective ask and bid quotes at which they offer to trade their inventoried securities. Normally, a market maker's ask quote is higher than his bid quote for the same security, i.e., a positive spread situation. For a positive spread, the market maker obtains a profit by buying and selling the security, i.e., the profit is the spread times the quantity bought and sold.

Referring again to FIG. 11, the alert components 187-192 use algorithms detect several classes of unusual market conditions. One class focuses on unusual quote values, i.e., locked or crossed (L/C) market conditions. Another class focuses on unusual relationships between quotes and trading prices, quote/trade (QT) alert conditions. Another class focuses on trading acts during regulated trading halts, i.e., trade during a halt alert conditions. Another class focuses on market activities that are unusual in light of historical market data, i.e., unusual market activities (UMA) alert conditions.

Locked or Crossed Market Alerts

Locked markets and crossed markets conditions are both defined by quotes on a security-by-security basis. A locked market occurs when the inside ask and bid quotes for a security are equal. A crossed market occurs when the inside bid quote is greater than the inside ask quote for a security.

During a L/C market condition, an external trader can make a profit or, at least, break even by buying a security from one market participant and reselling the same security to a different market participant. Locked or crossed markets are unhealthy situations for the market participants and the trading market generally.

Figure 27:
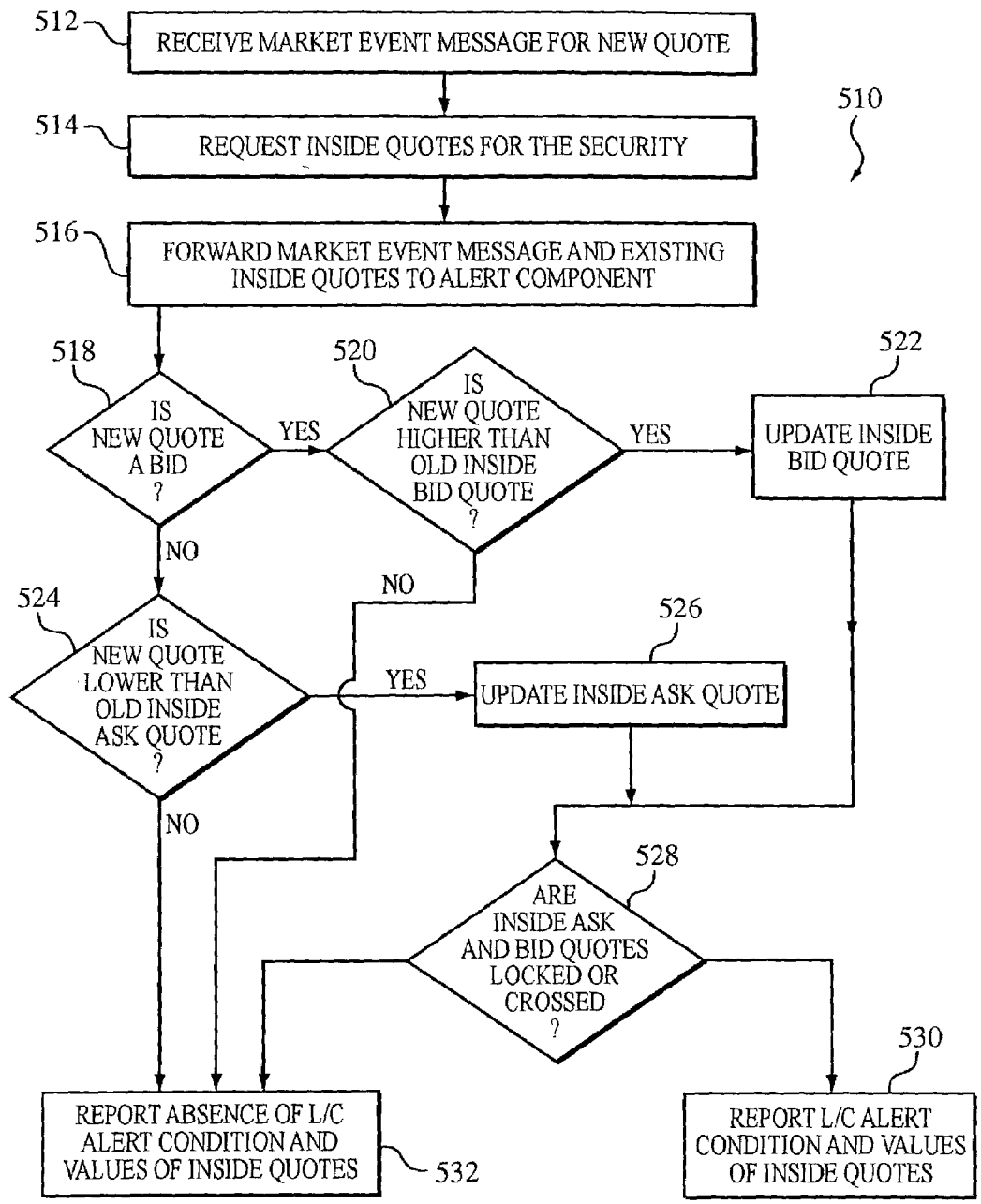
FIG. 27 shows a process for detecting locked or crossed market alert conditions in the alert engines of FIGS. 1A, 10-17.

Referring to FIG. 27, a process 510 by which the component manager 186 and L/C alert component 187 of FIG. 13 detect L/C market conditions is shown. The component 186 receives 512 a market event message indicating a new quote for a security. In response to the new quote, the component manager 186 requests 514 that the data cache 202 send the existing inside quotes for the security. When the inside quotes arrive, the component manager 186 forwards 516 the market event message and the inside quotes to the L/C alert component 187. The L/C alert component 187 determines 518 whether the new quote is a bid. If the new quote is a bid, the L/C alert component 187 determines 520 whether the bid is higher than the existing inside bid quote. If the new quote is higher, if is a new inside bid quote, and the L/C alert component 187 updates 522 the inside bid quote. If the new quote is not a bid, the L/C alert component 187 determines 524 whether the new quote, i.e., an ask quote, is lower than the existing inside ask quote. If the new quote is lower, the L/C alert component 187 updates 526 the inside ask quote.

After an update of one of the inside quotes, the L/C alert component 187 determines 528 whether the inside ask and bid quotes lock or cross as updated. If the updated inside quotes lock or cross, the L/C alert component reports 530 a L/C market alert condition to the component manager 186. If no update of the inside quotes occurred or the updated quotes do not lock or cross, the L/C alert component 187 reports 532 an absence of a L/C alert to the component manager 186. In both cases, the L/C alert component 187 also reports 530, 532 the updated inside quotes to the component manager 186. The component manager 186 writes the updated inside quotes and the results on detecting a L/C market alert condition to the data cache 202.

Referring again to FIG. 11, the L/C alert and coordinator components 187, 199 may impose threshold requirements on detecting and publishing, respectively, L/C market conditions for the analyst workstations 36, 36', 36". A threshold may require that a locked market condition persist for several seconds before an alert is published. This removes some L/C conditions caused by brief lack of inattention on the part of a market participant. The administrator workstation 38, 38' can change the thresholds associated with detecting and publishing L/C market alerts by writing new threshold values to the algorithm parameters object 206 of FIG. 14.

L/C alerts provide analysts with the identity of the locked or crossed security and the identity of the market participants who caused the condition. The analysts can also obtain identities of passive market participants from the database 26. The passive market participants have quotes that have joined the crossed or locked market condition. The passive participant calculator 414, shown in FIG. 18, determines the passive market participants for the L/C alerts and writes their identities to the database 26.

A previous L/C market condition can be resolved automatically by the L/C market alert component 187. To automatically resolve the L/C market alert, the L/C market alert components 187 detects a cessation of the previous L/C market condition.

Quote/Trade Comparison (QTC) Alerts

QTC alert conditions are defined by unusual relations between inside quotes and trading prices. Detecting QTC alerts requires data on both quotes and trading prices. A trading event triggers a QTC alert. A change in a quote can only result in a QTC alert condition for subsequent trades.

Broker/dealers executing trades of Nasdaq or exchange-listed (CQS) issues must report trades to Nasdaq within 90 seconds. Nasdaq reports these trades to the public via NTDS messages. The line handlers 18, 18' receive incoming messages for trades from the feed lines 12. These incoming messages produce the QTC alerts detected by the market monitoring system 10 of FIG. 1.

A QTC alert condition can occur in response to several types of trading events. Each event correlates the trading price with inside quote values. Detect such conditions involves comparing the trading price to inside quotes, which were applicable at the time of the trade.

A trade whose price is unreasonably related to the inside quotes for the traded security generates a QTC alert. Unreasonably related trading price differ from a relevant inside quote by an above threshold amount. The relevant inside quotes are the lowest ask quote and highest bid quote for the traded security. In both cases, the relevant inside quote is a quote at a time within the 90 second interval ending at the reporting time for the trade. The threshold amount for a QTC alert condition may be adjusted for trading volume, time of day, and type of issue, i.e., stability.

Figure 28:
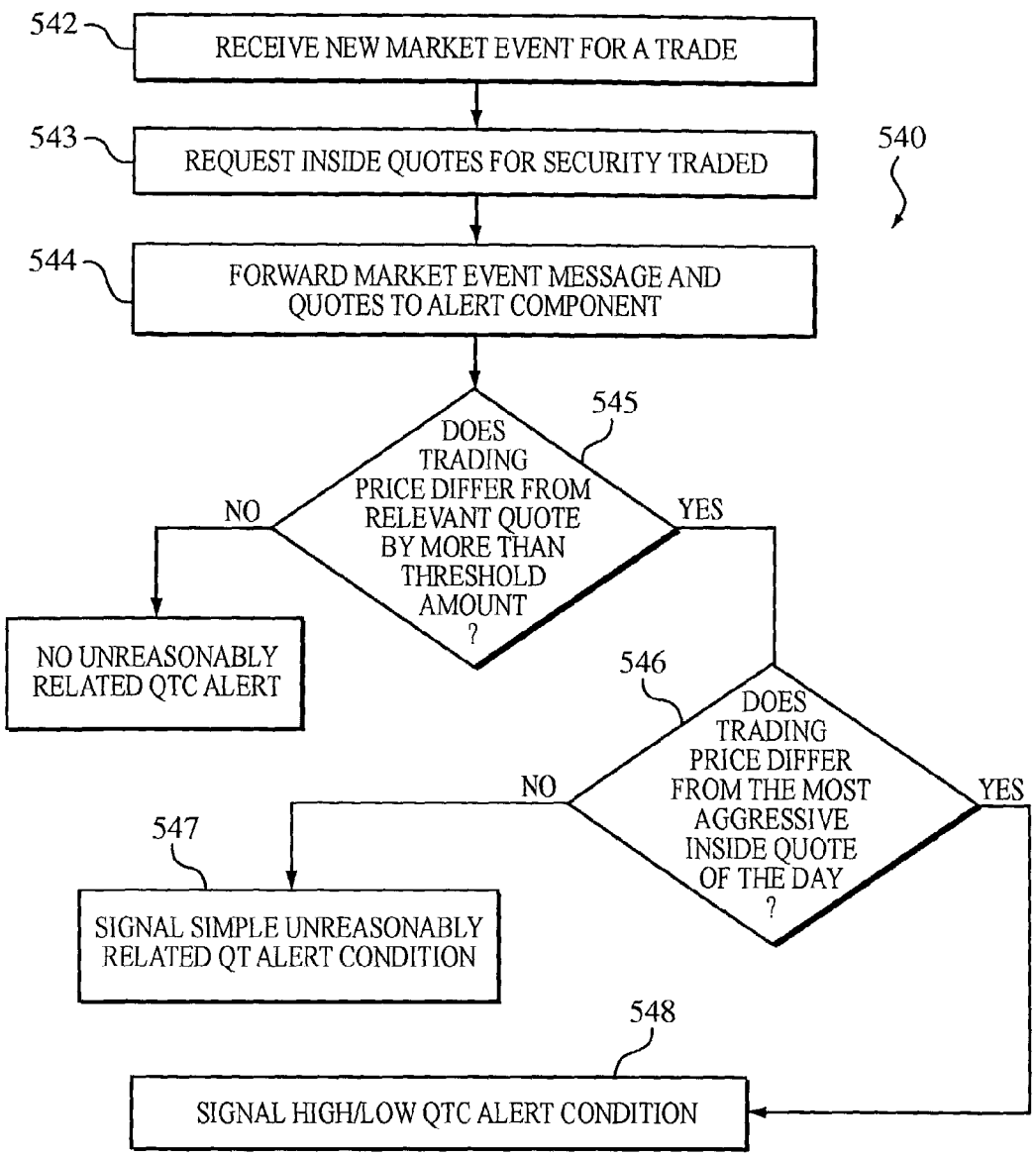
FIG. 28 shows a process for detecting alert conditions in which trading prices are unreasonably related to inside quotes using the alert engines of FIGS. 1A, 10-17.

Referring to FIG. 28, a process 540 by which the component manager 186 and QTC alert component 188 of FIG. 11 detect unreasonably related QTC alert conditions is shown. The component manager 186 receives 542 a market event message for a new trade. The component manager 186 requests 543 the inside quotes for the security traded from the data cache 202. In response to receiving the inside quotes, the component manager 186 forwards 544 the market event message and inside quotes to the QTC alert component 188. The QTC alert component 188 determines 545 whether the trading price differs from the relevant inside quote by more than a preselected threshold amount.

If the difference is above threshold, the QTC alert component 188 checks whether a simple or aggravated QTC alert condition. The QTC alert component 188 determines 556 whether the trading price is more outside the outer boundaries of the inside quotes of the day than an above-threshold amount. The outer boundaries are defined by the lowest bid quote and highest ask quote. If the trading price is outside the boundaries by an above threshold amount, the alert component 188 signals 558 an aggravated QTC alert condition, which is either a high alert or a low QTC alert condition. A high QTC alert condition occurs if the trading price is higher than the highest ask quote for the day, and a low QTC alert condition occurs if the trading price is lower than the lowest bid quote for the day. If the unreasonably related QTC alert condition is not aggravated, the QTC alert component 188 signals 557 a simple unreasonably related QTC alert condition.

Trades of special securities on witching days, i.e., expiration days for options and/or futures, can generate another type of QTC alert condition. The special securities include equities underlying options and/or futures and indexed securities. Indexed securities form components underlying calculations of a broad index such as the S&P 400, the S&P 500, or the Nasdaq 100. On witching days, the prices of the above special securities strongly influence prices of options and/or futures. Thus, there is a high enough market interest in these securities on witching days to base a separate witching day QTC alert scenario on them.

Figure 29:
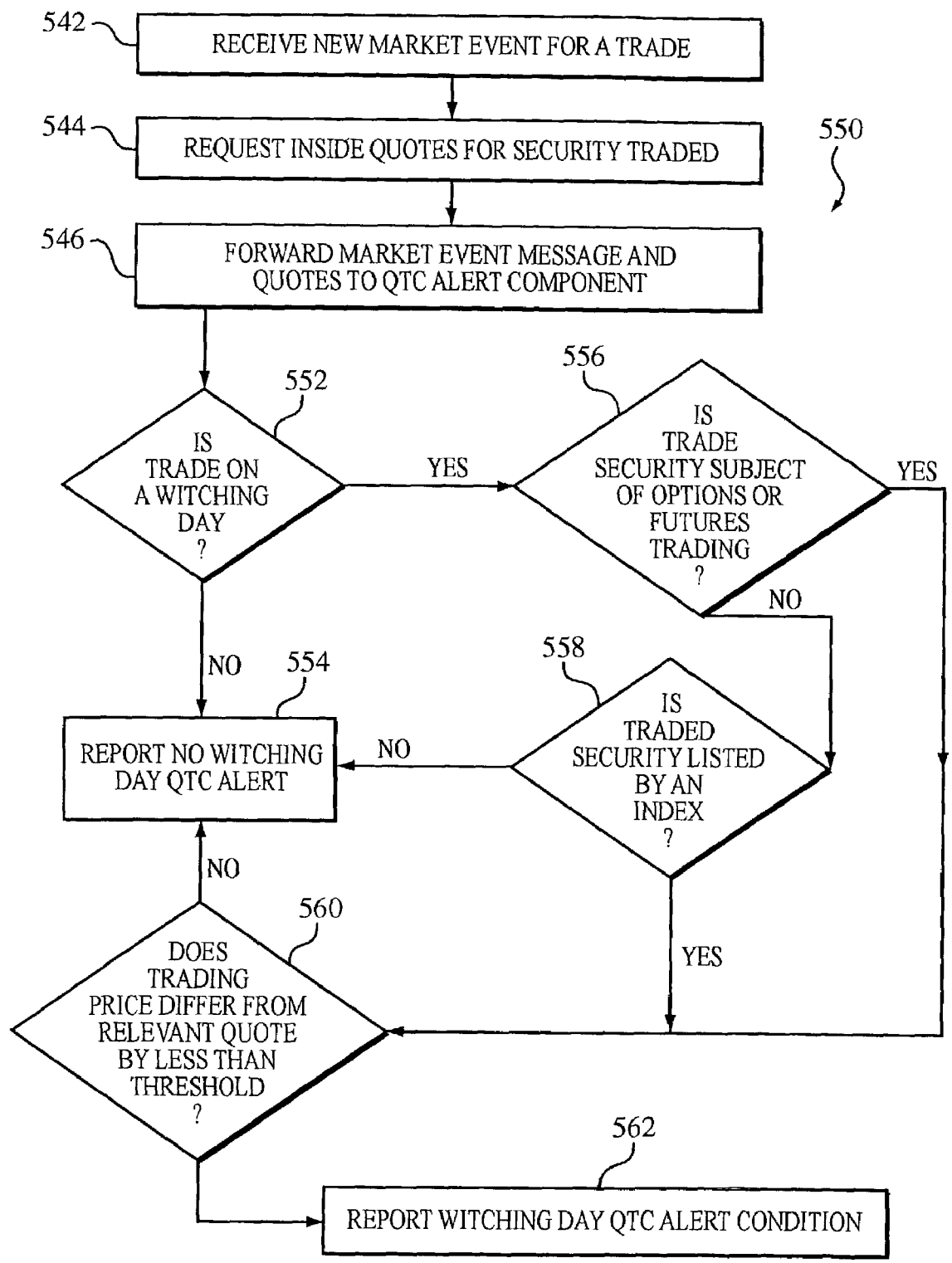
FIG. 29 shows a process for detecting witching day alert conditions using the alert engines of FIGS. 1A, 10-17.

Referring to FIG. 29, a process 550 by which the component manager 186 and QTC alert component 188 of FIG. 13 detect a witching day alert condition is shown. The component manager 186 receives 552 a new market event message for a trade, requests 544 the inside quotes for the traded security from the data cache 202 in response to receiving the new market event message. In response to receiving the quotes, the component manager 186 forwards 546 the market event message and inside quotes to the QTC alert component 188. The QTC alert component 188 determines 552 whether the trade occurred during a selected trading period of a witching day.

Some embodiments use the first five minutes of trading on a witching day as the selected period for detecting alert market conditions that can strongly influence options and/or futures prices. The market event message provides the trading time to compare to the selected period. The trading time was in turn obtained from the original incoming message for the trade during the translation 76 described in FIG. 6.

If the trade was in the selected trading period of a witching day, the alert component 188 determines 556, 558 whether the traded security is either a type subject to options and/or futures or index listed. Securities related to options/futures or indexes are of special interest on witching days and thus, can cause the special witching day alerts. If the traded security is neither the subject of futures and/or options contracts or index listed, the alert component 188 again reports 554 an absence of a witching day alert. If the security is the subject of futures and/or options contracts or index listed, the alert component 188 determines 560 whether the trading price differs from the relevant inside quote by an above threshold amount. If the price different than the inside quote, the alert component 188 reports 562 a witching day alert condition.

Closing prices unreasonably related to inside quotes for Nasdaq listed securities can also generate alerts. A closing price is the last trading price of a security during a trading session. Closing prices of Nasdaq listed securities have special interest to the Nasdaq market, because these prices provide measures for evaluating inventories held by mutual funds, dealers, and/or institutions.

The market monitoring system 10 of FIG. 1A generates a separate closing alert to detect market conditions that may affect values of inventories in unusual ways, because closing prices differ significantly from inside quotes. A three-part 563, 569, 577 process for detecting closing alerts is shown in FIGS. 30-32.

Figure 30:
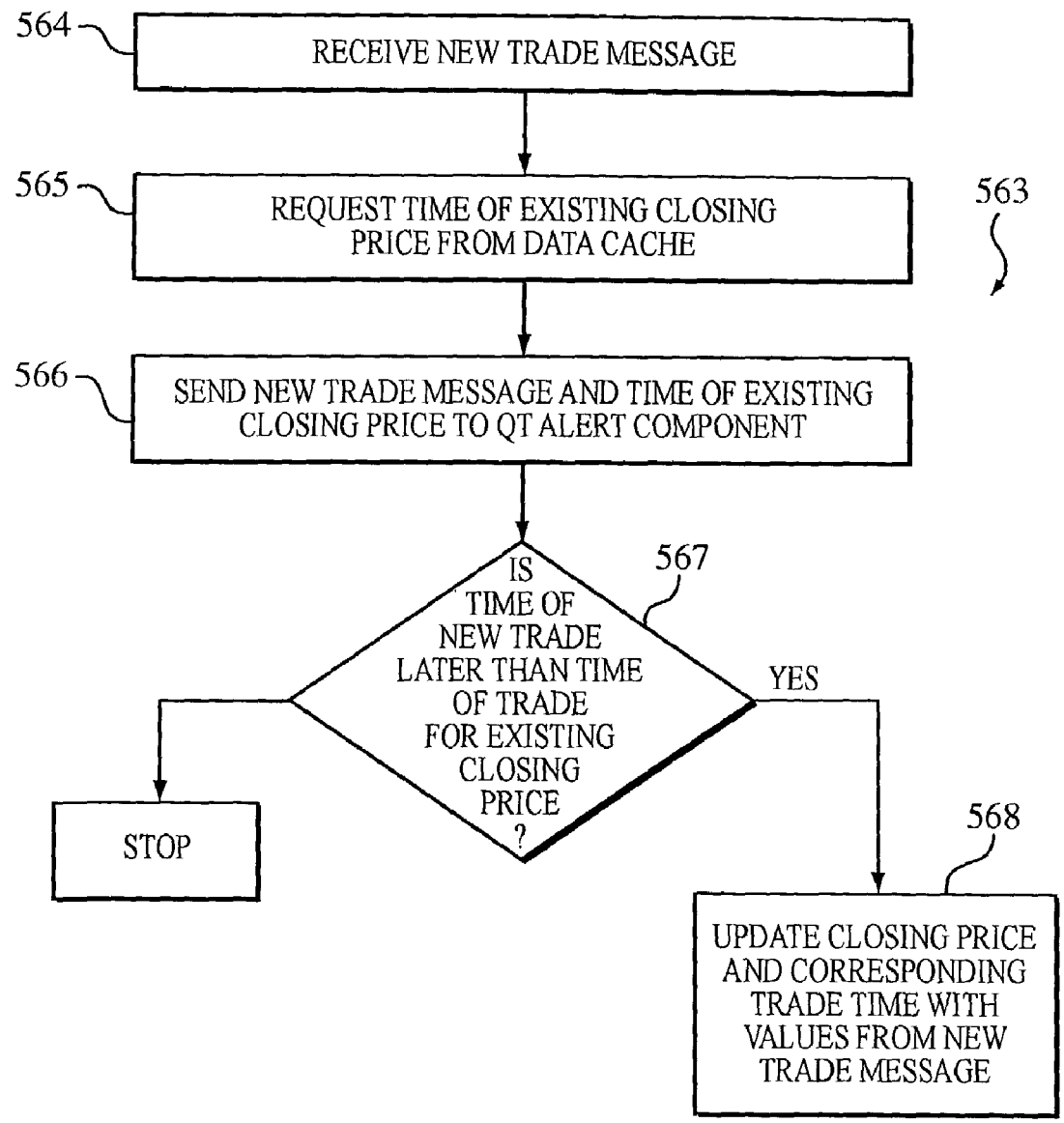
FIG. 30 shows a process for updating a closing price file used to detect closing alert conditions in the alert engines of FIGS. 1A, 10-17.

Referring to FIG. 30, a first part 563 of the process for detecting closing alerts is shown. The first part 563 provides continual updates a "closing price" file located in the data cache 203. The entries of this file represent the most recent trading prices of Nasdaq listed securities and the times at which the corresponding trades occurred.

An update of the closing price file starts when the component manager 186 receives 564 a new market event message for a trade of one of the Nasdaq listed securities. In response to receiving the new market event message, the component manager 186 requests 565 the trade time of the running closing price of the security from the closing price file. The data cache returns the running closing price and the time of the corresponding trade. The component manager 186 sends 566 the new market event message and the trade time for the running closing trade to the alert component 188. The alert component 188 determines 567 whether the new market event occurred later than the trade for the running closing price. If the new market event occurred later, the alert component updates 568 the closing price by sending the update to the component manager 186, which the component manager 186 writes back to closing price file of the data cache 203 along with the time for the new trade. The trading price of the new market event becomes the new running value for the closing price.

Figure 31:
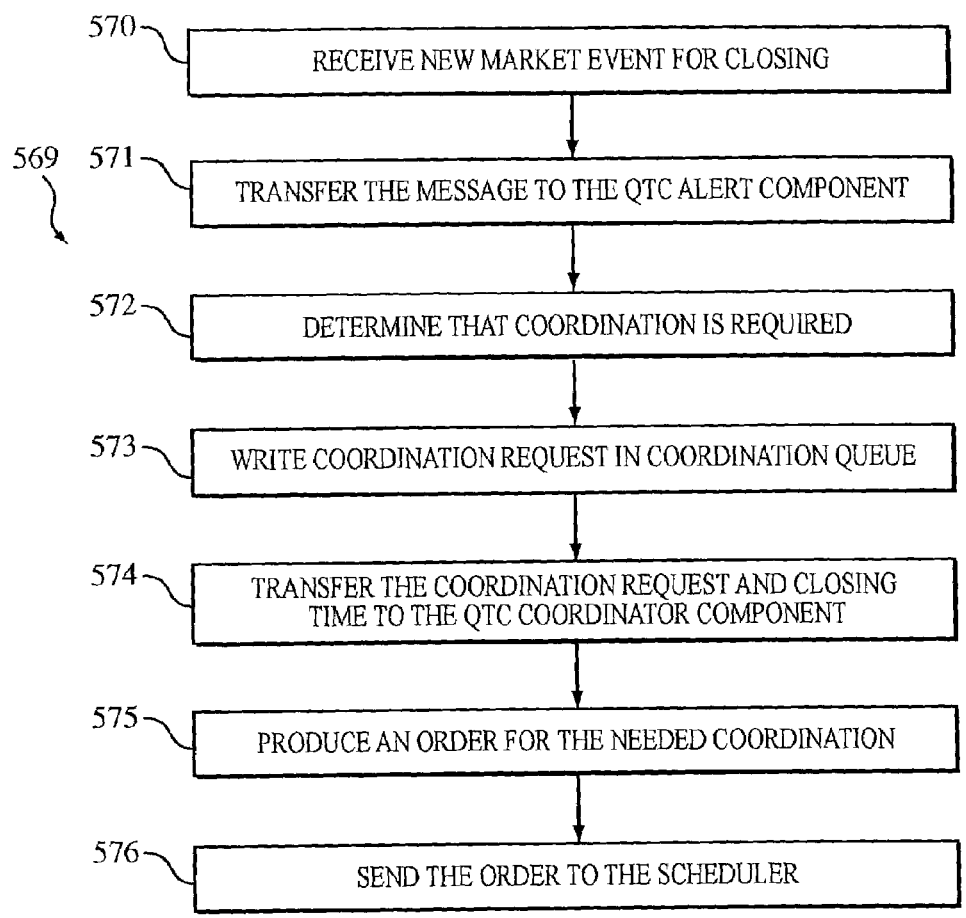
FIG. 31 shows a process for producing a coordination order used in detecting closing alert conditions in the alert engines of FIGS. 1A, 10-17.
Figure 32:
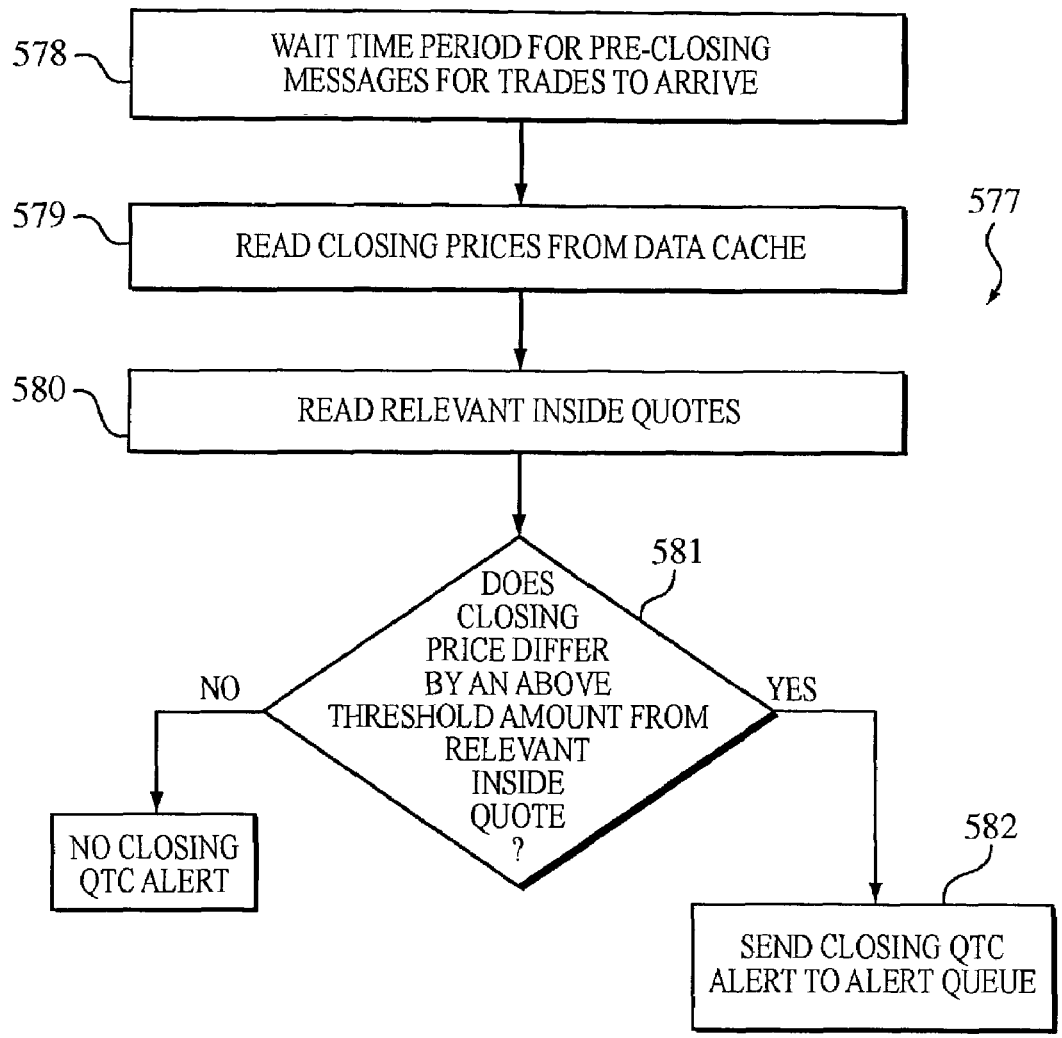
FIG. 32 shows a process for executing a coordination order, which was produced by the process of FIG. 31, to detect alert conditions.

Referring to FIG. 31, a second part 569 of the process for detecting closing alerts, which produces a coordination order, is shown. The component manager 186 receives 570 a new market event message for a market closing. The message provides the time that the market closed. In response to the market event message, the component manager 186, transfers 571 the message to the alert component 188. The alert component 188, determines 572 that coordination is needed for closing alert detection and transfers a coordination request to the component manager 186. The component manager 188 writes 573 the coordination request in the coordination queue 204 located in the data cache 203. The request includes the market closing time received from the market event message for the closing.

The alert engine incident coordinator 198 transfers 574 the coordination request and closing time from the coordination queue 204 to the coordinator component 200. The coordinator component 200 produces 575 an order for the coordination actions needed to find closing alerts. The incident coordinator 198 sends 576 the order from the coordinator component 200 to the scheduler 197 for execution.

Referring to FIG. 32, a third part 577 of the process for detecting closing alert conditions is shown. The third part 577 involves executing the order of the coordinator component 200 in the scheduler 197.

The scheduler 197 waits 578 a predetermined time for market messages for pre-closing trades to arrive, i.e., about ninety seconds for the Nasdaq market. By the end of a ninety second period, reports for pre-closing trades in the Nasdaq market arrive, because Nasdaq rules require broker/dealers to report trades within ninety seconds. After the predetermined wait, the scheduler 197 reads 579 the closing prices and corresponding trading times from the closing price file in the data cache 203. Since the closing price file is continually updated, the values therein are the real closing prices when the wait period of predetermined length terminates. The scheduler 197 also reads 580 the relevant inside quotes, e.g., corresponding to the trading times of the closing prices, from the data cache 203. The scheduler 197 determines 581 whether the closing price of each index listed security differs from the corresponding relevant inside quotes by more than a threshold amount. For each above threshold difference, the scheduler 197 sends 582 a closing alert to the alert queue 183 shown in FIG. 11.

If a market participant improperly reports a trade, another type of alert condition may occur. For the Nasdaq market, proper reporting of trades produces an informed trading community and reduces the probability of undesirable effects on market activity. In particular, Nasdaq rules require that trades between regular trading sessions be reported prior to the opening of the next trading session. Similarly, trades during regular trading sessions must be reported within ninety seconds of the trade and have a proper form. The proper form can help other traders to extract desired trading data from the reports.

Figure 33:
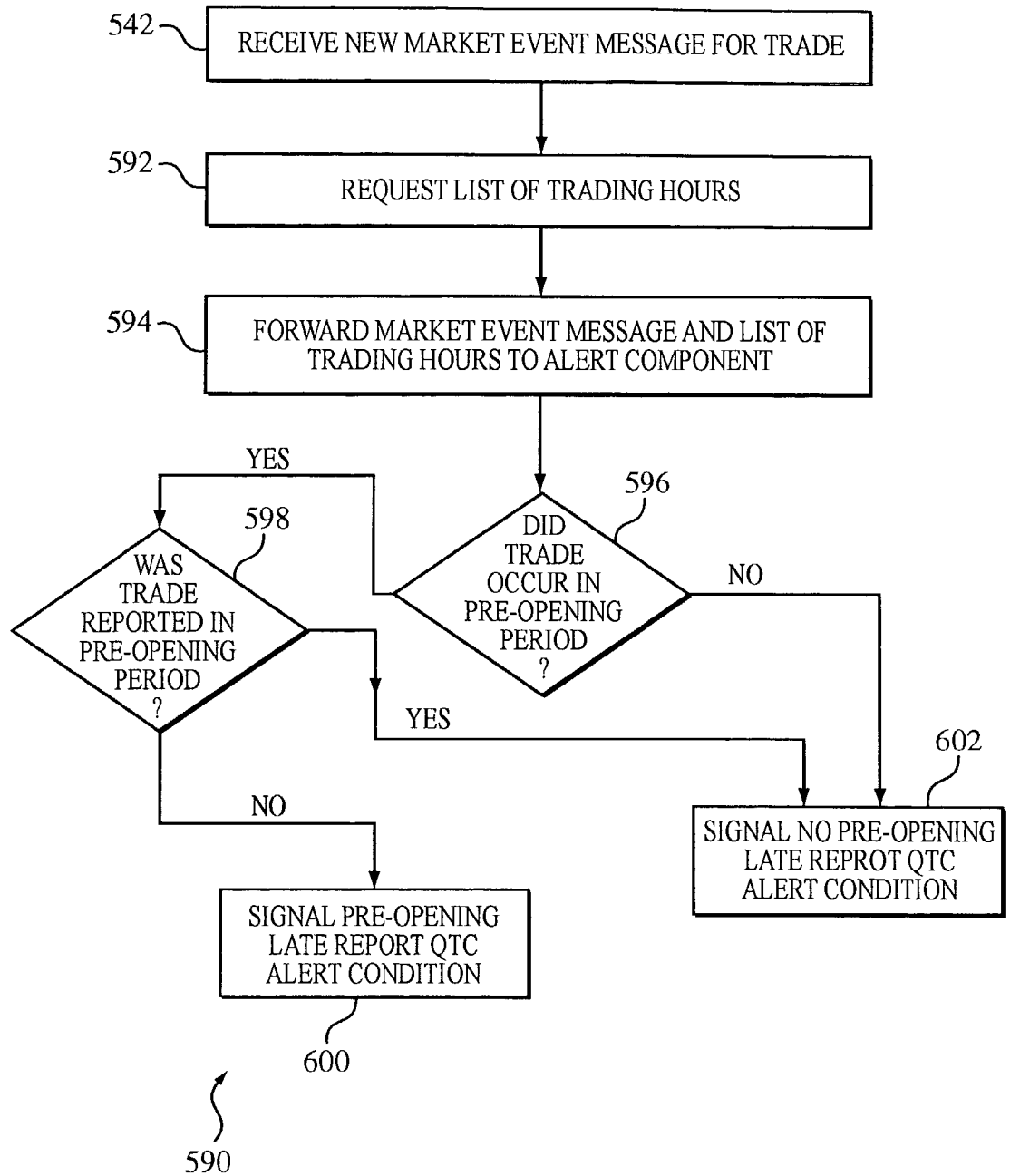
FIG. 33 shows a process for detecting pre-opening late report alert conditions in the alert engines of FIGS. 1A, 10-17.

Referring to FIG. 33, a process 590 by which the component manager 186 and alert component 188 detect alerts associated with pre-opening late reports is shown. The component manager 186 receives 542 a new market event message for a trade. The component manager 186 requests 592 a list of trading hours for the present or last trading session. The component manager 186 forwards 594 the market event message and the list of trading hours to the alert component 188. The alert component 188 compares the trading time from the market event message to the trading hours and determines 596 whether the trade occurred in the pre-opening period. The alert component 188 also determines 598 whether the trade was reported in pre-opening period if the trade occurred therein. The market event message gives the reporting time of the trade. If the trade occurred in the pre-opening period and was reported after opening, the alert component signals 600 a pre-opening late report alert condition to the component manager 186. If the trade either did occurred in the open period or occurred in the pre-opening period and was reported therein, the alert component signals 602 the absence of a pre-opening late report alert condition.

Figure 34:
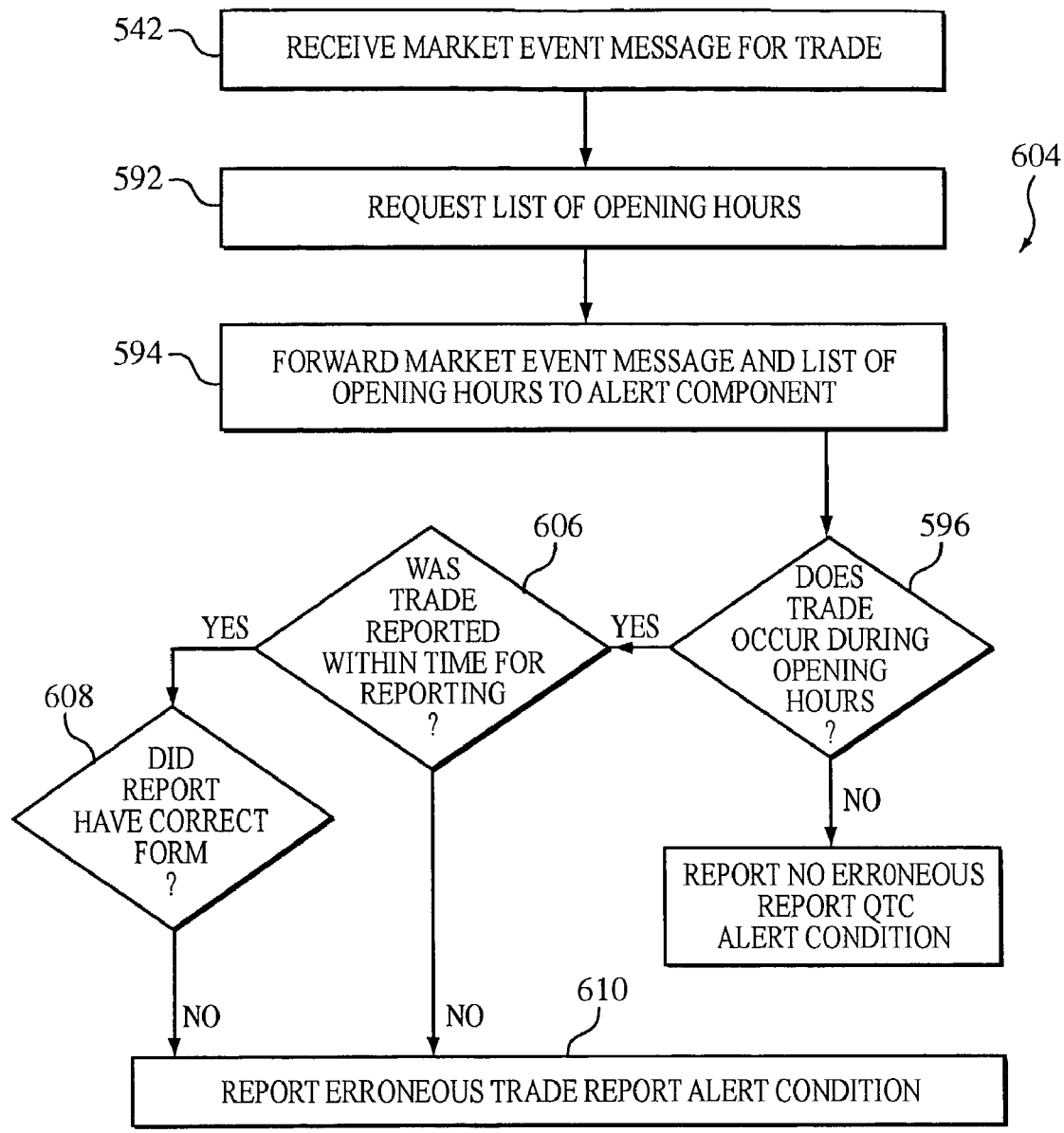
FIG. 34 shows a process for detecting erroneous report alert conditions in the alert engines of FIGS. 1A, 10-17.

Referring to FIG. 34, a process 604 by which the component manager 186 and alert component 188 detect erroneous report alert conditions is shown. The component manager 186 receives a market event message for a trade 542, requests opening hours 592, forwards the message and opening hours 594 to the alert component 188 substantially as described in FIG. 33. The alert component 188 also determines 596 whether the trade occurred during open hours of a trading session. If the trade occurred during opening hours, the alert component 188 determines 606 whether the trade was reported within the proper time for a trade during a trading session. For the Nasdaq market, trades during opening hours of a session must be reported within 90 seconds of the trade. The alert component also determines 608 whether the trade report had a correctly indexed form. Correctly indexed trade reports enable other traders to search the subject of the report, i.e., quote change, trade, correction, etc. If the report was either late or improperly indexed, the alert component 188, reports 610 an erroneous trade report alert condition.

Late and/or erroneously reported alert conditions can lead to errors in the detection of other alert conditions. For example, a late trade report may change closing prices and modify results for closing alert detection. Various embodiments implement processes, e.g., through the alert engine incident coordinator 198 of FIG. 11, to recheck or correct alert detection errors caused by late and/or erroneously reported alerts.

Trading During Halt Alerts

Trading during halt alert conditions are defined by relations between trading and halt times. A trading halt can affect trading of a single security. For example, a halt for a single stock issue may be declared to enable market participants to evaluate new information on the security prior to making additional trading decisions. A trading halt may also be market wide. For example, emergency conditions may demand a market wide halt if chaotic or across-the-board rapid market movement is detected. During both types of trading halts, members of the Nasdaq market are prohibited from trading.

For Nasdaq, enforcement of market regulations requires detecting trades that occur during trading halts. Two market event messages are needed to produce a trading halt alert. The first message informs the market monitoring system 10 of the trading halt and the later message informs the market monitoring system 10 of a trade during the halt.

Figure 35:
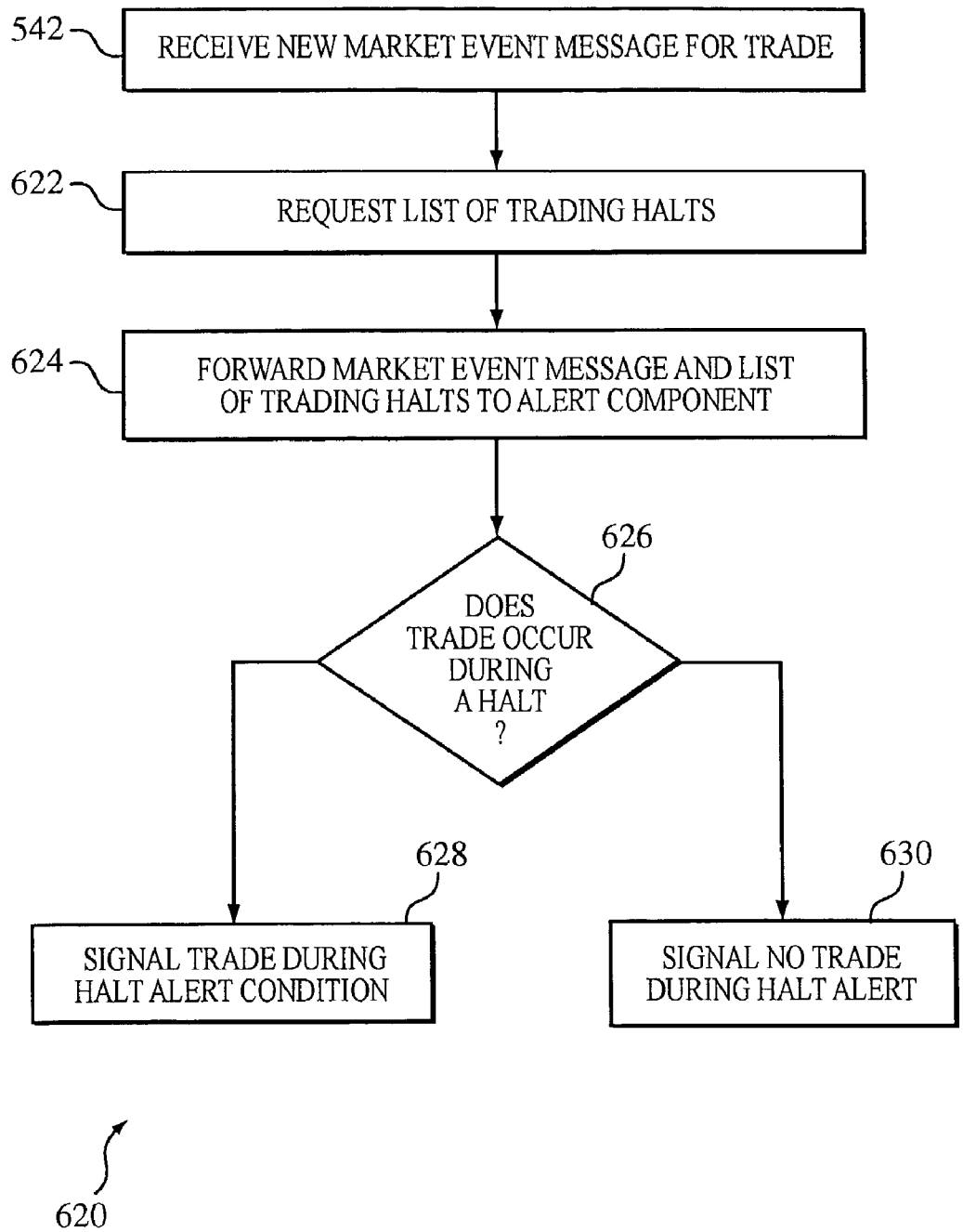
FIG. 35 shows a process for detecting market halt alert conditions in the alert engines of FIGS. 1A, 10-17.

Referring to FIG. 35, a process 620 by which the component manager 186 and alert component 188 detect a trade during halt alert condition is shown. The component manager 186 receives 542 a new market event message for a trade. In response to the market event, the component manager 186 requests 622 from the data cache 203 a list of trading halts.

The data cache 203 continually receives data on new trading halts through the component manager 186, which automatically sends such data from market event messages. The data on trading halts is stored by the data cache 203 for later use in detecting trade during halt alert conditions.

The component manager 186 forwards 624 the list of trading halts and the new market event message to the trade halt alert component 189. The trade halt alert component 188 compares the times of trade halts to the time of the new trade and determines 626 whether the trade occurred during a halt. If the trade was during a halt, the trade halt alert component signals 628 a trade during a halt alert condition to the component manager 186. Otherwise, the trade halt alert component signals 630 the absence of a trade during halt alert condition to the component manager 186.

Unusual Market Activity Alerts

Unusual Market Activity (UMA) alerts are defined for a variety of market conditions, which are unusual in light of historical market activity data, e.g., statistically derived data. Thresholds for defining UMA alerts may depend on the type of security, the underlying industry, and the company issuing the security. The historical data may be obtained and regularly updated using market monitoring data stored in the database 26.

Events triggering UMA alerts

Rapid movement of one or more trading prices during a trading session. Price movement may be measured using the spread between high and low prices or the difference between extreme and average prices.

Rapidly movement of quotes during a trading session. Quote movement may be detected from the inside bid and/or ask quotes. The movement may also be detected by a large standard deviation between quotes for one security.

Unusual spreads between ask and bid inside quotes for a security.

Unusual market movement on a trading item. Unusual market movement may be detected if multiple L/C market conditions prior to opening of a trading session or an no news about security appears even though a large difference exists between inside quotes and the previous day's closing price.

An unusual quantities of trading items. Unusual quantities may include high trading volume or high posted inventories posted by market participants during a trading session.

New rolling 12-month highs or lows. These conditions may indicate a new split-adjusted trading price, which implies that a change in trading interest has occurred for the security.

High trading volumes on or just prior to witching days for stocks underlying options, futures or indices. Such activities may indicate attempts to bring about favorable prices for options or futures holders.

IPO trading with unusual volume, quote, and/or trading price changes. Statistical thresholds for unusual activities may be defined by the first day trading of the IPO as updated on subsequent days or by trading of other securities for the same industry.

Promotion or demotion of a security from Nasdaq's list of the top list of volume sales, advancers, or decliners.

Figure 36:
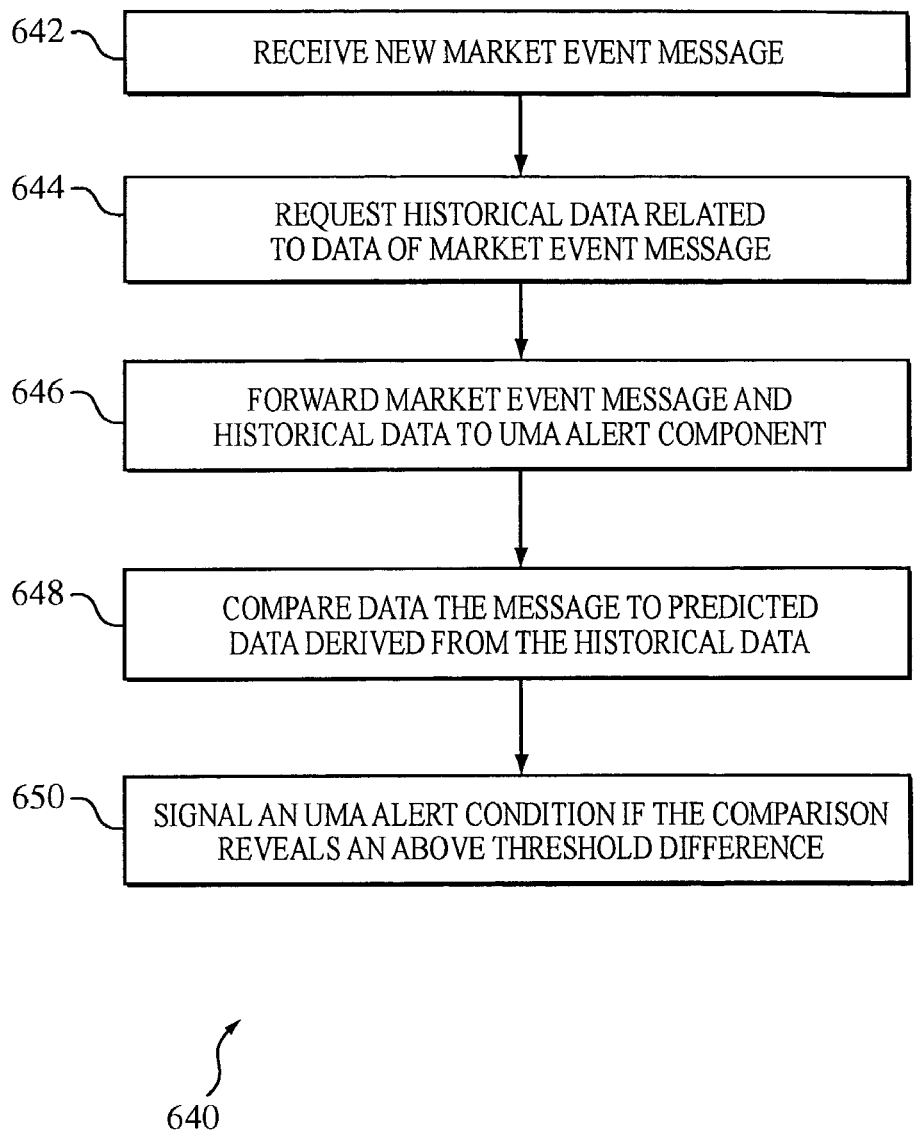
FIG. 36 shows a process for detecting unusual market activity alert conditions in the alert engines of FIGS. 1A, 10-17.

Referring to FIG. 36, a process 640 by which the component manager 186 and UMA alert component 190 detect UMA alert conditions is shown. The component manager 186 receives 642 a new market event message containing data of a type capable of triggering an UMA alert. The component manager 186 requests 644 historical data from the data cache 202. The requested type of historical data correlates to the data types of the new market event message. After receiving the historical data, the component manger 186 forwards 646 the new market event message and historical data to the UMA alert component 190. The UMA alert component 190 compares 648 the new data from the market event message to predicted values of the new data derived from the historical data. If the new data and the predicted new data differ by above threshold amounts, the UMA alert component 190 signals 650 an UMA alert condition to the component manager 186.

Various embodiments of the alert components 187-192 may be configured to reduce the effects of some market events on alert detection and/or resolution. These events may include fast changes following a trading halt, activity correlated to Nasdaq 100, S&P 500 or other broad indices, changes correlated to secondary public offerings. The alert components may also compensate for events affecting identifiers of securities and quote evaluations schemes. These events include dividend distributions, splits, acquisitions, mergers, issue symbol and company name changes, and corrections to market event data. The alert components 187-192 may also desensitize detection of new alerts to continuing market conditions by raising thresholds.

Alert Presentation to Analysts

Referring to FIG. 37, a graphical user interface (GUI) 660 for presenting alerts on the analyst workstations 38, 38', 38" of FIG. 1A is shown. A main alert pool 662 identifies pending and unassigned alerts to analysts by type, i.e., L/C, QT, UMA, or halt. The alert main pool 662 also provides data for an alert dispatch time 664, an alert sub-type 666, a symbol identifying the security concerned 668, inside quotes for the security 670, a preferred analyst 672 if known, and priority rating 674. The priority rating provides an order in which the different alerts should be resolved.

Alerts disappear from the main pool 662 when an analyst accepts responsibility for resolving the alert by moving it to his or her individual analyst pool 676. One analyst can accept each alert displayed. Alerts are not automatically assigned to analysts even when preferred analysts, e.g., analysts assigned related alerts, are indicated.

The analyst workstations 38, 38', 38" of FIG. 1A write alert resolutions and associated notes entered by analysts to the database 26. The alert resolutions and associated notes are accessible to other users through access commands to the database 26. The analyst alert pool 676 displays resolution notes 678 made by the same analyst.

The GUI 660 also includes a window 680 that streams potentially relevant headlines from news wires to the analyst. The headlines are captured by a "headline" receiver object 54 located in the line handlers 18, 18' and adapted to capturing the headlines from newswire services. The captured headlines either mention a market listed security or an associated company. The stories behind the headlines are received and stored in the database 26. The stories may also be accessed by analysts from the GUI 660.

Figure 38:
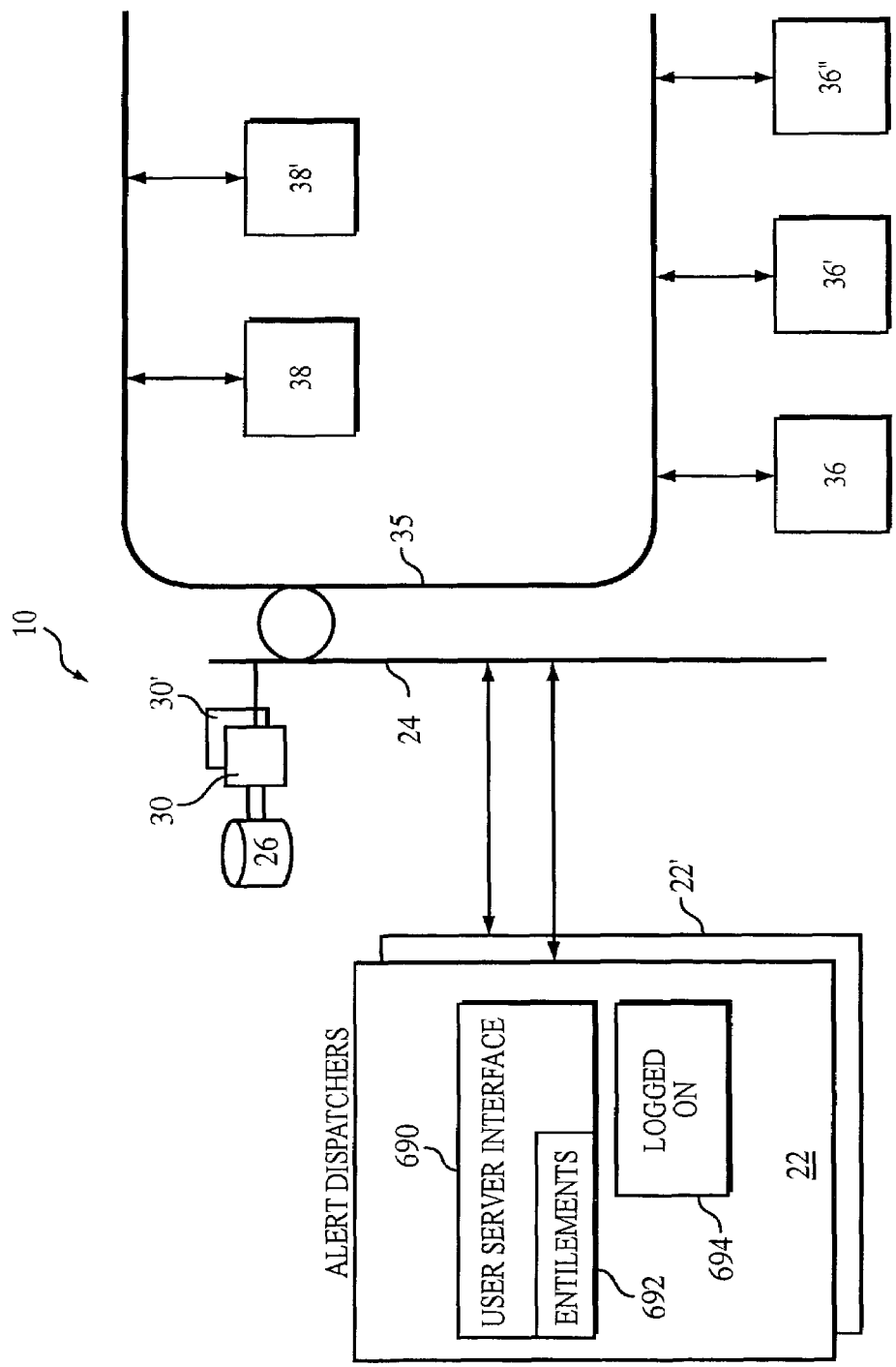
FIG. 38 shows a server interface used by the market monitoring system of FIGS. 1A-1B.

Referring to FIG. 38, an user server interface 690 located in the alert dispatcher 22 is shown. The user server interface 690 controls accesses to the market monitoring system 10 by external users, e.g., administrators, analysts and general users. The user server interface 690 includes an entitlements table 692, which lists access levels granted to the various external users.

The different access levels of the market monitoring system 10 include read only, read and write only, and administrator levels. General users have access entitlements to read data on alerts, alert resolutions, and headline stories from the database 26 and receive new alerts, alert resolutions, and headlines from the alert dispatchers 22, 22'. Analysts have access entitlements to write to the database 26, e.g., to accept or resolve alerts, and also have the access entitlements of the general users. Administrators can update and change parameters in the alert engines 20, 20', 20" and alert dispatchers 22, 22' and also have the access entitlements of the analysts.

Figure 39:
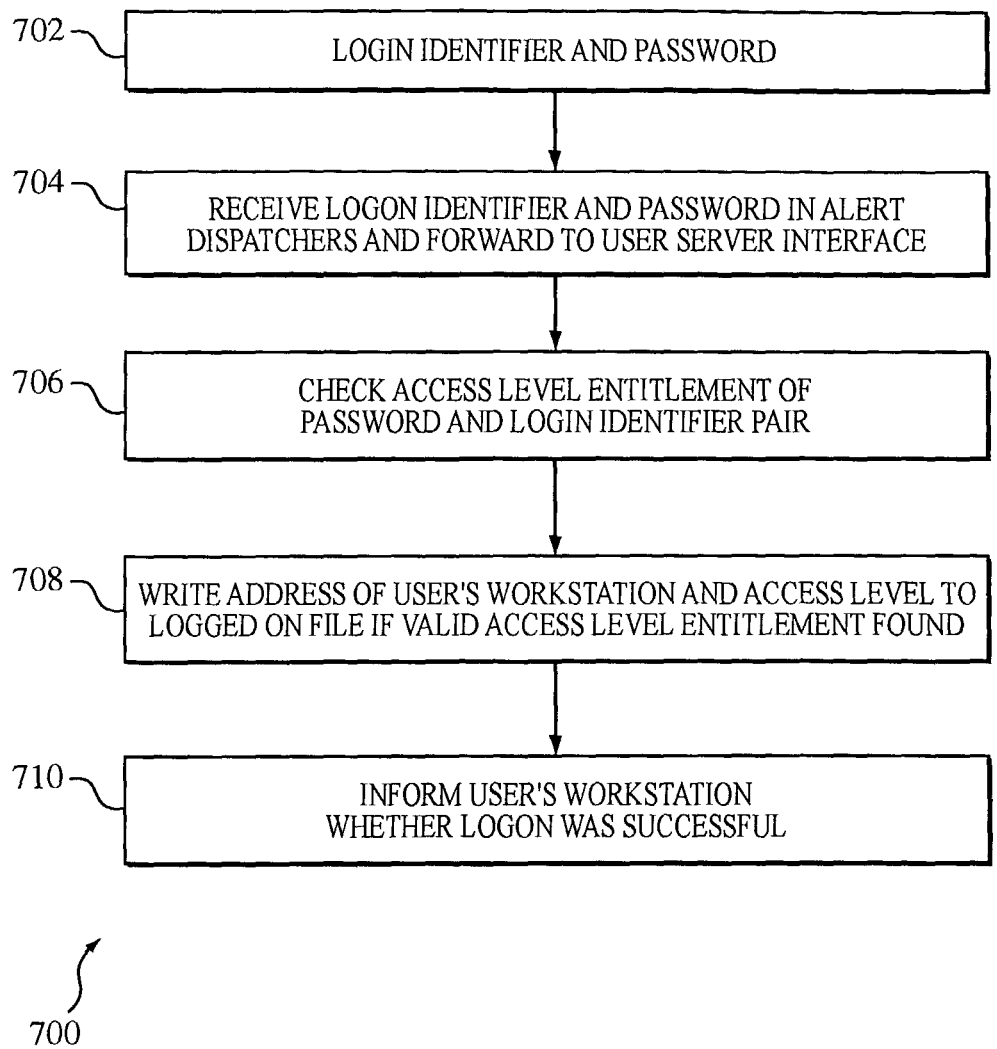
FIG. 39 shows a process by which a user logs onto the market monitoring system of FIGS. 1A-1B.

Referring to FIG. 39, a process 700 by which a user initializes connections to the market monitoring system 10 via the global network 35 is shown. The user sends a logon identifier and password 702 to the market monitoring system 10 from one of the workstations 36, 36', 36", 38, 38' via the network 35. The alert dispatchers 22, 22' receive and forward 704 the logon identifier and password to their internal user server interfaces 690. Each user server interface 690 checks 706 the access level entitlement of the identifier and password pair. To check the access level, each user server interface 690 performs a look up in the internal entitlements table 692 shown in FIG. 38. Each user server interface 690 writes 708 the network address of the sending workstation and the access level in a logged-on table 694 in response to finding a valid access level in the entitlements table 692. The entry in the logged-on Table 694 enables the user to retain his or her access level entitlement during a logon period on the workstation that he or she is using. The user server interface 690 also informs 710 the user's workstation 36, 36', 36", 38, 38' whether the logon was successful or unsuccessful.

Figure 40:
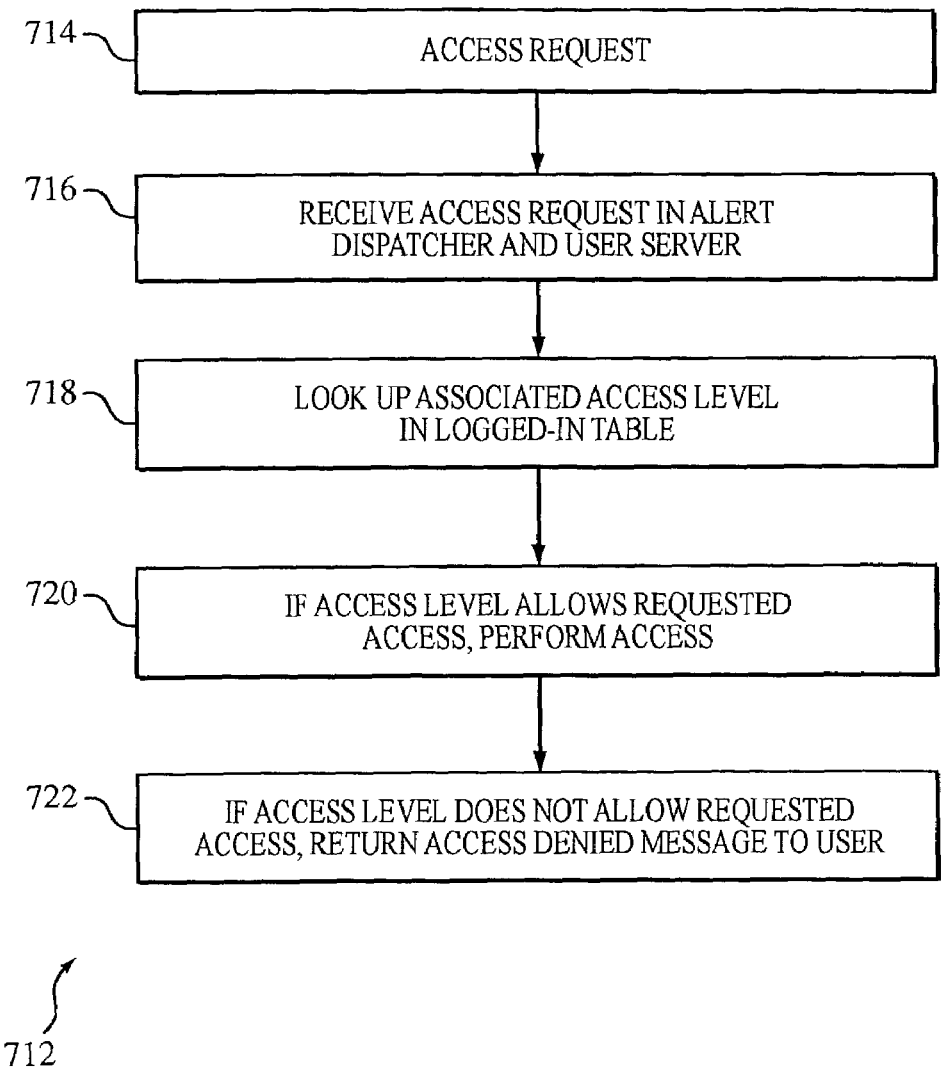
FIG. 40 shows a process by which a user access request to the market monitoring system of FIGS. 1A-1B is handled.

Referring to FIG. 40, a process 712 for handling any user access request to the market monitoring system 10 is shown. A user request to access 714 the database 26, e.g., to resolve an alert or read data therein, is sent to the market monitoring system 10 from one of the workstations 36, 36', 36", 38, 28'. The alert dispatchers 22, 22' receive 716 the user's access request. The user server interface 690 looks up 718 the address of the user's workstation in the logged-on table 692 to find the user's access level entitlement. If the access level allows the requested access, the user server interface 690 performs 720 the access requested by the user. If the access level does not allow the access, the user server interface 690 returns 722 an access denied message to the workstation 36, 36', 36", 38, 38' being used by the user.

Similarly, the alert dispatchers 22, 22' consult the logged-on table 694 prior to publishing alerts, alert resolutions, and headlines for analysts. The logged-on table 694 provides the network addresses to which alerts, alert resolutions, and headlines are sent as long as a user is determined to be logged-on-as long as his or her network address remains in the logged-on table 694.

Backup Market Monitoring System

Figure 41:
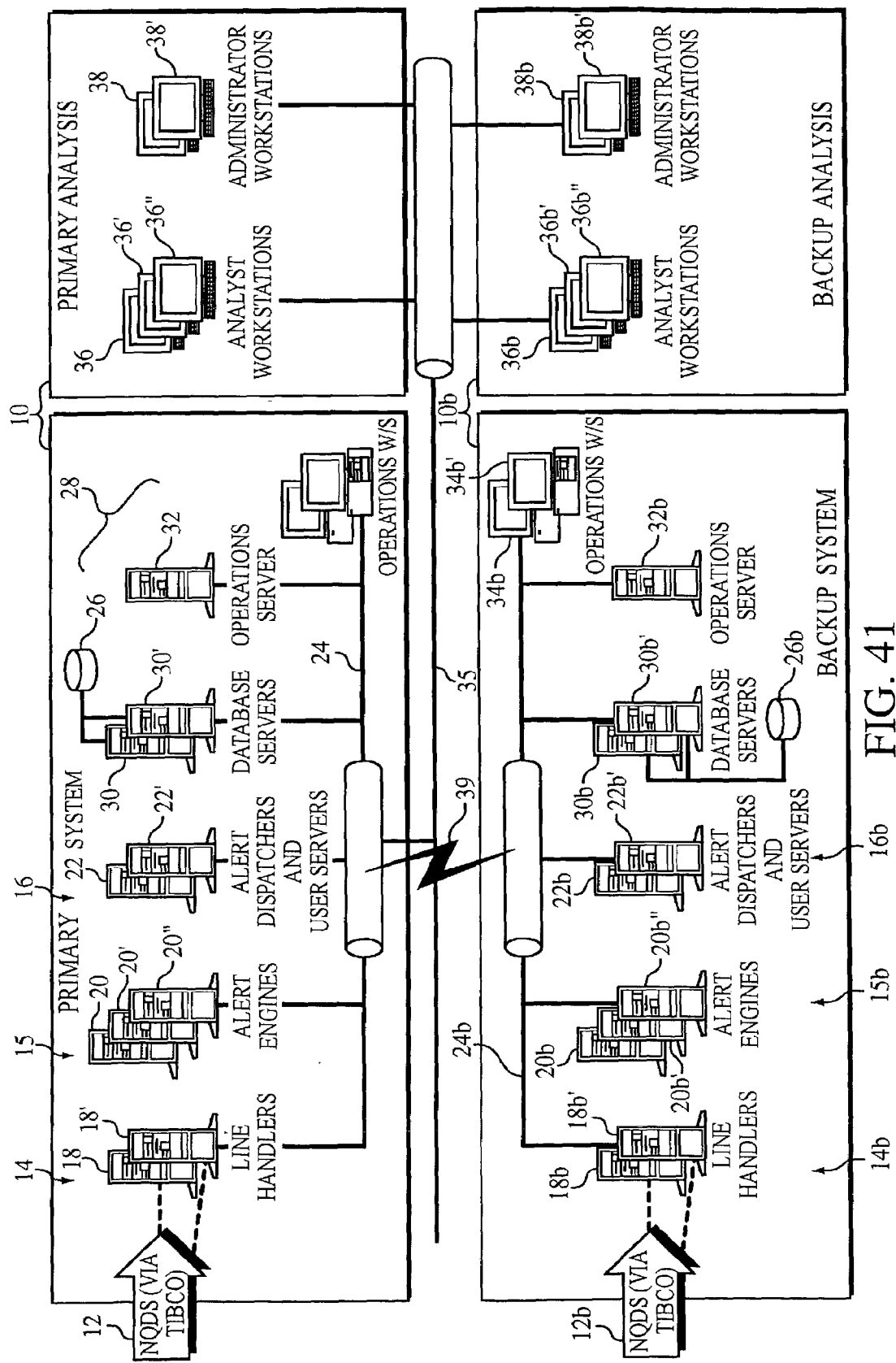
FIG. 41 shows an embodiment of the market monitoring system of FIGS. 1A-1B with both primary and backup systems.

Referring to FIG. 41, an embodiment of the market monitoring system 738 of FIG. 1A with both primary and backup systems 10, 10b is shown. The primary and backup systems 10, 10b are located at different locations. The primary system 10 performs full market monitoring operations under normal conditions and has already been described in FIGS. 1A-40. The backup system 10b can carry on full market monitoring operations when the primary system 10 is not carrying on full operations. An operator may transfer full operations to the backup system 10b in response to a critical condition or failure of the primary system 10 or to enable maintenance work on the primary system 10 without stopping market monitoring operations.

The backup system 10b substantially mirrors the primary system 10 described in relation to FIGS. 1-40. The backup system 10b includes a plurality of stages 14b-16b, which are asynchronous with respect to each other. Each stage 14b-16b includes a parallel array of independent devices, i.e., line handlers 18b, 18b', alert engines 20b, 20b', 20b" and alert dispatchers 22b, 22b'. The devices of each stage 14b-16b are analogous to the devices already described in relation to FIG. 1. The various stages 14b-16b of the backup system 10b couple together through private network 24b.

The private network 24b couples the stages 14b-16b to a relational data base 26b and operations workstations 34b, 34b' of the backup system 10b. The stages 14b-16b interface the database 26b through DB servers 30b, 30b', which are analogous to the DB servers 30, 30' described in relation to FIG. 1. The operations workstation 34b interacts with the stages 14b-16b of the associated system 10b via the operations servers 32b, which are analogous to the operations server 32 of FIG. 1.

The private network 24b also couples to the same global network 35 as the primary system. The global network provides for communications with primary and/or backup analyst and administrator workstations 36-36", 38-38', 36b-36b", 38b-38b'. The backup analyst 36b-36b" and administrator workstations 38b-38b' are analogous to the workstations 36-36", 38-38' of the primary system 10, already been described in relation to FIG. 1. But, the global network 35 can couple either the primary workstations 36-36", 38-38' or the backup workstations 36b-36b", 38b-38 to the backup system 10b.

The primary and backup systems 10, 10b are loosely synchronized, because each system 10, 10b receives the same incoming data from the feed lines 12 and the same write transactions to each database 26, 26B. Thus, the primary and backup systems store approximately the same market data state. The loose synchronization enables rapid transfers of full market monitoring operations to the backup system 10b without large data losses. In the absence of synchronization, a transfer could cause lost detections and resolutions of alerts, because alert detection and resolution use previously accumulated data.

The primary system 10 uses a network link 39 to perform direct data transfers to the backup system 10b. The link 39 handles regular transfers of low volume data that replicates new alerts and alert resolutions, which have been written to the database 26. This low volume data partially resynchronizes the states of the databases 26, 26b of the primary and backup systems 10, 10b.

Figure 42A:
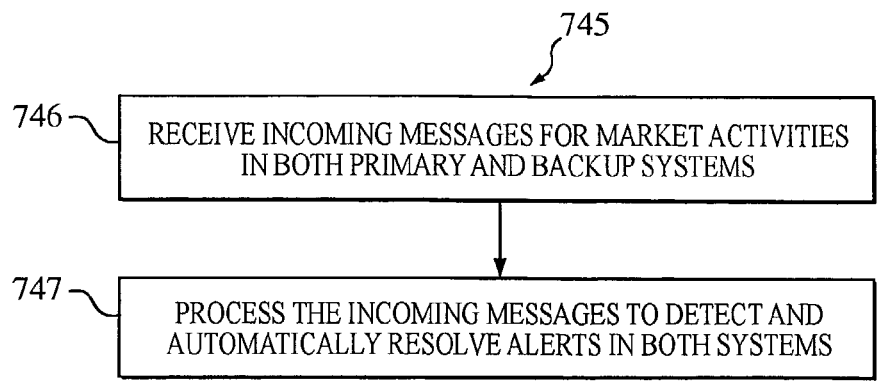
FIGS. 42A-42C show a process for loosely synchronizing the backup system of FIG. 41 to the primary system.

Referring to FIG. 42A, a process 745 to loosely synchronize the alert engines, 20-20", 20b-20b" of the two systems 10, 10b is shown. The primary and backup systems 10, 10b receive 446 the same incoming messages from their own feed lines 12, 12b. The primary and backup systems 10, 10b process 447 the incoming messages through their own alert engines 20-20", 20b-20b" thereby updating the states of the alert engines 20-20", 20b-20b". The alert engines 20-20", 20b-20b" of the two systems 10, 10b are loosely synchronized by both processing the same incoming data from the feed lines 12, 12b and by loosely synchronizing the primary and secondary databases 24, 24b.

The systems 10, 10b are defined to be "loosely" synchronized, because the synchronization involves the receipt of the same data by both systems 10, 10b, which is not exact. For example, the primary and backup systems 10, 10b may process the same data with a small relative delay.

The high volumes of data associated with individual "market events" are not transferred through the link 39. The link 39 carries much less data than needed to synchronize the two systems 10, 10b, because alerts are generally provoked by a small portion of the market event messages.

During a trading session, the primary system 10 is ordinarily enabled and the backup system 10b is disabled. The enabled primary system 10 performs full market monitoring operations. The disabled backup system runs, as described above, but does not publish alerts and resolutions for users or write alerts and resolutions to the database 26b. While the backup system 10b is disabled, it receives regular updates for its database 26b from the primary system 10.

Figure 42B:
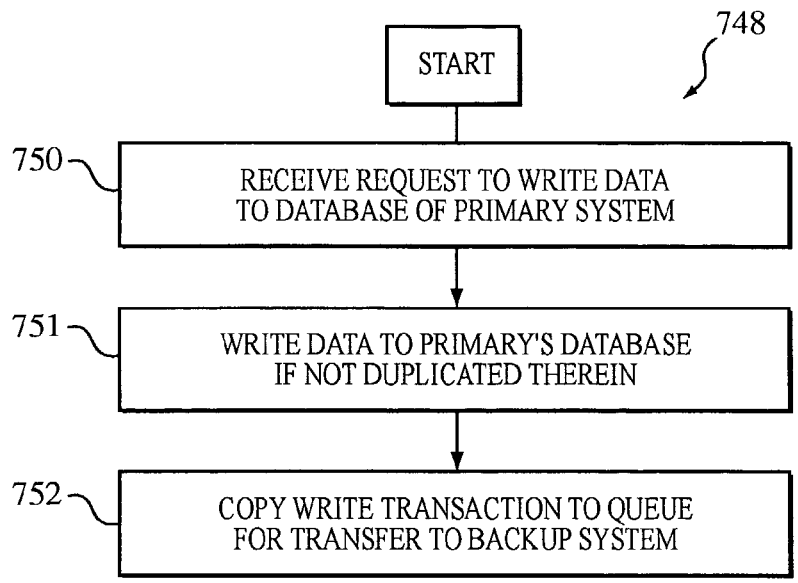

Referring to FIG. 42B, a process 748 for synchronizing the databases 26, 26b of the primary and backup systems 10, 10b is shown. The process 748 starts when one of the DB servers 30, 30' of the primary system 10 receives 750 a request to write data for a new alert, alert resolution, event, or incident to the database 26. If the data does not duplicates data already in the database 26, the DB server 30, 30' writes 751 the data to the database 26. The DB server 30, 30' also copies 752 the write transaction to a queue for later transfer to the backup system 10b. The DB servers 30, 30' treat each write request for an alert, alert resolution, event, and incident similarly.

Figure 42C:
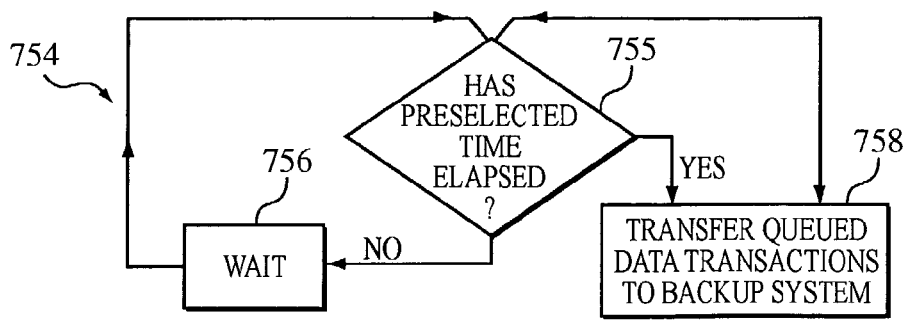

Referring to FIG. 42C, a process 754 by which each DB server 30, 30' transfers the queued write transactions to the backup system 10b is shown. Each DB server 30, 30' regularly checks 754 whether a preselected time has elapsed since its last transfer of data to the backup system 10b. If the time has not elapsed, the DB server 30, 30' waits 756 and repeats the check. If the preselected time has elapsed, the DB server 30, 30' transfers 758 the write transactions in the above-described queue to the database 26b to the backup system 10b. The backup DB servers 30b, 30b' use the transferred transaction data to resynchronize the backup's database 26b to that of the primary's database 26.

Figure 43:
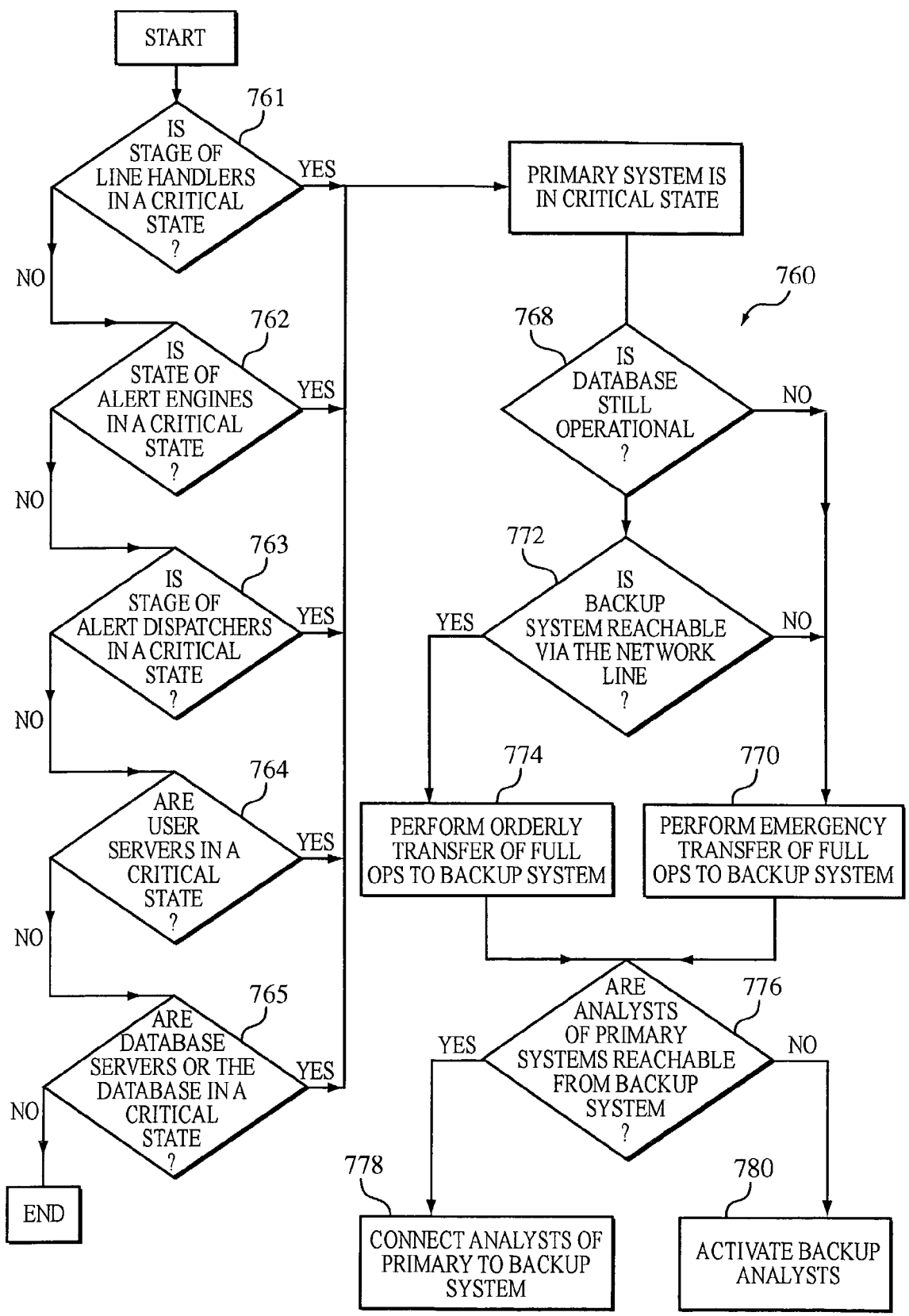
FIG. 43 shows a process for deciding whether to transfer full market monitoring operations to the backup system of FIG. 41.

Referring to FIG. 43, a decision tree 760 for deciding whether to transfer full market monitoring operations from the primary system 10 to the backup system 10b is shown. The decision may be made manually by an operator by using one of the operations workstations 34, 34'. The operator determines 761-763 whether any of the stages 14-16 of the primary system 10 is in a critical state. For each stage 14-16, a critical state is defined to exist if there is at risk of the stage 14-16 is not or will not be processing messages properly. For each stage 14-16, device redundancy increases the threshold for critical states. Typically, the breakdown of one device of a stage 145-16 does not produce a critical state, but the definition of critical state is implementation specific.

Similarly, the operator determines 764-765 whether the set of user servers 690, shown in FIG. 38, the database 26 or set of DB servers 30, 30' of the primary system 10 are in a critical state. With redundant user server interfaces 690 (FIG. 38) and DB servers 30, 30', the breakdown of one user server interface 690 or DB server 30, 30' may not produce a critical state.

If any stage 14-16, the database 26, the set of DB servers 30, 30', or the set of user servers 690 is in a critical state, the primary system 10 is in a critical state. In such cases, the operator transfers full market monitoring operations to the backup system 10b through one of several processes.

To decide the transfer process, the operator determines 768 whether the database 26 is operational. To be operational, at least one DB server 30, 30' and the database 26 itself is functioning. If the database 26 is not operational, the operator performs 770 an emergency process for transferring full operations to the backup site 10b. If the database 10 is operational, the operator determines 772 whether the backup system 10b is reachable through the network link 39. If the backup system 10b is reachable through the global network 35, the operator performs 774 an orderly transfer of full market monitoring operations to the backup system 10b. Otherwise, the operator again performs 770 an emergency transfer of full market monitoring operations to the backup system 10b.

In an orderly transfer, data from the primary database 26 is transferred to the backup database 26b through the network link 39. The transferred data synchronizes the backup database 26b to the state of the primary database 26 at the time of transfer. The stages 14-16 of the backup system 10b are loosely synchronized to those of the primary system 10, because synchronization is achieved by processing the same incoming data messages in both systems 10, 10b even when the backup system 10b is disabled. Loose synchronization is not a perfect, because the incoming messages for market events may arrive at the two systems 10, 10b at slightly different times. These time differences may affect several seconds of data. The transfer of data from the primary's database 26 to the backup's database 26b completes the loose synchronization of the backup and primary systems 10b, 10.

After transferring full operations to the backup system 10b, the backup's operator determines 776 whether the analysts of the primary system are reachable from the backup system 10b. The global network 35 needs to be operational if the primary's analysts are to be reachable from the backup system 10b. If the primary's analysts and administrators are reachable, the backup's operator connects 778 the primary's analysts to the backup system 10b. If the primary's analyst and administrator workstations 36, 36', 36", 38, 38' are unreachable, the backup's operator activates 780 the analysts and administrator workstations 36b, 36b', 36b", 38b, 38b' to process alerts.

Figure 44:
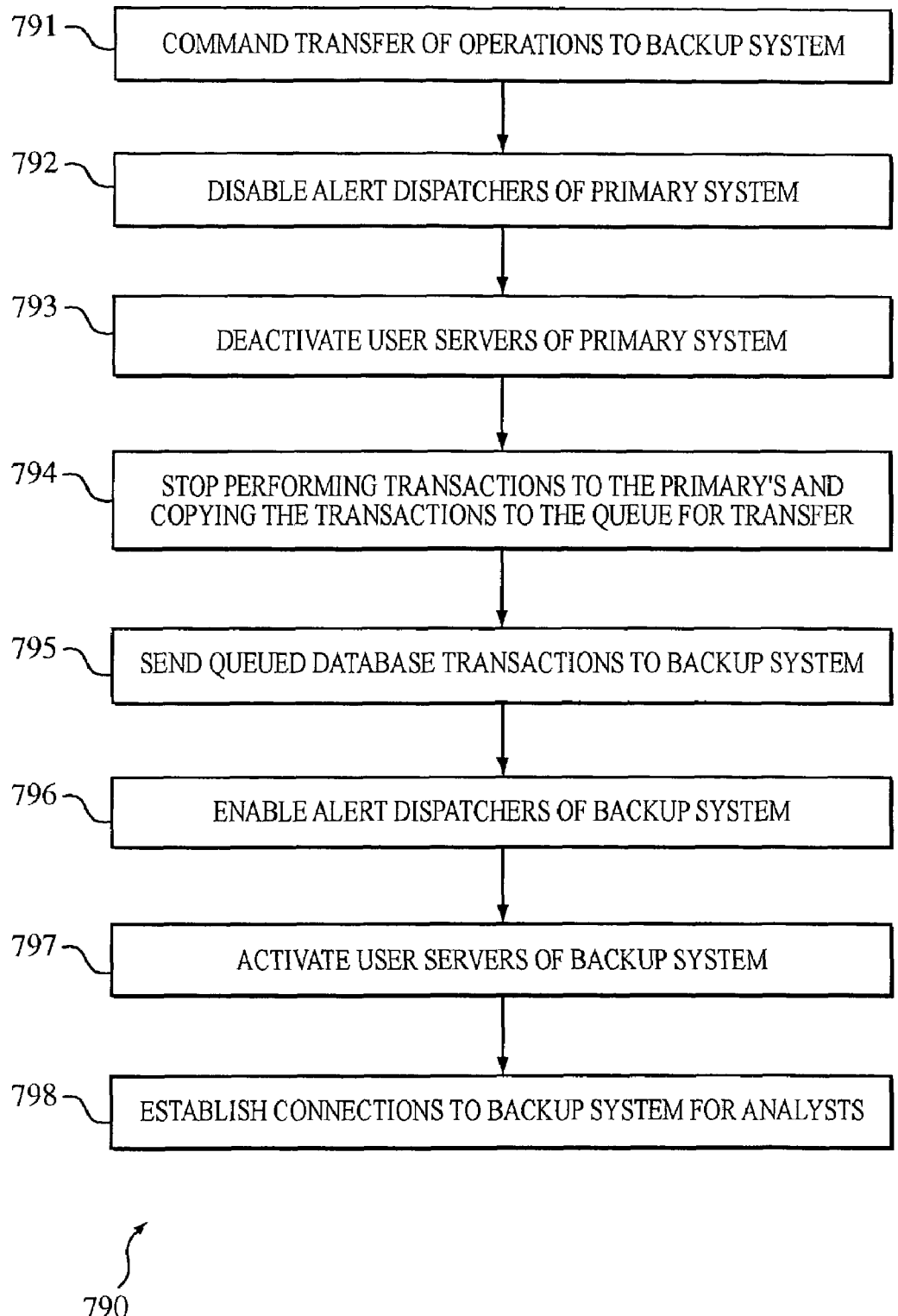
FIG. 44 shows a process for orderly transferring full market monitoring operations to the backup system of FIG. 41.

Referring to FIG. 44, an process 790 for orderly transferring full market monitoring operations to the backup system 10b of FIG. 41 is shown. The operator of the primary system 10 manually commands 791 an orderly transfer of full market monitoring operations to the backups system 10b using one of the operations workstations 34, 34'. The operator's command disables 792 the alert dispatchers 22, 22' of the primary system 10 by resetting the enable variable to the disabled value. As described in relation to FIGS. 20 and 21, the alert dispatchers 22, 22' do not publish alerts or alert resolutions to the analyst workstations 36, 36', 36" or write alert resolutions to the database 26 while disabled. The command from the operator also deactivates 793 the user server interfaces 690 of FIG. 38, which blocks communications with external users logged on the primary system 10. The command also causes the DB servers 30, 30' to stop writing 794 alerts and alert resolutions to the database 26 and copying 794 these transactions to the queues for later transfer to the backup system 10b. The command causes the DB serves 30, 30' to send 795 any remaining copied write transactions from the queues therein to the backup system 10b.

The command for the orderly transfer is also sent to the backup system 10b either via the network link 39 or by another communications channel (not shown). The command for an orderly transfer of market monitoring operations enables 796 the alert dispatchers 22b, 22b" of the backup system 10b to publish and write alerts and alert resolutions by resetting the enable variables therein to the enabled value. After being enabled, the dispatchers 22b, 22b' start writes to the database 26b. The command also activates 797 the user server interfaces (not shown) of the backup system 10b. The user interface servers and/or operator also establish 798 connections between the backup system 10b and analysts and other external users.

Figure 45:
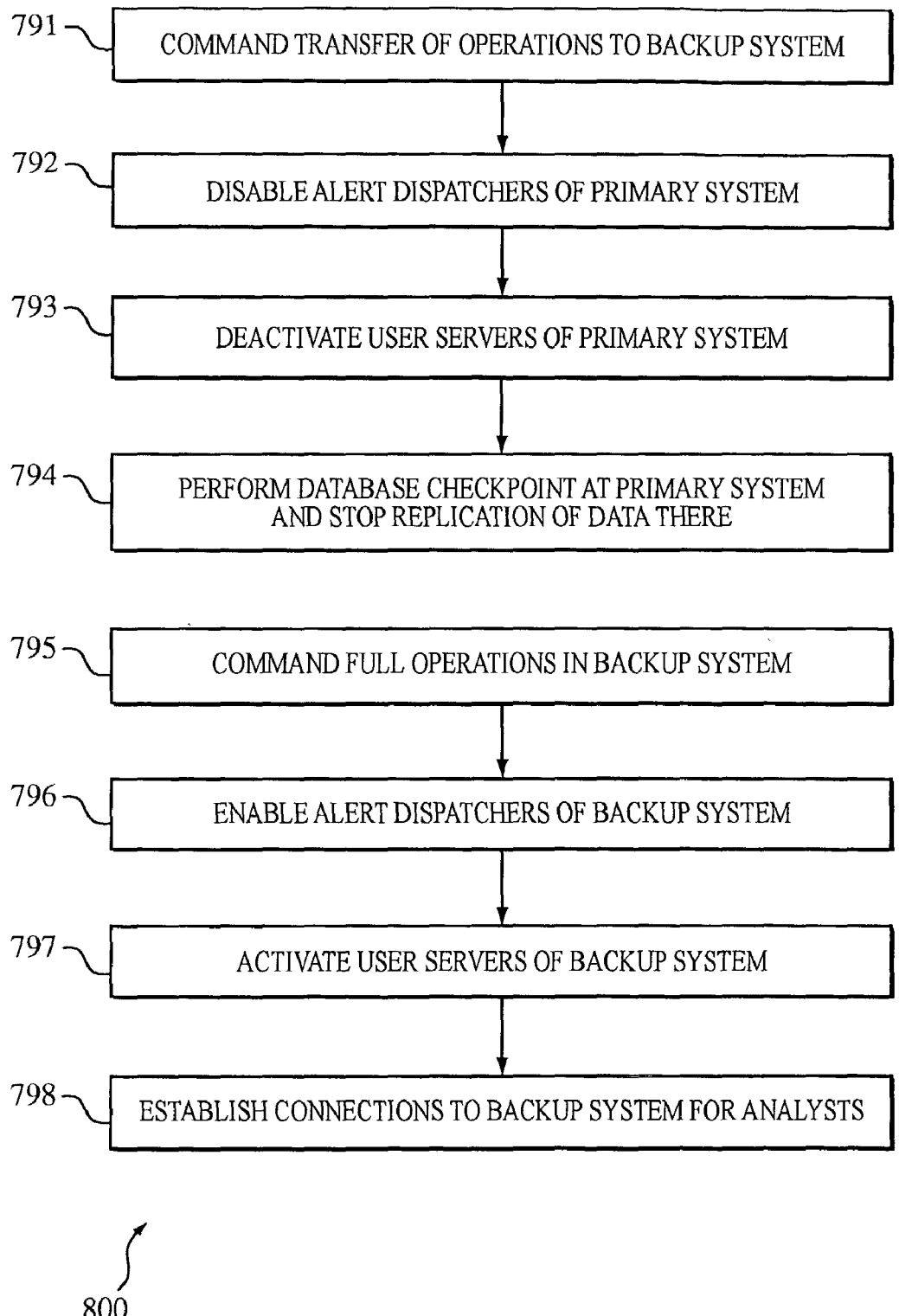
FIG. 45 shows an emergency process for transferring full market monitoring operations to the backup system of FIG. 41.

Referring to FIG. 45, an emergency process 800 for transferring full market monitoring operations to the backup system 10b of FIG. 41 is shown. The emergence process 800 includes a disable process 800, which disables the primary system 10 through actions 791-794 already described in the process 790 for orderly transferring full market monitoring operations to the backup system 10b. The process 800 also commands 799 the start of full monitoring operations by the backup system 10b without transferring remaining queued copies of write transactions to the primary's database 26 to the backup system 10b.

Unlike the process 790 for an orderly transfer of full operations, the transfer of remaining write transactions is not performed because of a failure of either the primary's database 26 or of the network link 39 to the backup system 10b. Since the transfer of the remaining queued write transformations is not performed, the backup system 10b loses some market data and may miss some alerts when the emergency transfer process 800 is used.

In the emergency process 800, the operator also directly commands 799 the start of full monitoring operations, e.g., by a telephone call to the operator of the backup system 10b. The direct command may be required by non-functional connections through the network link 39. After receiving the command to start full operations, the emergency process 800 proceeds 796-798 like in the process 790 for orderly transfer of full operations.

Figure 46:
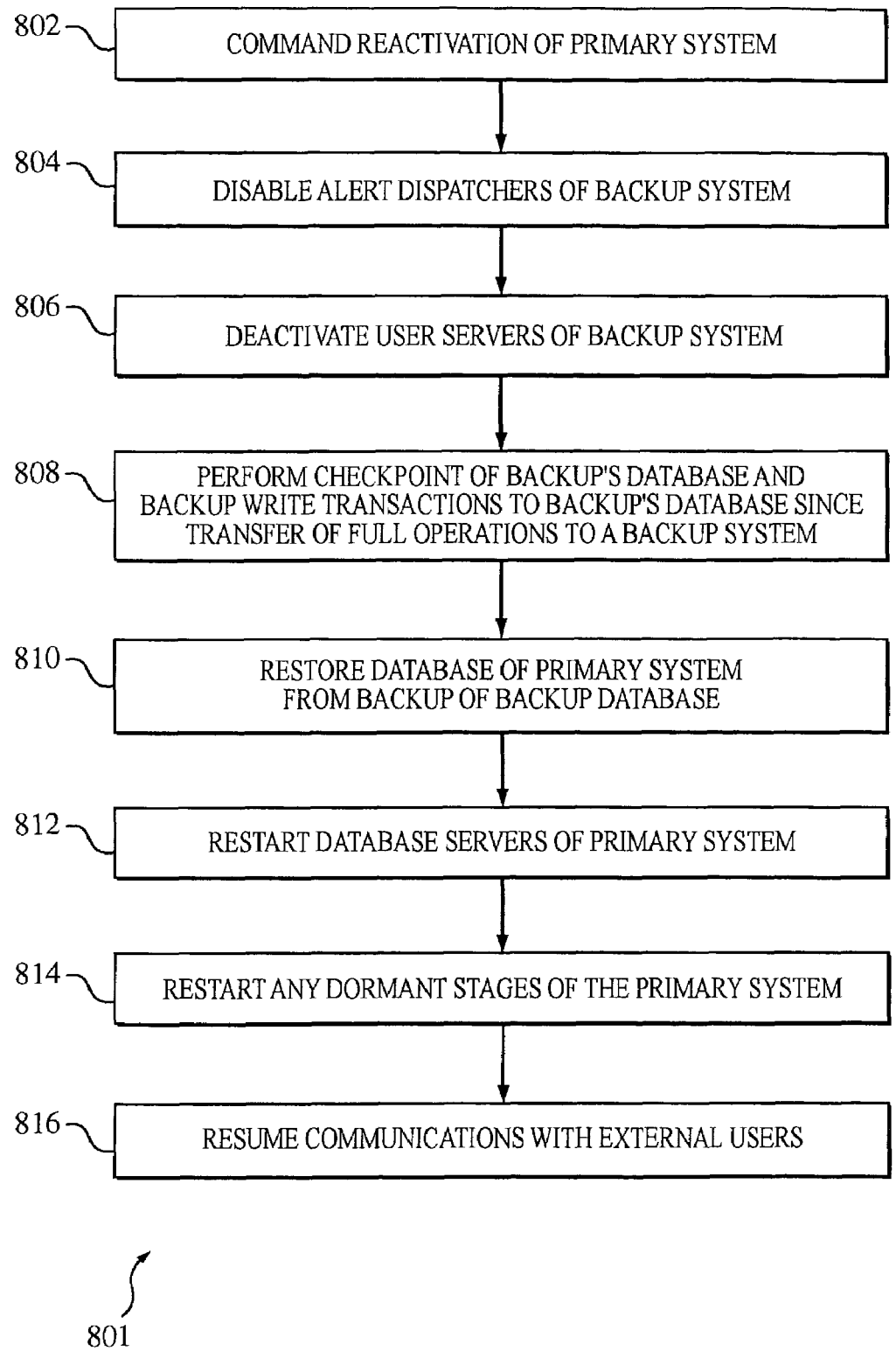
FIG. 46 shows a process for transferring full market monitoring operations back to the primary system of FIG. 41.

Referring to FIG. 46, a process 801 for reactivating the primary system 10 during a period between two trading sessions is shown. An operator commands 802 reactivation of the primary system 10 to the backup system 10b. The command disables 804 the alert dispatchers 22b, 22b' of the backup system 10b by resetting the enable variable therein to the disabled value. The command also deactivates 806 the user server interfaces of the backup system 10b. The DB servers 30b, 30b' perform 808 a transaction checkpoint on the backup's database 26b. The DB servers 30b, 30b' also backup 808 all alerts and alert resolutions written to the backup's database 26b to a backup file (not shown). The backup file includes the write transactions performed since the transfer of full market monitoring operations to the backup system 10b.

The operator restores 810 the database 26 of the primary system 10 using the backup file made from the backup's database 26b. The restoration includes all alerts and resolutions processed since transfer of full operations to the backup system 10b. The restoration occurs between trading sessions to reduce the risk of missing alerts while the restoration is being performed.

The full restoration of the primary's database 26 obviates the need for incremental updates of the primary's database 26 while the backup system 10b performs full market monitoring operations. The primary system 10 may even be shut down while the backup system 10b performs full market monitoring. A full shutdown enables more flexibility in performing repairs and/or maintenance to the primary system 10.

After restoring the primary's database 26, the operator restarts 812 the primary's DB servers 30, 30', which restarts copying and queuing of write transactions to the database 26. The operator also restarts 814 any of the primary stages 14-16, which were shut down. The operator resumes 816 communications with external users by enabling the alert dispatchers 22, 22' and the user server interfaces 690.

Figure 47:
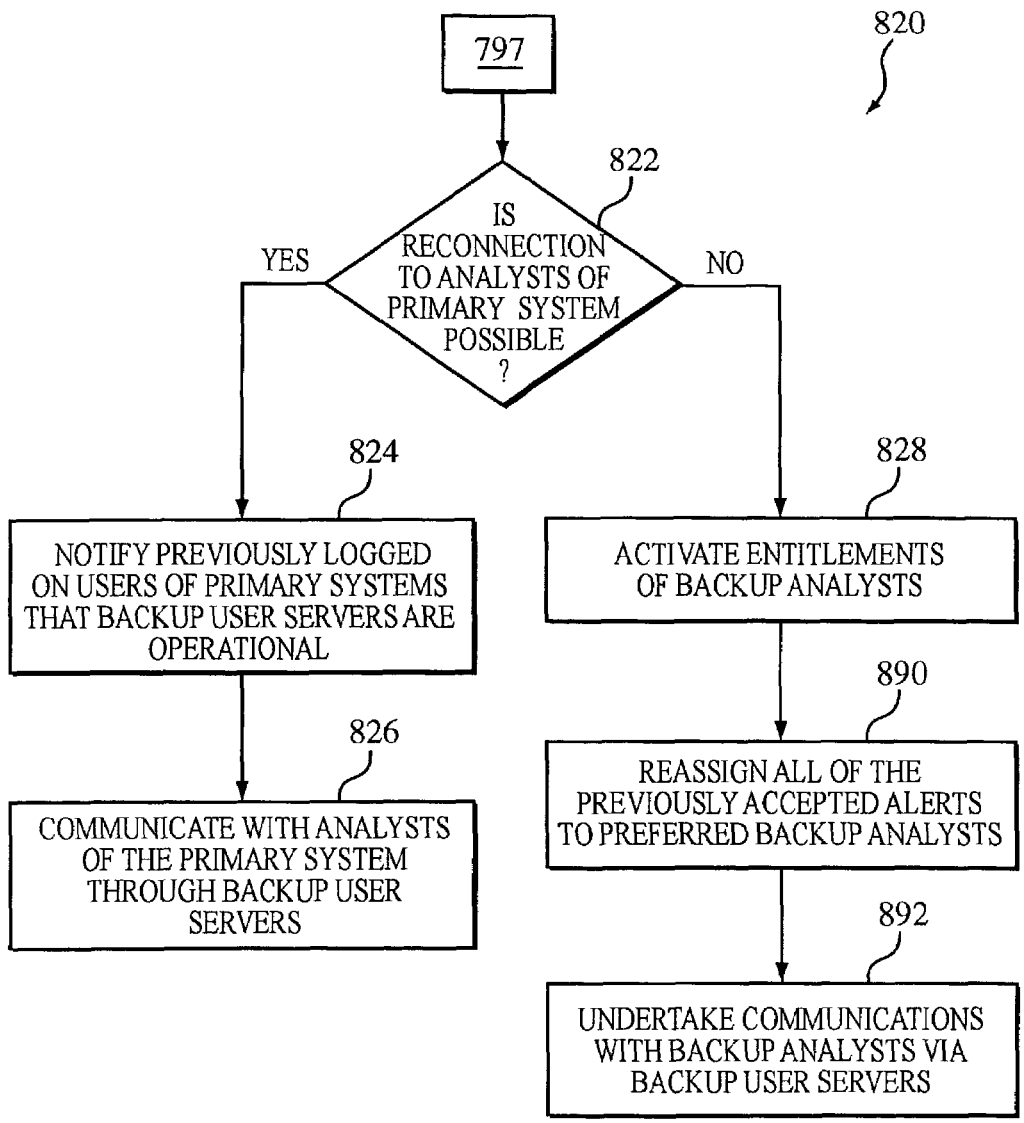
FIG. 47 shows a process for connecting analysts to the backup system of FIG. 41.

Referring to FIG. 47, a process 820 for connecting analysts and other external users to the backup system 10b in response to a full market monitoring operations transfer is shown. After activating the user server interfaces of the backup system 10b, an operator determines 882 whether reconnection of the analysts and administrators of the primary system 10 is possible. Reconnection may be infeasible because the global network 35 is non-functional or because the failure of the primary system 10 provoking the transfer of full operations also affected the primary's analysts and/or administrators. For example, a fire in a building housing both the primary system 10 and the primary's analysts would lead to such a situation.

If reconnection is possible, the backup system 10b notifies 824 each external user of the primary system 10, which was logged on the primary system 10 at the time of transfer. The notification informs the workstations 36, 36', 36", 38, 38" of previously logged on users that the backup system 10b is operational. To perform the notification, the backup system 10b contacts network addresses of the previously logged on users. After notifying the users, the backup's alert dispatchers 22b, 22b' undertake communications 826 with these analysts and other users, which include publishing alerts and resolutions and receiving alert acceptances and resolutions.

After the transfer of full market monitoring operations, analyst workstations 36, 36', 36" attempting to log on to the primary system 10 receive no responses. After a predetermined number of attempts to log on, these workstations 36, 36', 36" automatically try to log onto the backup system 10b. Thus, the transfer of full market monitoring operations provokes use of the backup system 10b by all users.

If reconnecting to the previously logged on analysts is impossible, the backup system 10b activates 828 access entitlements of backup analysts. The access entitlements of backup analysts may be already stored in a file (not shown) found in each alert distributor 22b, 22b' of the backup system 10b so that activation entails a manual validation of the file. When the access entitlements are activated, the backup's user server interfaces 690 reassign 890 the previously accepted alerts to new backup analysts.

To reassign a previously assigned alert, the alert is sent to each workstation 36b, 36b', 36b" of a logged on backup analyst. The reassigned alert is displayed in the main alert pool of the GUI 660 shown on the backup analyst workstations 36b, 36b', 36b". The reassigned alert carries a notation of one or more "preferred" analysts, i.e., the analysts assigned to the alert. Since reassignment only assigns a preferred backup analyst, any backup analyst can accept ownership of the reassigned alerts.

After activating access entitlements and reassigning previously accepted alerts, the backup's alert dispatchers 22b, 22b, undertake communications 892 with the backup analysts. These communications include publishing alerts, alert resolutions and headlines and receiving alert acceptances and resolutions.

Figure 48:
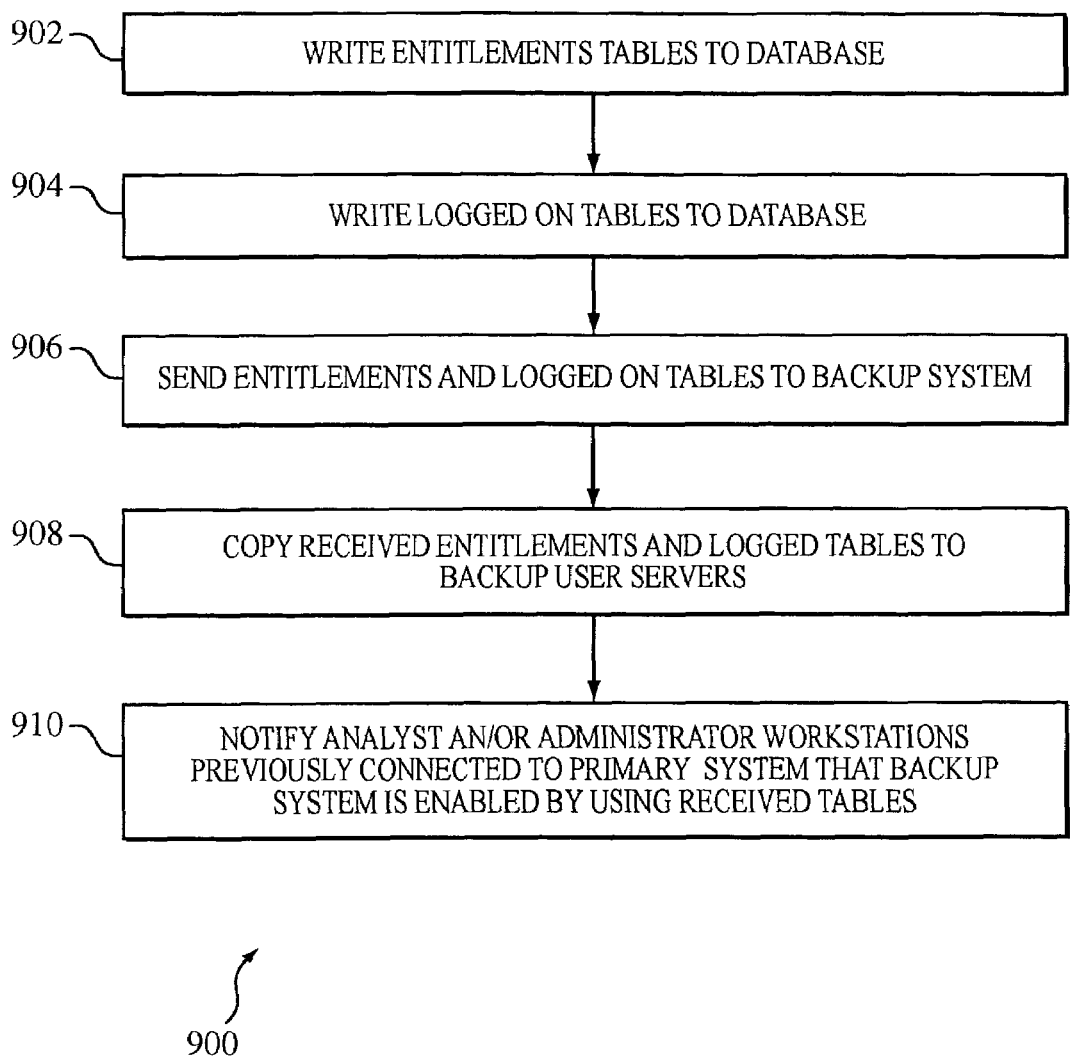
FIG. 48 shows a process by which analysts of the primary system are reconnected to the backup system of FIG. 41.

Referring to FIG. 48, a process 900 for reconnecting the analysts and/or administrators of the primary system 10 during an orderly transfer of full market monitoring operations to the backup system 10b is shown. The alert dispatchers 22, 22' write 902 their entitlements tables 692 from their user server interfaces 690 to the database 26 of the primary system 10. The alert dispatchers 22, 22' also write 904 their logged on tables 694 to the database 26. The DB servers 30, 30' send 906 the entitlements and logged on tables 692, 694 from the primary system 10 to the backup system 10b via the network link 39. The DB servers 30b, 30b' of the backup system 10b copy 908 these received access entitlements and logged on tables to the user server interfaces (not shown) of the backup system 10. Using the data in the received tables, the user server interfaces of the backup system 10b notify 910 the analysts and/or administrator workstations 36, 36', 36", 38, 38' previously connected to the primary system that the backup system is operational.

While the invention has been described in conjunction with the detailed description, the foregoing description is intended to illustrate and not to limit the scope of the invention. The scope of the invention is defined by the scope of the appended claims. Other aspects, advantages, and modifications are within the scope of the following claims.

What is claimed is:

1. A method of receiving and formatting incoming messages from one or more data feed lines, comprising:
    receiving a plurality of incoming messages having market event data from a data feed line, the messages comprising market source data messages and newswire messages;
    translating the received messages into market event messages having a common format, the market event messages including market activity data and time data; and
    publishing the translated messages over a network having a plurality of devices for processing the published messages.

2. The method of claim 1, wherein the incoming messages have a plurality of different formats.

3. The method of claim 1, further comprising:
    receiving a second plurality of incoming messages having data on one or more market events from a second data feed line;
    translating a portion of the received second plurality of incoming messages into a second plurality of market event messages having the common format; and
    publishing at least one of the translated messages on the network.

4. The method of claim 1, wherein the incoming messages comprise trading quotations, indices, volumes, exchange halts, and/or trading parties.

5. The method of claim 1, wherein at least a portion of the incoming messages are NQDS messages.

6. The method of claim 1, wherein publishing comprises:
    transmitting one of the translated messages to a plurality of the devices via the network.

7. The method of claim 6, wherein publishing includes transmitting an associated sequence number with each market event message, the sequence numbers temporally ordering the incoming messages.

8. The method of claim 1, wherein translating comprises:
    attaching time data to one of the incoming messages; and
    converting a plurality of data fields of the one of the incoming messages to a common format.

9. The method of claim 8, wherein the time data includes a receipt time of the one of the incoming messages and an event time attached to the one of the incoming messages prior to receipt from the feed line.

10. The method of claim 1, further comprising:
    serially determining whether the translated messages are valid based on associated sequence numbers, the sequence numbers temporally ordering the incoming messages from each feed line; and
    wherein one of the translated messages is published in response to being determined to be valid.

11. The method of claim 10, wherein the one of the translated messages is valid if the associated sequence number is one of higher than sequence numbers of the previously published messages and located in a gap between sequence numbers of the previously published messages.

12. The method of claim 10, wherein determining whether the translated messages are valid includes updating a list of gaps between sequence numbers of previously published messages.

13. The method of claim 1, further comprising:
    monitoring a plurality of feed lines for the incoming messages.

14. The method of claim 1, further comprising:
    producing a list for sequence numbers of the incoming messages received from the feed line; and
    writing a sequence number to the list for each translated incoming message, the sequence numbers forming a temporal ordering of the incoming messages.

15. A computer program product for receiving and formatting data incoming messages from one or more data feed lines, the program residing on a computer readable medium and comprising instructions to cause a computer to:
    receive from a plurality feed lines a plurality of incoming messages having market event data, the messages comprising market source data messages and newswire messages;
    translate the received messages into market event messages having a common format, the market event messages including market activity data and time data; and
    publish at least one of the translated messages on a network having a plurality of devices capable of processing the published message.

16. The computer program product of claim 15, wherein the received incoming messages have a plurality of formats.

17. The product of claim 15, further comprising instructions to cause a computer to:
    receive a second plurality of incoming messages having data on one or more market events from a second data feed line;
    translate the received second plurality of incoming messages into a second plurality of market event messages having the common format; and
    publish at least one of the translated second plurality of messages on the network.

18. The product of claim 15, wherein the incoming messages comprise trading quotations, indices, volumes, exchange halts, and/or trading parties.

19. The product of claim 15, wherein at least a portion of the incoming messages are NQDS messages.

20. The product of claim 15, wherein the instructions to publish cause the computer to:
transmit one of the translated messages to a plurality of parallel processing devices via the network.

21. The product of claim 15, wherein the instructions to translate cause the computer to:
attach time data to the incoming messages, the time data including a stamp for a receipt time of the associated incoming message and an event time for the prior to the receipt of the associated incoming message from the feed line; and
convert a plurality of data fields of the incoming message to a common format.

22. The product of claim 15, the program further comprising instructions to cause the computer to:
serially determine whether the translated messages are valid based on associated sequence numbers, the sequence numbers temporally ordering the incoming messages from the feed line; and
wherein one of the translated messages is published in response to being determined to be valid.

23. The product of claim 22, wherein the one of the translated messages is valid if the associated sequence number is one of higher than sequence numbers of the previously published messages and located in a gap between sequence numbers of the previously published messages.

24. The product of claim 22, wherein the instructions to determine whether the translated messages are valid cause the computer to:
update a list of gaps between sequence numbers of previously published messages.

25. The product of claim 15, the program further comprising instructions to cause the computer to:
produce a list for sequence numbers of the incoming messages received from the feed line; and
write a sequence number to the list for each translated received incoming message, the sequence numbers forming a temporal ordering of the incoming messages.

26. A system to receive and format incoming messages received from a plurality of data feed lines, comprising:
a network; and
a plurality of line handlers having a server coupled to both a data feed line and to the network, the servers being configured to:
receive a plurality of incoming messages for market events from the data feed lines coupled thereto, with incoming messages on market event comprising market source data messages and newswire messages;
translate the received incoming messages into market event messages having a common format; and
publish a portion of the translated messages on the network; and
wherein the market event messages from each server have the same format.

27. The system of claim 26, wherein the incoming messages have a plurality of formats.

28. The system of claim 26, wherein the incoming messages comprise trading quotations, indices, volumes, exchange halts, and/or trading parties.

29. The system of claim 26, wherein at least a portion of the incoming messages are NQDS messages.

30. The system of claim 26, wherein each line handler is configured to send each market event message to a plurality of available processors via the network.

31. The system of claim 26, wherein each computer is configured with a software program to cause the computer to:
receive the incoming messages;
translate the received incoming messages; and
publish a portion of the translated messages on the network.

32. The system of claim 31, wherein the program includes an receiver object to receive incoming messages, a translating object to translate the incoming messages, and a publishing object to publishes translated messages.

33. The system of claim 31, wherein the program further includes a sequence number object to serially determine whether the translated messages are valid based on associated sequence numbers, the sequence numbers temporally ordering the incoming messages from each feed line; and
wherein one of the translated messages is published in response to being determined to be valid.

34. The system of claim 28, wherein the computers are servers and the software program is a NT program and the network operates according to an NT compatible protocol.

35. The system of claim 28, further comprising an operations server coupled to the network and configured to track the health and performance of the line handlers.

* * * * *